United States Patent
Kuwayama et al.

(10) Patent No.: US 10,113,040 B2
(45) Date of Patent: Oct. 30, 2018

(54) POLYMER FILM, POLARIZING PLATE AND LIQUID CRYSTAL DISPLAY DEVICE

(71) Applicant: FUJIFILM Corporation, Tokyo (JP)

(72) Inventors: Yasukazu Kuwayama, Kanagawa (JP); Nobutaka Fukagawa, Kanagawa (JP); Hiroshi Inada, Kanagawa (JP); Masaki Noro, Kanagawa (JP); Yoshitaka Maeda, Kanagawa (JP); Naozumi Shiraiwa, Kanagawa (JP); Yu Naito, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 407 days.

(21) Appl. No.: 14/843,723

(22) Filed: Sep. 2, 2015

(65) Prior Publication Data

US 2016/0060405 A1     Mar. 3, 2016

(30) Foreign Application Priority Data

Sep. 3, 2014  (JP) .................................. 2014-179685
Feb. 16, 2015 (JP) .................................. 2015-028019
Jun. 16, 2015 (JP) .................................. 2015-121383

(51) Int. Cl.
  *C08J 5/18*    (2006.01)
  *G02F 1/1335*  (2006.01)
  *G02B 5/30*    (2006.01)

(52) U.S. Cl.
  CPC .......... *C08J 5/18* (2013.01); *G02F 1/133528* (2013.01); *B32B 2457/202* (2013.01);
  (Continued)

(58) Field of Classification Search
  CPC ........ C08J 5/18; C08J 233/12; C08J 1301/12; G02B 1/133528; G02B 1/14; G02B 5/3025; B32B 2457/202
  See application file for complete search history.

(56) References Cited

U.S. PATENT DOCUMENTS 3,846,442 A    11/1974  Habermeier et al.
3,867,347 A    2/1975   Felber et al.
               (Continued)

FOREIGN PATENT DOCUMENTS

CN    101445577 A    6/2009
CN    103709449 A    4/2014
                (Continued)

OTHER PUBLICATIONS

International Preliminary Report on Patentability issued by WIPO dated Sep. 1, 2015 in connection with Related Intl. Patent Application No. PCT/JP2014/054762.

(Continued)

*Primary Examiner* — Anthony J Frost
(74) *Attorney, Agent, or Firm* — Edwards Neils LLC; Jean C. Edwards, Esq.

(57) ABSTRACT

The polymer film comprises a carbonyl bond-containing polymer and a compound having δh of equal to or higher than 11.0 and δχ of equal to or lower than 1.50, wherein the δh is a value of hydrogen-bonding capacity calculated by Hoy method and the δχ is a value calculated by equation 1:

$$\delta\chi = |x - 13.3| \quad \text{Equation 1}$$

wherein, in equation 1, χ represents an interatomic distance in the polymer film between atoms most distant from each other among molecules in the compound, excluding a hydrogen atom, calculated by molecular dynamics calculation.

18 Claims, 1 Drawing Sheet

(52) U.S. Cl.
CPC ........ *C08J 2301/12* (2013.01); *C08J 2323/24* (2013.01); *C08J 2333/12* (2013.01); *G02B 5/3033* (2013.01); *Y10T 428/10* (2015.01); *Y10T 428/1036* (2015.01)

(56) References Cited

U.S. PATENT DOCUMENTS

| | | | |
|---|---|---|---|
| 4,019,972 | A | 4/1977 | Faust |
| 4,200,725 | A | 4/1980 | Gras et al. |
| 4,218,515 | A | 8/1980 | Heckles |
| 4,328,325 | A | 5/1982 | Marquardt et al. |
| 4,355,093 | A | 10/1982 | Hartmann et al. |
| 4,861,853 | A | 8/1989 | Petrie et al. |
| 4,931,529 | A | 6/1990 | Burba et al. |
| 4,968,732 | A | 11/1990 | Burba et al. |
| 4,983,676 | A | 1/1991 | Petrie et al. |
| 5,030,754 | A | 7/1991 | Speranza et al. |
| 6,726,995 | B2 * | 4/2004 | Ishii ........................ G02B 1/105 359/487.06 |
| 7,709,572 | B2 * | 5/2010 | Takebe ...................... C08B 3/16 525/54.21 |
| 8,690,305 | B2 | 4/2014 | Breton et al. |
| 2009/0119851 | A1 | 5/2009 | Steigerwald et al. |
| 2011/0223435 | A1 | 9/2011 | Naito et al. |
| 2012/0204757 | A1 | 8/2012 | Nagura et al. |
| 2012/0287199 | A1 | 11/2012 | Breton et al. |
| 2015/0361036 | A1 | 12/2015 | Inada et al. |

FOREIGN PATENT DOCUMENTS

| | | |
|---|---|---|
| CN | 105026479 A | 11/2015 |
| DE | 10154350 A1 | 5/2003 |
| GB | 1453429 A | 10/1976 |
| GB | 1580864 A | 12/1980 |
| JP | S49-53691 A | 5/1974 |
| JP | S50-92124 A | 7/1975 |
| JP | S51-19601 A | 2/1976 |
| JP | S51-34265 A | 3/1976 |
| JP | S53-285 A | 1/1978 |
| JP | S54-44670 A | 4/1979 |
| JP | S55-137118 A | 10/1980 |
| JP | S55-157623 A | 12/1980 |
| JP | S56-165146 A | 12/1981 |
| JP | S58-187187 A | 11/1983 |
| JP | S60-104055 A | 6/1985 |
| JP | S64-75515 A | 3/1989 |
| JP | H01-101325 A | 4/1989 |
| JP | H02-19362 A | 1/1990 |
| JP | H05-197073 A | 8/1993 |
| JP | 2001-187806 A | 7/2001 |
| JP | 2004-026742 A | 1/2004 |
| JP | 2004-155934 A | 6/2004 |
| JP | 2004-175971 A | 6/2004 |
| JP | 2004-292696 A | 10/2004 |
| JP | 2005-242566 A | 9/2005 |
| JP | 2005-272485 A | 10/2005 |
| JP | 2005-272566 A | 10/2005 |
| JP | 2005272566 A * | 10/2005 |
| JP | 2006-257369 A | 9/2006 |
| JP | 2009-015045 A | 1/2009 |
| JP | 2009-241397 A | 10/2009 |
| JP | 2009-258410 A | 11/2009 |
| JP | 2012-123292 A | 6/2012 |
| JP | 2012-236998 A | 12/2012 |
| JP | 2013-020223 A | 1/2013 |
| JP | 2013-076000 A | 4/2013 |
| WO | 2007/008959 A2 | 1/2007 |
| WO | 2011/059994 A2 | 5/2011 |
| WO | 2013/133041 A1 | 9/2013 |
| WO | 2014/133041 A1 | 9/2014 |
| WO | 2014/171468 A1 | 10/2014 |
| WO | 2015/012407 A1 | 1/2015 |

OTHER PUBLICATIONS

International Search Report dated Apr. 1, 2014 in related International Application No. PCT/JP2014/054762 which U.S. Appl. No. 14/835,165 is based upon.
Written Opinion dated Apr. 1, 2014 in related International Application No. PCT/JP2014/054762 which U.S. Appl. No. 14/835,165 is based upon.
Office Action, issued by the Japanese Patent Office (JPO) dated Aug. 30, 2016, in connection with related Japanese Patent Application No. 2015-502995.
J. Malik et al., Computational study of thermally controlled polymer network disassembly via the incorporation of sterically hindered urea linkages, Polymer, 2002, pp. 2561-2567, vol. 43 No. 8, Dept of Materials Sciences and Engineering, University of Cincinnati, Cincinnati, Ohio.
J. Malik et al., Thermally Controlled Molecular Disassembly of a Crosslinked Polymer Network by the Incorporation of Sterically Hindered Urea Linkages, Journal of Applied Polymer Science, 2002, pp. 856-864, vol. 85 No. 4, Dept. of Materials Science and Engineering, University of Cincinnati, Cincinnati, Ohio.
Notification of Reasons for Refusal issued by the Japanese Patent Office dated Dec. 6, 2016, in connection with Japanese Patent Application No. 2014-081511.
Second Office Action issued by the State Intellectual Property Office (SIPO) of China dated Aug. 23, 2017 in connection with related Chinese Patent Application No. 201480041133.1.
Office Action, issued by the Japanese Patent Office (JPO) dated Sep. 5, 2017 in connection with corresponding Japanese Patent Application No. 2015-121383.
First Office Action issued by the State Intellectual Property Office (SIPO) of China dated Nov. 28, 2016 in connection with corresponding Chinese Patent Application No. 201480041133.1.
Xiong Quanbo et al., The Seminar of Application Technique is Foreseen to the Plastic Lining, Open Day Apr. 30, 2009, pp. 61-66.
International Preliminary Report on Patentability issued by WIPO dated Feb. 4, 2016, in connection with Intl. Patent Application No. PCT/JP2014/069823.
Second Office Action issued by the State Intellectual Property Office (SIPO) of China dated Mar. 2, 2017 in connection with corresponding Chinese Patent Application No. 201480010577.9.
International Search Report issued in connection with related International Patent Application No. PCT/JP2014/060786 dated Jul. 8, 2014.
Written Opinion issued in connection with related International Patent Application No. PCT/JP2014/060786 dated Jul. 8, 2014.
Office Action, issued by the State Intellectual Property Office (SIPO) of China dated Jun. 29, 2016, in connection with Chinese Patent Application No. 201480010577.9.
Written Opinion issued in connection with International Patent Application No. PCT/JP2014/069823 dated Oct. 21, 2014.
International Search Report issued in connection with International Patent Application No. PCT/JP2014/069823 dated Oct. 21, 2014.
International Preliminary Report on Patentability issued by WIPO dated Oct. 29, 2015, in connection with Intl. Patent Application No. PCT/JP2014/060786.
Non Final Office Action, dated Nov. 28, 2017, in connection with U.S. Appl. No. 14/835,165.
Non Final Office Action, dated Mar. 29, 2018, in connection with U.S. Appl. No. 14/884,314.
Final Office Action, dated Aug. 13, 2018, in connection with U.S. Appl. No. 14/884,314.

* cited by examiner

1

POLYMER FILM, POLARIZING PLATE AND LIQUID CRYSTAL DISPLAY DEVICE

CROSS-REFERENCE TO RELATED APPLICATIONS

This application claims priority under 35 U.S.C 119 to Japanese Patent Application No. 2014-179685 filed on Sep. 3, 2014, Japanese Patent Application No. 2015-028019 filed on Feb. 16, 2015, and Japanese Patent Application No. 2015-121383 filed on Jun. 16, 2015. Each of the above applications is hereby expressly incorporated by reference, in its entirety.

BACKGROUND OF THE INVENTION

Field of the Invention

The present invention relates to a polymer film, a polarizing plate and a liquid crystal display device.

Discussion of the Background

Display devices such as a liquid crystal display device include various polymer films as an optical compensation film, a polarizing plate protective film, a base film and the like (for example, see Patent Literatures 1, 2 below, which are expressly incorporated herein by reference in their entirety).

Patent Literature 1: CN103709449A
Patent Literature 2: JP-A-No. 2013-20223

SUMMARY OF THE INVENTION

Properties practically required for the above-described polymer films can include two properties below.

One is to have excellent scratch resistance. This is for preventing the generation of a flaw on a film when processing the polymer film, when using the polymer film as a polarizing plate protective film in a liquid crystal display device, or the like.

Furthermore, the other is to have excellent transparency. This is because, in a liquid crystal display device including a polymer film having poor transparency, image quality of images displayed on a display surface (referred to as "image quality" hereinafter) is deteriorated.

On the other hand, in Patent literatures 1 and 2, incorporation of an additive to a polymer film is proposed, but there is no description that both scratch resistance and transparency of the polymer film are enhanced by such an additive.

An aspect of the present invention provides for a polymer film that is excellent in both scratch resistance and transparency.

The present inventors have intensive studies in order to provide the above polymer film, as the result, have newly found the following polymer film, and have completed the present invention:

A polymer film, which comprises:
a carbonyl bond-containing polymer; and
a compound having $\delta h$ of equal to or higher than 11.0 and $\delta \chi$ of equal to or lower than 1.50, wherein the $\delta h$ is a value of hydrogen-bonding capacity calculated by Hoy method and the $\delta \chi$ is a value calculated by equation 1.

$$\delta \chi = |\chi - 13.3| \quad \text{Equation 1}$$

In equation 1, $\chi$ represents an interatomic distance in the polymer film between atoms most distant from each other among molecules in the compound, excluding a hydrogen atom, calculated by molecular dynamics calculation. The interatomic distance means, in the molecular dynamics calculation, when the compound may show a plurality of interatomic distances by thermal motion etc. in the polymer, the arithmetic average of a plurality of these interatomic distances. Details of a calculation method of $\chi$ and the $\delta h$ will be described later.

In the present invention, polymer shall be used in the meaning that it is a polymer constituted from the same or different plurality of repeating units and includes homopolymer and copolymer.

In an embodiment, the compound contains at least one group selected from the group consisting of $-X^2-(C=X^4)-X^3-$, $-NR^5-(SO_2)-$, $-CO-NR^6-CO-$, $-O-$, $-S-$, $-COOH$, $-CN$, $-NR^7R^8$, $-OH$ and $-SH$ per molecule, wherein each of $X^2$, $X^3$ independently represents a single bond, $-NR^9-$, $-O-$ or $-(CR^{10}R^{11})_m-$, $X^4$ represents an oxygen atom or a sulfur atom, each of $R^5$, $R^6$, $R^7$, $R^8$, $R^9$, $R^{10}$, and $R^{11}$ independently represents a hydrogen atom or an alkyl group which may be substituted, and m represents an integer equal to or higher than 1.

In an embodiment, the compound contains at least one $-O-C(=O)-NH-$ per molecule.

In an embodiment, a carbonyl bond-containing polymer is cellulose ester.

In an embodiment, a carbonyl bond-containing polymer is a (meth)acrylic polymer. In the present invention, the (meth) acrylic polymer include an acrylic polymer and a methacrylic polymer.

In an embodiment, a carbonyl bond-containing polymer is a cycloolefin polymer.

In an embodiment, the compound has an absorption property in which absorbance of a solution containing the compound in the wavelength range of equal to or longer than 280 nm and equal to or shorter than 800 nm is equal to or higher than 0 abs and less than 1.0 abs. Hereinafter, having the absorption property will also be expressed as having no absorption in the wavelength range of equal to or longer than 280 nm and equal to or shorter than 800 nm. The absorbance can be represented without a unit.

The absorption property is a value measured by a method below.

1 mg of a compound is dissolved in 50 cm³ of a mixed solvent of methanol/dichloromethane=13/87 (volume ratio), and the absorbance is measured by an ultraviolet-visible spectroscopy in a measurement range from 280 to 800 nm with a light path length of 1 cm.

The absorbance of only the mixed solvent not containing the compound is measured as a blank test, in the same way.

When the absorbance obtained in the blank test exceeds 0 abs, a value obtained by subtracting the absorbance obtained in the blank test from the absorbance measured for the mixed solvent containing the compound is defined as the absorbance of the compound.

In the case of a compound having poor solubility in the mixed solvent, when there are a lot of insoluble substances and accurate reading of absorbance is difficult because of scattered light and the like due to the insoluble substances in the measurement of absorbance, measurement may be performed by substituting a half amount of the methanol by a solvent for which the compound shows high solubility (hereinafter, described as a third solvent). Examples of the third solvents include ethanol, dimethylformamide (DMF), acetonitrile, acetone, and the like, but the third solvent is not limited to these. Furthermore, two or more kinds of solvent may be used in mixture as the third solvent. Note that "has poor solubility" is defined as that, relative to the total amount of compound added to the mixed solvent, over 5% by mass is precipitated as an insoluble substance.

In an embodiment, in the polymer film, a value of Rth/d calculated by dividing a value of retardation Rth (unit: nm) in the thickness direction, also referred to as "thickness direction retardation" in the present invention, measured at a wavelength of 590 nm by the thickness d (unit: μm) of the film is equal to or more than −0.35 and equal to or less than 0.35.

A further aspect of the present invention relates to a polarizing plate having the above polymer film and a polarizer.

A further aspect of the present invention relates to a liquid crystal display device including the above polarizing plate and a liquid crystal cell.

A liquid crystal display device has, usually, a configuration in which a liquid crystal cell is disposed between a polarizing plate on the viewer-side and a polarizing plate on the backlight side. In the polarizing plate on the viewer-side and the polarizing plate on the backlight side, when denoting a polarizing plate protective film positioned between the polarizing plate and the liquid crystal cell by an inner-side protective film, and when denoting a protective film positioned on the side opposite to the inner-side by an outer-side protective film, the polymer film can be used as any of the inner-side and outer-side protective films of the polarizing plate on the viewer-side, and the inner-side and outer-side protective films of the polarizing plate on the backlight side.

Accordingly, in an embodiment, in a liquid crystal display device, the polymer film is included as an outer-side polarizing plate protective film positioned on the surface of the polarizer opposite to the surface facing the liquid crystal cell.

Furthermore, in another embodiment, in a liquid crystal display device, the polymer film is included as an inner-side polarizing plate protective film positioned between the polarizer and the liquid crystal cell.

According to an aspect of the present invention, a polymer film having excellent scratch resistance and transparency, more particularly, a polymer film having both high surface hardness and low haze can be provided. Furthermore, according to an aspect of the present invention, a polarizing plate having such a polymer film, and a liquid crystal display device having the polarizing plate can also be provided.

Other exemplary embodiments and advantages of the present invention may be ascertained by reviewing the present disclosure and the accompanying drawing(s).

BRIEF DESCRIPTION OF THE DRAWINGS

The present invention will be described in the following text by the exemplary, non-limiting embodiments shown in the drawing, wherein.

DETAILED DESCRIPTION OF THE EMBODIMENTS

Figure 1:
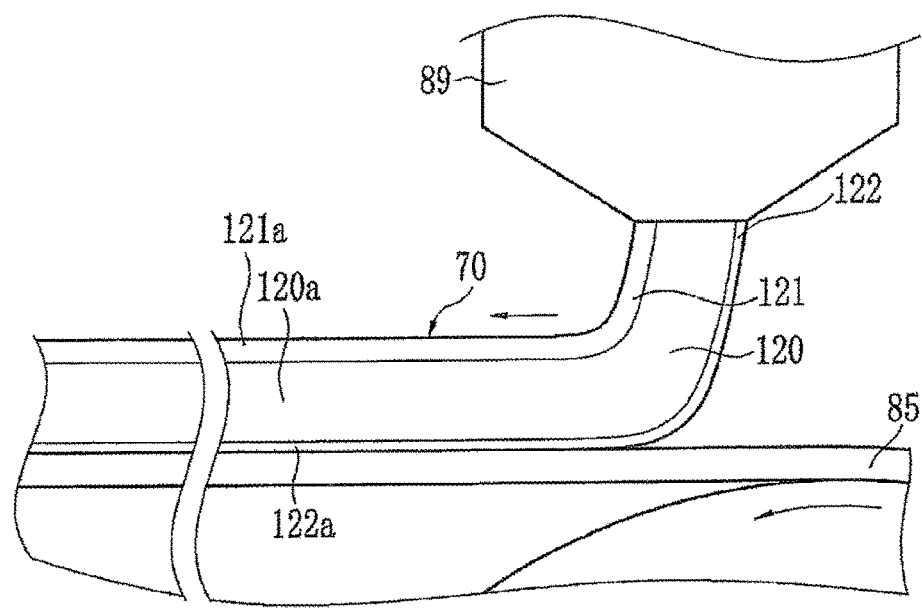
FIG. 1 is a schematic drawing (partially enlarged drawing) showing an example of a casting die to be used in a manufacturing method (co-casting) of a polymer film.

The contents of the present invention will be described in detail below. In the present invention and Specification of the present application, a range stated using the word "to" includes the preceding and succeeding numeric values as minimum and maximum values, respectively. In the present invention and Specification of the present application, the word "group" as in an alkyl group and the like, unless specifically stated otherwise, can be substituted or unsubstituted. When the number of carbon atoms in a group is specified, the number includes the number of carbon atoms present in any substituents.

In addition, examples of the substituents include substituents selected from the substituent group T below. Furthet nore, unless otherwise noted, the substituent in the present invention is a substituent selected from the substituent group T below.

Substituent Group T:

Alkyl groups (preferably having 1 to 20, more preferably having 1 to 12, most preferably having 1 to 8 carbon atoms, such as methyl groups, ethyl groups, isopropyl groups, tert-butyl groups, n-octyl groups, n-decyl groups, n-hexadecyl groups, cyclopropyl groups, cylopentyl groups, and cyclohexyl groups); alkenyl groups (preferably having 2 to 20, more preferably having 2 to 12, and most preferably having 2 to 8 carbon atoms, such as vinyl groups, allyl groups, 2-butenyl groups, and 3-pentenyl groups); alkynyl groups (preferably having 2 to 20, more preferably having 2 to 12, and most preferably having 2 to 8 carbon atoms, such as propargyl groups and 3-pentynyl groups); aryl groups (preferably having 6 to 30, more preferably having 6 to 20, and most preferably having 6 to 12 carbon atoms, such as phenyl groups, biphenyl groups, and naphthyl groups); amino groups (preferably having 0 to 20, more preferably having 0 to 10, and most preferably having 0 to 6 carbon atoms, such as amino groups, methylamino groups, dimethylamino groups, diethylamino groups, and dibenzylamino groups); alkoxy groups (preferably having 1 to 20, more preferably having 1 to 12, and most preferably having 1 to 8 carbon atoms, such as methoxy groups, ethoxy groups, and butoxy groups); aryloxy groups (preferably having 6 to 20, more preferably having 6 to 16, and most preferably having 6 to 12 carbon atoms, such as phenyloxy groups and 2-naphthyloxy groups); acyl groups (preferably having 1 to 20, more preferably having 1 to 16, and most preferably having 1 to 12 carbon atoms, such as acetyl groups, benzoyl groups, formyl groups, and pivaloyl groups); alkoxycarbonyl groups (preferably having 2 to 20, more preferably having 2 to 16, and most preferably having 2 to 12 carbon atoms, such as methoxycarbonyl groups and ethoxycarbonyl groups); aryloxycarbonyl groups (preferably having 7 to 20, more preferably having 7 to 16, and most preferably having 7 to 10 carbon atoms, such as phenyloxycarbonyl groups); acyloxy groups (preferably having 2 to 20, more preferably having 2 to 16, and most preferably having 2 to 10 carbon atoms, such as acetoxy groups and benzoyloxy groups); acylamino groups (preferably having 2 to 20, more preferably having 2 to 16, and most preferably having 2 to 10 carbon atoms, such as acetylamino groups and benzoyl amino groups); alkoxycarbonylamino groups (preferably having 2 to 20, more preferably having 2 to 16, and most preferably having 2 to 12 carbon atoms, such as methoxycarbonylamino groups); aryloxycarbonylamino groups (preferably having 7 to 20, more preferably having 7 to 16, and most preferably having 7 to 12 carbon atoms, such as phenyloxycarbonylamino groups); sulfonylamino groups (preferably having 1 to 20, more preferably having 1 to 16, and most preferably having 1 to 12 carbon atoms, such as methanesulfonylamino groups and benzenesulfonylamino groups); sulfamoyl groups (preferably having 0 to 20, more preferably having 0 to 16, and most preferably having 0 to 12 carbon atoms, such as sulfamoyl groups, methylsulfamoyl groups, dimethylsulfamoyl groups, and phenylsulfamoyl); carbamoyl groups (preferably having 1 to 20, more preferably having 1 to 16, and most preferably having 1 to 12 carbon atoms, such as carbamoyl groups, methylcarbamoyl groups, diethylcarbamoyl groups, and phenylcarbamoyl groups); alkylthio groups (preferably having 1 to 20, more preferably having 1 to 16, and most preferably having 1 to 12 carbon atoms, such as methylthio groups and ethylthio groups); arylthio groups (preferably having 6 to 20, more preferably having 6 to 16, and most preferably having 6 to 12 carbon atoms, such as phenylthio groups); sulfonyl groups (preferably having 1 to 20, more preferably having 1 to 16, and most preferably having 1 to 12 carbon atoms, such as mesyl groups and tosyl groups); sulfonyl groups (preferably having 1 to 20, more preferably having 1 to 16, and most preferably having 1 to 12 carbon atoms, such as methanesulfinyl groups and benzenesulfinyl groups); urethane groups; ureido groups (preferably having 1 to 20, more preferably having 1 to 16, and most preferably having 1 to 12 carbon atoms, such as ureido groups, methylureido groups, and phenylureido groups); phosphamide groups (preferably having 1 to 20, more preferably having 1 to 16, and most preferably having 1 to 12 carbon atoms, such as diethylphosphamide groups and phenylphosphamide groups); hydroxyl groups; mercapto groups; halogen atoms (such as fluorine atoms, chlorine atoms, bromine atoms, and iodine atoms); cyano groups; sulfo groups; carboxyl groups; nitro groups; hydroxam groups; sulfino groups; hydrazino groups; imino groups, heterocyclic groups (preferably having 1 to 30 and more preferably having 1 to 12 carbon atoms with hetero atoms in the form of, for example, nitrogen atoms, oxygen atoms, and sulfur atoms, specific examples being imidazolyl groups, pyridyl groups, quinolyl groups, furyl groups, piperidyl groups, morpholino groups, benzoxazolyl groups, benzoimidazolyl groups, and benzothiazolyl groups); and silyl groups (preferably having 3 to 40, more preferably 3 to 30, and most preferably, 3 to 24 carbon atoms, such as trimethylsilyl groups and triphenylsilyl groups).

These substituents can be further substituted. When two or more substituents are present, the two or more substituents can be identical or different. When possible, they can connect to form rings.

Furthermore, Rth, the thickness direction retardation is defined as the value obtained by the following method. As described above, in the present invention, Rth for obtaining Rth/d is the Rth at the wavelength of 590 nm. Hereinafter, $Re(\lambda)$ and $Rth(\lambda)$ will represent in-plane retardation at a wavelength $\lambda$ and thickness direction retardation, respectively.

$Re(\lambda)$ is measured by entering light of a wavelength $\lambda$ nm in the normal line direction in KOBRA 21ADH (manufactured by Oji Paper Co., Ltd.). When selecting the measurement wavelength $\lambda$, nm, the measurement can be performed by manually changing a wavelength selection filter, or converting a measurement value by a program or the like. In the case of $Rth(\lambda)$, the $Re(\lambda)$ is measured at total 6 points by entering light of a wavelength $\lambda$ nm from respective directions inclined at a step of 10 degrees from the normal line direction to 50 degrees on one side relative to the normal line direction of a film by using an in-plane slow axis (checked by KOBRA 21ADH) as an inclination axis (rotation axis) (when there is no slow axis, an arbitrary direction in the surface of the film is set to be a rotation axis) and KOBRA 21ADH calculates $Rth(\lambda)$ on the basis of the measured retardation value, a hypothetical value of average refractive index and an input thickness value. Rth can be calculated from equation (A) and equation (B) below, by measuring a retardation value from arbitrary two directions while setting a slow axis to be an inclination axis (rotation axis) (when there is no slow axis, an arbitrary direction in the surface of the film is set to be a rotation axis), and on the basis of the measured value, a hypothetical value of the average refractive index and input thickness value. "Polymer Handbook" (JOHN WILEY & SONS, INC), which is expressly incorporated herein by reference in its entirety, and catalog values of various optical films can be used as the hypothetical value of the average refractive index. As to a value in which an average refractive index is not known, the value can be measured with an Abbe refractometer. Values of the average refractive index of major optical films are exemplified below: cellulose acylate (1.48), cycloolefin polymer (1.52), polycarbonate (1.59), polymethyl methacrylate (1.49), and polystyrene (1.59). KOBRA 21ADH calculates nx, ny, and nz, by inputting these hypothetical values of average refractive index and thickness. From the calculated nx, ny, and nz, $Nz=(nx-nz)/(nx-ny)$ is further calculated.

$$Re(\theta) = \left[ nx - \frac{ny \times nz}{\sqrt{\left\{ny\sin\left(\sin^{-1}\left(\frac{\sin(-\theta)}{nx}\right)\right)\right\}^2 + \left\{nz\cos\left(\sin^{-1}\left(\frac{\sin(-\theta)}{nx}\right)\right)\right\}^2}} \right] \times \frac{d}{\cos\left\{\sin^{-1}\left(\frac{\sin(-\theta)}{nx}\right)\right\}} \qquad \text{Equation(A)}$$

In the above equation, the $Re(\theta)$ represents a retardation value in a direction inclined by an angle of $\theta$ from the normal line direction, each of nx, ny, and nz represents a refractive index in respective main axes orientation of an index ellipsoid, and d represents a film thickness.

$$Rth=((nx+ny)/2-nz)\times d \qquad \text{Equation (B)}$$

For the calculation, an average refractive index n is required as a parameter, and a value measured with an Abbe refractometer ("Abbe refractometer 2-T," manufactured by ATAGO CO., LTD.) was used.

Furthermore, as to values of $Re(\lambda)$ and $Rth(\lambda)$, measurement is performed using different wavelengths equal to or higher than 3 (for example, $\lambda$=479.2, 546.3, 628.3, 745.3 nm) with a measurement apparatus, and each of Re and Rth is calculated from respective wavelengths. These values are approximated using a Cauchy's equation (by the third term, $Re=A+B/\lambda^2+C/\lambda^4$) to thereby give values of A, B, C. The above, Re, Rth at the wavelength of $\lambda$ are plotted again, and from the plotted results, $Re(\lambda)$ and $Rth(\lambda)$ at respective wavelengths of $\lambda$ can be obtained.

The retardation can also be measured using AxoScan (by AXOMETRICS).

Polymer Film

The polymer film of an aspect of the present invention is a polymer film containing a carbonyl bond-containing polymer (hereinafter, also referred to simply as "polymer") and a compound having $\delta h$ of equal to or higher than 11.0 and $\delta\chi$ of equal to or lower than 1.50, wherein the $\delta h$ is a value of hydrogen-bonding capacity calculated by Hoy method and the $\delta\chi$ is a value calculated by the above equation 1.

The value of hydrogen-bonding capacity, $\delta h$, measured by the by method can serve as an index of forming ability of a hydrogen bond of a compound, and a higher value of $\delta h$ means that a hydrogen bond is easily formed with another compound. Details will be described later.

On the other hand, in equation 1 below:

$$\delta\chi = |x - 13.3|$$  Equation 1

In equation 1, $\chi$ represents an interatomic distance in the polymer film between atoms most distant from each other among molecules in the compound (excluding a hydrogen atom) calculated by molecular dynamics calculation. The $\chi$ to be calculated can be considered, in terms of molecular dynamics, to be the longest molecular length the compound can have in the polymer film. Furthermore, as described above, in terms of molecular dynamics, when a compound may exhibit a plurality of interatomic distances by a thermal motion and the like in a polymer film, it means the arithmetic average of a plurality of these interatomic distances. Accordingly, $\chi$ thus calculated can be considered to be the longest molecular length the compound can have at the highest frequency in the polymer film.

On the other hand, as to 13.3 in equation 1, the present inventors consider that the value of 13.3 shows a value close to the distance between polymer chains of a polymer containing a carbonyl bond (C=O) in the polymer film although the value is not completely equal to the distance. The present inventors consider that, in the polymer film, the compound enters between polymer chains of a carbonyl bond-containing polymer and interact with the polymer chains, which may contribute to improvement of the scratch resistance of the polymer film, more particularly, the surface hardness evaluated by a method shown in Examples described later. However, when molecular length of a compound is too long relative to the distance between the polymer chains, it may be estimated that the compound hardly enters between polymer chains, and the polymer chain and the compound hardly interact with each other, or that the compound widens the space between polymer chains to thereby lower the interaction between polymer chains with each other. In addition, a smaller value of $\delta\chi$ calculated by equation 1 means that $\chi$ is closer to the distance between polymer chains, and the present inventors estimate that a compound having the value that is equal to or lower than 1.50 may enter between polymer chains and interact with each other and can contribute to improvement of the surface hardness of the polymer film.

However, it is considered difficult to enhance the surface hardness of the polymer film by interaction, when a compound entering between polymer chains is a compound that is difficult to interact with the polymer. The present inventors estimate that, in contrast, a compound having the $\delta h$ equal to or higher than 11.0 easily interacts with a carbonyl bond-containing polymer and can enhance the surface hardness of the polymer film. The present inventors consider that a carbonyl bond-containing polymer can interact with the above-described compound, in a structure exhibiting polarization such as carbonyl (C=O) bond in a polymer chain.

Furthermore, regarding transparency of a polymer film, when the compound added to the polymer film is a compound that easily volatilizes from the film or a compound having high crystallinity and being easily precipitated in the polymer film, the film would get cloudy and thus haze would increase, resulting in deteriorated transparency. In contrast, the above-described compound is considered to easily interact with the polymer, and it is estimated that the compound has good compatibility with the polymer film because of the interaction. The present inventors consider that this can suppress the deterioration of transparency caused by the increase in haze.

The above is estimation by the present inventors regarding the fact that the provision of a polymer film excellent in both scratch resistance and transparency becomes possible by adding the above-described compound to a polymer film containing a carbonyl bond-containing polymer. However, the above is only estimation and does not limit the present invention at all.

<Compound Contained in Polymer Film>

(Hydrogen-Bonding Capacity $\delta h$ Measured by Hoy Method)

As described before, the value of hydrogen-bonding capacity, $\delta h$, is one that can be an index of forming ability of a hydrogen bond of a compound. In the present invention, the value of hydrogen-bonding capacity $\delta h$ is defined to refer to $\delta h$ obtained as to Amorphous Polymers described in paragraph "2) Method of Hoy (1985, 1989)," pp 214 to 220, in literature "Properties of Polymers $3^{rd}$, ELSEVIER, (1990)," and is calculated according to the description in the paragraph of the literature. The content of the above literature is expressly incorporated herein by reference in its entirety. A specific method of calculation will be shown in Examples described later. Typically, the value of hydrogen-bonding capacity $\delta h$ is a value represented as a dimensionless number, or a value described with an attached unit of $J^{1/2}/cm^{3/2}$. In the present invention, the value of hydrogen-bonding capacity $\delta h$ will be described as a dimensionless number.

The value of hydrogen-bonding capacity $\delta h$ of the above-described compound is equal to or higher than 11.0. The estimation by the present inventors regarding the fact that the incorporation of a compound having the value of hydrogen-bonding capacity $\delta h$ equal to or higher than 11.0 in a polymer film can provides a polymer film excellent in both scratch resistance and transparency is as described above. From the viewpoint of further improvement of scratch resistance and transparency, the value of hydrogen-bonding capacity $\delta h$ is equal to or higher than 11.5, preferably equal to or higher than 12.0, and further preferably equal to or higher than 12.5. Furthermore, the value of a hydrogen-bonding capacity $\delta h$ is, for example, equal to or lower than 18.0, but a higher one is more preferable and the upper limit is not particularly limited.

The value of hydrogen-bonding capacity $\delta h$ in a compound can be controlled, typically, by introducing a functional group capable of having a property of forming a hydrogen bond with another functional group, a so-called hydrogen-bonding capacity into a compound, or by the introduction amount of such a functional group. Examples of the functional groups can include groups selected from the following group consisting of $-X^2-(C=X^4)-X^3-$, $-NR^5-(SO_2)-$, $-CO-NR^6-CO-$, $-O-$, $-S-$, $-COOH$, $-CN$, $-NR^7R^8$, $-OH$, and $-SH$. Accordingly, the compound preferably contains at least one functional group selected from the above-described group per molecule. The number of groups selected from the above-described group contained in the compound is at least 1 per molecule, is preferably equal to or higher than 2, is more preferably 2 to 8, and is further preferably 2 to 6. In an embodiment, the compound can be a compound that does not contain a ring structure containing a hetero atom in the ring (hetero ring). Furthermore, in an embodiment, the compound can be a compound containing a hetero ring.

Each of the $X^2$ and $X^3$ independently represents single bond, $-NR^9-$, $-O-$ or $-(CR^{10}R^{11})m-$, each of $R^5$, $R^6$, $R^7$, $R^8$, $R^9$, $R^{10}$ and $R^{11}$ independently represents a hydrogen atom or an alkyl group which may be substituted, and m represents an integer equal to or higher than 1. A substituent included in the above-described substituent group T can be exemplified as a substituent in an alkyl group which may be substituented. In an embodiment, the alkyl group which may be substituented is preferably an alkyl group having 1 to 3 carbon atoms which may be substituented, more preferably an unsubstituted alkyl group having 1 to 3 carbon atoms, further preferably a methyl group, an ethyl group or an isopropyl group.

—$NR^9$— is preferably —NH—.

—$(CR^{10}R^{11})$m- is, more specifically, an alkylene group which may have been substituted by an alkyl group which may be substituented. The alkyl group is preferably an unsubstituted alkyl group, more preferably an unsubstituted alkyl group having 1 to 4 carbon atoms. In $CR^{10}R^{11}$, preferably at least one of $R^{10}$ and $R^{11}$ is a hydrogen atom, and both may be hydrogen atoms. m is an integer equal to or higher than 1, and is preferably an integer ranging from 1 to 3.

$X^4$ represents an oxygen atom or a sulfur atom, and preferably represents an oxygen atom.

The compound contains —O—C(=O)—NH— preferably in equal to or higher than 1 per molecule, more preferably in 1 to 8 as the group selected from the above-described group. In an embodiment, 2 or 3 is further preferable. In addition, in another embodiment, 2 to 4 is further preferable. Specific embodiments of compounds containing —O—C(=O)—NH— will be described later.

($\delta\chi$ Calculated by Equation 1)

In equation 1, $\chi$ represents an interatomic distance in the polymer film between atoms most distant from each other among molecules in the compound (excluding a hydrogen atom) calculated by molecular dynamics calculation. $\chi$ is a parameter representing a relative dimension of interatomic distances, and usually, is a value represented as a dimensionless number or represented with an attached arbitrary unit. In the present invention, $\chi$ and $\delta\chi$ calculated from $\chi$ are represented as a dimensionless number.

As described above, thus calculated $\chi$ can be considered to be the longest molecular length the compound can have in the polymer film at the highest frequency. According to a compound in which $\chi$ is calculated so that $\delta\chi$ measured by equation 1 becomes equal to or lower than 1.50, a polymer film excellent in both scratch resistance and transparency can be provided. The estimation by the present inventors regarding the point is as described above. From the viewpoint of further improvement of scratch resistance and transparency, $\delta\chi$ is preferably equal to or lower than 1.00, more preferably equal to or lower than 0.90. In addition, since $\delta\chi$ becomes zero when $\chi$=13.3, the lower limit of $\delta\chi$ is zero. From the viewpoint of further improvement of scratch resistance and transparency, $\delta\chi$ is preferably equal to or higher than 0.10, more preferably equal to or higher than 0.15.

The calculation of $\chi$ based in terms of molecular dynamics calculation is performed using a molecular dynamics (MD) calculation program that performs the calculation of $\chi$ by a molecular dynamics (MD) method. Such a calculation program is known, or calculation software can easily be available. As a calculation software, for example, a free software package for molecular dynamics simulation GROMCS (version 4.5.5) developed by University of Groningen can be used. A specific method of calculation will be shown in Example described later.

$\delta\chi$ represents an existence state of the compound in the polymer film, and is not necessarily determined only by values inherent to the compound, such as molecular weight. Depending on the kind of a carbonyl bond-containing polymer contained in a polymer film, a compound that can exist in the polymer in a state of giving $\delta\chi$ equal to or lower than 1.50 is preferably added to the polymer film, by performing calculation according to molecular dynamics calculation, as necessary, and then by carrying out selection on the basis of the obtained calculation value.

(Absorption Property)

Incidentally, as described above, an outer-side polarizing plate protective film and an inner-side polarizing plate protective film exist as a polarizing plate protective film in a liquid crystal display device. The outer-side polarizing plate protective film, among others, an outer polarizing plate protective film of a polarizing plate on the viewer-side is more frequently exposed to light entering from the display surface side of a liquid crystal display device than the inner-side polarizing plate protective film. Furthermore, the outer polarizing plate protective film of a polarizing plate on the backlight side is more frequently exposed to light entering from the backlight than the inner-side polarizing plate protective film Such an outer polarizing plate protective film is desirably hard to be deteriorated due to light, that is, desirably excellent in light resistance. This is because, for example, change in color of the polarizing plate protective film by light irradiation causes unintended tint addition of an image displayed on the display surface of the liquid crystal display device. From the viewpoint, the polymer film preferably does not have absorption for light in a wavelength region ranging from 280 to 800 nm, which is light to which the polymer film may be exposed when being used as a polarizing plate protective film of a liquid crystal display device. Details of not having absorption are the same as described above. In order to suppress absorption in the wavelength region, the number of aromatic rings having a structure that causes the absorption is desirably reduced. From the viewpoint, the number of aromatic rings contained per molecule of the compound is preferably 0 to 5, more preferably 0 to 3. On the other hand, from the viewpoint of surface hardness, the introduction of an aromatic ring into the compound is preferable, and thus the number of aromatic rings contained per molecule of the compound is not necessarily limited to the above-described range.

(Rth/d)

Regarding the inner-side polarizing plate protective film, in accordance with drive mode of a liquid crystal cell of a liquid crystal display device into which a polarizing plate including the film is incorporated, there is a case where the film has preferably optical isotropy and a case where the film has preferably optical anisotropy.

For example, an inner-side polarizing plate protective film of a polarizing plate that is incorporated into a liquid crystal display device in which the drive mode of the liquid crystal cell is IPS (In Plane Switching) mode, in an embodiment, the inner-side polarizing plate protective film can be excellent in optical isotropy. As an index of optical isotropy, the above-described Rth/d can be used. The Rth/d of the polymer film is, from the viewpoint of usefulness as a polymer film excellent in optical isotropy, preferably equal to or higher than −0.35 and equal to or lower than 0.35, more preferably equal to or higher than −0.20 and equal to or lower than 0.20.

Furthermore, depending on drive mode of a liquid crystal cell, there is a case where optical compensation by inner-side polarizing plate protective film is preferably examined. For example, for a polarizing plate to be incorporated into a liquid crystal display device in which the drive mode of the liquid crystal cell is VA (Vertical Alignment) mode, optical compensation by an inner-side polarizing plate protective film is preferably examined. In the case, the inner-side polarizing plate protective film preferably exhibits optical anisotropy. The Rth/d can be used also as an index of optical anisotropy. From the viewpoint of optical compensation by an inner-side polarizing plate protective film, Rth/d is preferably equal to or higher than 1.00 and equal to or lower than 5.50, more preferably equal to or higher than 1.50 and equal to or lower than 3.50.

Regarding the above point, in an embodiment, the compound makes it possible to provide a polymer film excellent in optical isotropy by the addition of the compound. Furthermore, in another embodiment, optical characteristics (optical isotropy/optical anisotropy) can be adjusted depending on the kind of polymer contained in the polymer film together with the compound. For example, in the case of a polymer film containing cellulose acylate as a carbonyl bond-containing polymer, the optical anisotropy can be achieved by adjusting the optical characteristics of the polymer film, depending on the substitution degree of cellulose acylate.

(Content of the Compound in Polymer Film)

The content of the compound in the polymer film is not particularly limited, and is preferably 1 to 50 parts by mass relative to 100 parts by mass of the polymer, more preferably 2 to 30 parts by mass, further more preferably 2 to 20 parts by mass, and particularly preferably 4 to 15 parts by mass. As to the compound, two or more kinds of the compounds having different structures may be added to the polymer film. The preferable range of the total content when two or more kinds of the compounds are added is the same as the above range.

Specific Embodiment 1 of the Above-Described Compound

The compound contained in the polymer film of the present invention is a compound having δh equal to or higher than 11.0, and δχ equal to or lower than 1.50, calculated by equation 1 between the compound and the polymer containing a carbonyl group coexisting in the polymer film. Specific embodiments of such compounds will be shown below, but the embodiments are only for explanation and do not limit the present invention at all.

Specific embodiments of the compounds can include compounds that are represented by formula (I) and have equivalent U equal to or lower than 515, which is obtained as U=[(molecular weight)/(number of a divalent linking group represented by —O—C(=O)—NH— contained per molecule)].

$$Q^1\text{-}(L^{12}\text{-}L^{11})_{n1}\text{-}O\text{---}C(=O)\text{---}NH\text{-}(L^{21}\text{-}L^{22})_{n2}\text{-}Q^2 \quad \text{Formula (I)}$$

(In formula (I), each of $L^{11}$ and $L^{21}$ independently represents an alkylene group, and the alkylene group may be substituented. Each of $L^{12}$ and $L^{22}$ independently represents a single bond or any one of or any combination of —O—, —NR$^1$—, —S— and R$^1$ represents a hydrogen atom or a substituent. Each of n1 and n2 independently represents an integer of 0 to 12, either n1 or n2 is an integer equal to or higher than 1, and, when $L^{11}$, $L^{12}$, $L^{21}$ and $L^{22}$ exist in plural number, they may be the same as or different from each other. Each of $Q^1$ and $Q^2$ independently represents a substituent, and at least one of $Q^1$ and $Q^2$ contains a ring structure.)

The alkylene group represented by each of $L^{11}$ and $L^{21}$ may be any of linear, branched and cyclic ones, or may be an alkylene group formed by linking one or more cyclic alkylene groups (cycloalkylene groups) and one or more linear or branched alkylene groups. Specific examples of linear or branched alkylene groups include a methylene group, an ethylene group, a propylene group, a butylene group, a pentylene group, a hexylene group, and the like. As a linear or branched alkylene group, an alkylene group having 1 to 20 carbon atoms is preferable, an alkylene group having 1 to 12 carbon atoms is more preferable, an alkylene group having 1 to 8 carbon atoms is further preferable, an alkylene group having 1 to 3 carbon atoms is particularly preferably, and a methylene group, an ethylene group or a propylene group is most preferable. As a cyclic alkylene group, a cyclohexylene group which may be substituented is preferable. The alkylene group may be substituented. The substituent group T is included, as a substituent the alkylene group may have. Among them, an alkyl group, an acyl group, an aryl group, an alkoxy group or a carbonyl group is preferable as a substituent of the alkylene group.

Preferably, the linear or branched alkylene group does not have a substituent. Preferably, a cyclic alkylene group has a substituent.

Each of $L^{12}$ and $L^{22}$ independently represents a single bond or any one of or any combination of —O—, —NR$^1$—, —S— and —C(=O)—, and among them, a single bond, an oxygen atom, —NR$^1$— or —C(=O)— is preferable. $R^1$ represents a hydrogen atom or a substituent. As the substituent, an alkyl group, an aryl group and an acyl group are included, and a hydrogen atom, an alkyl group having 1 to 8 carbon atoms, or an alkynyl group having 2 to 8 carbon atoms or an aryl group having 6 to 18 carbon atoms (for example, groups based on a benzene ring and a naphthalene ring) is preferable, and a hydrogen atom or an alkyl group having 1 to 4 carbon atoms is more preferable.

Each of $L^{12}$ and $L^{22}$ is, in an embodiment, preferably a single bond, —O—*, —OC(=O)—*, —C(=O)O—*, —NR$^1$—*, or —R$^1$N—*. Here, * represents a bonding position with $Q^1$ or $Q^2$, or a position for bonding with an adjacent group on the $Q^1$ or $Q^2$ side.

As specific examples of linking groups represented by -($L^{12}$-$L^{11}$)— ($L^{21}$-$L^{22}$)— or when $L^{12}$ and $L^{22}$ are —OC(=O)—* or —C(=O)O—*, structured represented by formula (2A) or (2C) below are exemplified.

As specific examples of linking groups represented by -($L^{12}$-$L^{11}$)- or -($L^{21}$-$L^{22}$)- when $L^{12}$ and $L^{22}$ are oxygen atoms, a structure represented by formula (2B) below is exemplified.

As specific examples of linking groups represented by -($L^{12}$-$L^{11}$)- or -($L^{21}$-$L^{22}$)- when $L^{12}$ and $L^{22}$ are —NR$^1$—OC(=O)—* or —NR$^1$—C(=O)O—*, structures represented by formula (2D) or (2E) below are exemplified.

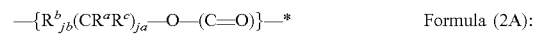  Formula (2A):

  Formula (2B):

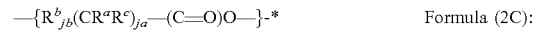  Formula (2C):

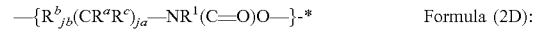  Formula (2D):

  Formula (2E):

(In formulas (2A) to (2E), * represents a bonding position with $Q^1$ or $Q^2$, or a position bonding with an adjacent group on the $Q^1$ or $Q^2$ side, each of $R^a$ and $R^c$ independently represents a hydrogen atom or an alkyl group (for example, and alkyl group having 1 to 3 carbon atoms, preferably a methyl group), ja represents an integer equal to or higher than 1, wherein an integer ranging from 1 to 3 is preferable. When $R^a$ and $R^c$ exist in plural number, plural $R^a$s and $R^c$s may be the same as or different from each other. $R^b$ represents a cycloalkylene group which may have been substituted by one or more alkyl groups having 1 to 3 carbon atoms, preferably a cyclohexylene group which may have been substituted by 1 to 3 alkyl groups having 1 to 3 carbon atoms, jb represents 0 or 1. $R^1$ represents a hydrogen atom or a substituent, and is preferably a hydrogen atom or an alkyl group having 1 to 4 carbon atoms, and the alkyl group is more preferably a methyl group. When $R^1$ exists in plural number, plural $R^1$s may be the same as or different from each other.)

In formulas (2A) to (2E), when the structure represented by —($CR^aR^c$)— is contained in equal to or higher than 2, preferably all $R^a$s and $R^c$s are hydrogen atoms, or at least either $R^a$ or $R^c$ is an alkyl group.

Specific examples of linking groups represented by formula (2A) include —C(CH$_3$)$_2$—O—(C=O)—, —CH$_2$CH$_2$—O—(C=O)—, —CH$_2$CH$_2$CH$_2$—O—(C=O)—, —CH$_2$CH(CH$_3$)—O—(C=O)—, —CH(CH$_3$)CH$_2$—O—(C=O)—, -(cyclohexylene group substituted by 1 to 3 alkyl groups having 1 to 3 carbon atoms)-CH$_2$—O—(C=O)—,
-(cyclohexylene group substituted by 1 to 3 alkyl groups having 1 to 3 carbon atoms)-CH$_2$CH$_2$—O—(C=O)—, -(cyclohexylene group substituted by 1 to 3 alkyl groups having 1 to 3 carbon atoms)-CH$_2$CH$_2$CH$_2$—O—(C=O)—, -(cyclohexylene group substituted by 1 to 3 alkyl groups having 1 to 3 carbon atoms)-CH$_2$CH(CH$_3$)—O—(C=O)—, -(cyclohexylene group substituted by 1 to 3 alkyl groups having 1 to 3 carbon atoms)-CH(CH$_3$)CH$_2$—O—(C=O)—, and the like.

Specific examples of linking groups represented by formula (2B) include a methyleneoxy group, an ethyleneoxy group, a propyleneoxy group, a branched butyleneoxy group, a branched pentyleneoxy group, a branched hexyleneoxy group, —C(CH$_3$)$_2$—O—, -(cyclohexylene group substituted by 1 to 3 alkyl groups having 1 to 3 carbon atoms)-CH$_2$—O—, -(cyclohexylene group substituted by 1 to 3 alkyl groups having 1 to 3 carbon atoms)-CH$_2$CH$_2$—O—,
-(cyclohexylene group substituted by 1 to 3 alkyl groups having 1 to 3 carbon atoms)-CH$_2$CH$_2$CH$_2$—O—,
-(cyclohexylene group substituted by 1 to 3 alkyl groups having 1 to 3 carbon atoms)-CH$_2$CH(CH$_3$)—O—,
-(cyclohexylene group substituted by 1 to 3 alkyl groups having 1 to 3 carbon atoms)-CH(CH$_3$)CH$_2$—O—, and the like.

Specific examples of linking groups represented by formula (2C) include —C(CH$_3$)$_2$—(C=O)—O—, —CH$_2$CH$_2$—(C=O)—O—, —CH$_2$CH$_2$CH$_2$—(C=O)—O—, —CH$_2$CH(CH$_3$)—(C=O)—O—, —CH(CH$_3$)CH$_2$—(C=O)—O—,
-(cyclohexylene group substituted by 1 to 3 alkyl groups having 1 to 3 carbon atoms)-CH$_2$—(C=O)—O—,
-(cyclohexylene group substituted by 1 to 3 alkyl groups having 1 to 3 carbon atoms)-CH$_2$CH$_2$—(C=O)—O—,
-(cyclohexylene group substituted by 1 to 3 alkyl groups having 1 to 3 carbon atoms)-CH$_2$CH$_2$CH$_2$—(C=O)—O—,
-(cyclohexylene group substituted by 1 to 3 alkyl groups having 1 to 3 carbon atoms)-CH$_2$CH(CH$_3$)—(C=O)—O—,
-(cyclohexylene group substituted by 1 to 3 alkyl groups having 1 to 3 carbon atoms)-CH(CH$_3$)CH$_2$—(C=O)—O—, and the like.

Specific examples of linking groups represented by formula (2D) include -(cyclohexylene group substituted by 1 to 3 alkyl groups having 1 to 3 carbon atoms)-CH$_2$—NR$^1$(C=O)O—, —CH$_2$—NR$^1$(C=O)—O—, —CH$_2$CH$_2$—NR$^1$(C=O)—O—, —CH$_2$CH$_2$CH$_2$—NR$^1$(C=O)—O—, —CH$_2$CH(CH$_3$)—NR$^1$(C=O)—O—, —CH(CH$_3$)CH$_2$—NR$^1$(C=O)—O—, and the like.

Specific examples of linking groups represented by formula (2E) include -(cyclohexylene group substituted by 1 to 3 alkyl groups having 1 to 3 carbon atoms)-CH$_2$—O—(C=O)NR$^1$—, —CH$_2$—NR$^1$(C=O)—O—, —CH$_2$CH$_2$—NR$^1$(C=O)—O—, —CH$_2$CH$_2$CH$_2$—NR$^1$(C=O)—O—, —CH$_2$CH(CH$_3$)—NR$^1$(C=O)—O—, —CH(CH$_3$)CH$_2$—NR$^1$(C=O)—O—, and the like.

Preferable embodiments of linking groups represented by ($L^{12}$-$L^{11}$) and ($L^{21}$-$L^{22}$) include an alkylene group and groups represented by any of formulas (2A) to (2E). In an embodiment, a more preferable embodiment includes an alkylene group, or the group represented by formula (2A) or (2B). In another embodiment, a more preferable embodiment includes the group represented by formula (2D) or (2E). ($L^{12}$-$L^{11}$) and ($L^{21}$-$L^{22}$) are alkylene groups means that each of $L^{11}$ and $L^{21}$ represents an alkylene group, and each of $L^{12}$ and $L^{22}$ represents a single bond. In formula (I), when n1 and n2 are integers equal to or higher than 2, (that is, an integer ranging from 2 to 12), in formula (I), a plurality of ($L^{12}$-$L^{11}$)s, ($L^{21}$-$L^{22}$)s is contained. In this case, a plurality of ($L^{12}$-$L^{11}$)s and a plurality of ($L^{21}$-$L^{22}$)s may have the same structure or different structures. Preferably, in a plurality of ($L^{12}$-$L^{11}$)s and a plurality of ($L^{21}$-$L^{22}$)s, a combination of an alkylene group and one or more groups represented by any of formulas (2A) to (2E) is contained.

Each of $Q^1$ and $Q^2$ independently represents a substituent, and at least one of $Q^1$ and $Q^2$ includes a ring structure.

The substituent includes the substituent group T, and includes an aryl group having 6 to 30 (more preferably 6 to 20, further preferably 6 to 10) carbon atoms, an alkyl group having 1 to 12 (more preferably 1 to 10, further preferably 1 to 5) carbon atoms (an oxygen atom may lie in an alkyl chain), and an alkoxy group having 1 to 12 (more preferably 1 to 10, further preferably 1 to 5) carbon atoms. $Q^1$ and $Q^2$ may additionally have a substituent, including the substituent group T as a specific example of a substituent, and an aryl group, an alkyl group or acyl group is preferable. The aryl group means an aromatic hydrocarbon group.

Examples of ring structures contained in one of or in both of $Q^1$, $Q^2$ include an aliphatic ring (such as a cyclohexane ring), an aromatic ring (such as a benzene ring and a naphthalene ring), and the like, which may have a plurality kind of rings or may be a condensed ring. In an embodiment, preferably, the ring structure is not a cyclic imide group. In another embodiment, one of or both of $Q^1$ and $Q^2$ can be a substituent other than a polar group. In the present invention, a polar group is defined as a substituent having a C log P value equal to or lower than 0.85.

In the present invention, "P" in C log P represents a distribution coefficient in an n-octanol-water system, and can be measured using n-octanol and water, but as to these distribution coefficients, an estimated value can also be obtained using a C log P value estimation program (C LOG P program installed in PC Models of Daylight Chemical Information Systems). The C log P value is calculated as one belonging to a compound. For the calculation, a residue being an object for which C log P is to be obtained is input as a complete molecule, not as a radical or an ion. For example, residues $B^1$ and $B^2$ are determined as a $B^1$—H or $B^2$—H part together with a hydrogen atom. Even for a compound having a structure that does not exist practically, a C log P value can be obtained as a value estimated by a calculating chemical method or an experimental method.

In the present specification, C log P values of $Q^1$, $Q^2$ are obtained as C log P values of compounds $Q^1$-H, $Q^2$-H, which are obtained by linking these substituents to a hydrogen. Even when the compound is a compound having a structure that does not exist practically, a C log P value can be obtained as a value estimated by computational chemistry techniques or based on empirical methods. Specific examples of substituents having a C log P value equal to or lower than 0.85 include a cyano group and an imide group.

The ring structure contained in one of or both of $Q^1$ and $Q^2$ are preferably an aliphatic carbon ring or an aromatic carbon ring, more preferably a cyclohexane ring or benzene ring, and further preferably a benzene ring. From the viewpoint of improving the surface hardness of a cellulose acylate film, compounds represented by formula (I) contains preferably 2 to 4 cyclohexane rings or benzene rings per molecule, more preferably 2 or 3. Furthermore, from the viewpoint of improving the surface hardness of a cellulose acylate film, a ring structure contained as a molecule terminal group is preferably bonded with a main chain part via a divalent linking group selected from the group consisting of —O—C(=O)—, —C(=O)— and —O—. From the same viewpoint, a benzene ring is preferably contained in $Q^1$ or $Q^2$ as a molecule terminal group. When the ring structure has a substituent, an alkyl group having 1 to 3 carbon atoms or an alkoxy group having 1 to 3 carbon atoms is preferable as the substituent.

Alternatively, preferably, $Q^1$ is a monovalent substituent represented by formula (a) below or a substituent in which one or more of the monovalent substituents are bonded with $L^2$ via a linking group.

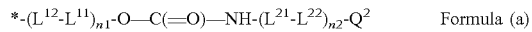
\*-(L$^{12}$-L$^{11}$)$_{n1}$-O—C(=O)—NH-(L$^{21}$-L$^{22}$)$_{n2}$-Q$^2$     Formula (a)

Alternatively, preferably, $Q^2$ is a monovalent substituent represented by formula (b) below or a substituent in which one or more of the monovalent substituents are bonded with $L^4$ via a linking group.

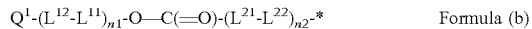
Q$^1$-(L$^{12}$-L$^{11}$)$_{n1}$-O—C(=O)-(L$^{21}$-L$^{22}$)$_{n2}$-\*     Formula (b)

More specifically, the compound represented by formula (I) preferably has a structure represented by -(L$^{12}$-L$^{11}$)$_{n1}$-O—C(=O)—NH-(L$^{21}$-L$^{22}$)$_{n2}$- in equal to or higher than 2 per molecule. In the formulas (a), (b), L$^{11}$ to L$^{22}$, n1, n2, Q$^1$ and Q$^2$ have the same meaning as those in formula (I).

Specific embodiments of compounds according to the above-described preferable embodiments will be described later. Examples of the linking groups include those described regarding $Z^1$ in formula (I-1).

The compound represented by formula (I) may have one or more divalent linking groups represented by —NH—C(=O)—O—, or may have two or more divalent linking groups. The number of divalent linking groups represented by —NH—C(=O)—O— is preferably 1 to 6. In an embodiment, and the number is more preferably 2 or 3. In another embodiment, the number is further preferably 2 to 4.

Alternatively, in another embodiment, compounds represented by formula (I) may contain, in addition to a divalent linking group represented by —NH—C(=O)—O—, a divalent linking group represented by —NR$^1$—C(=O)—O—. The compound can have the divalent linking group represented by —NH—C(=O)—O— and the divalent linking group represented by —NR$^1$—C(=O)—O—, for example, in 2 to 6 in total, and preferably has these in 2 to 4.

The compound represented by formula (I) does not contain, in an embodiment, a divalent linking group represented by —NR$^1$—C(=O)—NR$^1$— in parts other than a ring structure. Details of R$^1$ are as described above. The same also applies to compounds represented by respective formulas to be described in detail below.

The compound represented by formula (I) has an equivalent U equal to or lower than 515, the U being obtained as U=[(molecular weight)/(number of a divalent linking group represented by —O—C(=O)—NH— contained per molecule).

The equivalent U means that the smaller the value, the higher the content ratio of a divalent linking group represented by —O—C(=O)—NH— per molecule. The equivalent U is preferably equal to or lower than 450, more preferably equal to or lower than 420, and further preferably equal to or lower than 300. The lower limit is not particularly limited, and for example, is equal to or higher than 100. A preferable embodiment of the compound represented by formula (I) does not contain a group represented by —NH—C(=O)—NR— or —NR—C(=O)—NH— in the molecule. Here, R represents a hydrogen atom or a substituent. Examples of the substituents include those exemplified as the substituent group T. Furthermore, the compound represented by fat Hula (I), in an embodiment, more preferably, does not contain a structure represented by "-aromatic ring-NH—C(=O)—O—." The structure makes it possible for a cellulose acylate film to suppress exhibiting light colorability. In another embodiment, the compound represented by formula (I) may contain a structure represented by "-aromatic ring-NH—C(=O)—O—".

Each of n1 and n2 independently represents an integer of 0 to 12, and either n1 or n2 is an integer equal to or higher than 1. Each of n1 and n2 is preferably an integer of 0 to 5, further preferably an integer of 0 to 3.

The compound represented by formula (I) is preferably a compound represented by formula (I-1) below.

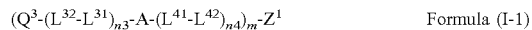
(Q$^3$-(L$^{32}$-L$^{31}$)$_{n3}$-A-(L$^{41}$-L$^{42}$)$_{n4}$)$_m$-Z$^1$     Formula (I-1)

(In formula (I-1), each of $L^{31}$ and $L^{41}$ independently represents an alkylene group, and the alkylene group may be substituented. Each of $L^{32}$ and $L^{42}$ independently represents a single bond, or any one of or any combination of —O—, —NR$^1$—, —S— and —C(=O)—. R$^1$ represents a hydrogen atom or a substituent. Each of n3 and n4 independently represents an integer of 0 to 20, either n3 or n4 is an integer equal to or higher than 1, and when $L^{31}$, $L^{32}$, $L^{41}$ and $L^{42}$ exist in plural number, they may be the same as or different from each other. $Q^3$ represents a substituent, $Z^1$ represents an m-valent linking group, and A represents \*—O—C(=O)—NH— or \*—NH—C(=O)—O— (\* represents a bonding position with $L^{41}$). m represents an integer of 2 to 6, and $Q^3$ and A existing in plural number may be the same as or different from each other, respectively. In addition, at least one of $Q^3$ and $Z^1$ contains a ring structure.)

Each of $L^{31}$ and $L^{41}$ independently has the same meaning as that of each of $L^{11}$ and $L^{21}$ in formula (I). Preferably, at least either $L^{31}$ or $L^{41}$ is an alkylene group having the same meaning as that of $L^{11}$ and $L^{21}$ in formula (I), and more preferably, both of these are alkylene groups having the same meaning as both of $L^{11}$ and $L^{21}$ in formula (I).

Each of $L^{32}$ and $L^{42}$ independently has the same meaning as that of each of $L^{12}$ and $L^{22}$ in formula (I), and the same also applies to the preferable range.

In particular, the linking group represented by ($L^{41}$-$L^{42}$) is preferably a single bond or an alkylene group, and a linking group represented by ($L^{32}$-$L^{31}$) is preferably a single bond, an alkylene group, or a group represented by any of formulas (2A) to (2E) below. Details of formulas (2A) to (2E) are the same as those described above.

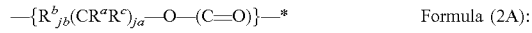
—{R$^b_{jb}$(CR$^a$R$^c$)$_{ja}$—O—(C=O)}—\*     Formula (2A):

—{R$^b_{jb}$(CR$^a$R$^c$)$_{ja}$—O}—\*     Formula (2B):

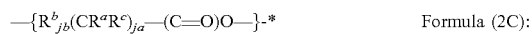
—{R$^b_{jb}$(CR$^a$R$^c$)$_{ja}$—(C=O)O—}-\*     Formula (2C):

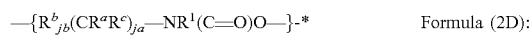
—{R$^b_{jb}$(CR$^a$R$^c$)$_{ja}$—NR$^1$(C=O)O—}-\*     Formula (2D):

—{R$^b_{jb}$(CR$^a$R$^c$)$_{ja}$—O—(C=O)NR$^1$}—\*     Formula (2E):

(In formulas (2A) to (2E), \* represents a bonding position with $Q^3$ or $Z^1$, or a position bonded with an adjacent group on the $Q^3$ or $Z^1$ side, and details of $R^a$ and the like are the same as those described above.)

n3 and n4 have the same meaning as that of n1 and n2 in formula (I), and the same also applies to the preferable range.

m represents an integer of 2 to 6, and an integer of 2 to 3 is preferable.

$Q^3$ represents a substituent, is preferably a linear or branched alkyl group having 1 to 30 carbon atoms or a cyclic group having 6 to 30 carbon atoms, and is preferably consisting of a cyclic group alone. $Q^3$ may further have a substituent. Specific examples of the substituent include the substituent group T, and an aryl group, an alkyl group, an acyl group or an alkoxy group is preferable. However, preferably $Q^3$ does not have a substituent.

A cyclic group contained in $Q^3$ may be a condensed ring, but a monocyclic ring is more preferable. Specific examples include an aliphatic ring (such as cyclohexane ring), an aromatic ring (such as a benzene ring, a naphthalene ring), and the like, and an aromatic ring is preferable, an aromatic carbon ring is more preferable.

As $Q^3$, an aryl group having 6 to 30 (more preferably 6 to 20, further preferably 6 to 10) carbon atoms is preferable or an aryl group having 5 to 30 (more preferably 6 to 20, further preferably 6 to 10) carbon atoms is further more preferable, and a benzene ring is particularly preferable.

In m $Q^3$s, any of them preferably contains a ring structure, all of them preferably contain a ring structure, and an aromatic group is more preferably contained.

At least one of $Q^3$ and $Z^1$ contains one or more ring structures, and more preferably both of $Q^3$ and $Z^1$ contain a ring structure. Furthermore, one or both of $Q^3$ and $Z^1$ contain a ring structure, preferably have 2 to 4 ring structures per molecule in total, and more preferably have 2 or 3 ring structures.

A represents *—O—C(=O)—NH— or *—NH—C(=O)—O— (* represents a bonding position with $L^{41}$).

$Z^1$ represents an m-valent linking group, and is preferably a di- to hexa-valent linking group, more preferably a di- to tri-valent linking group, and further more a divalent linking group. $Z^1$ is preferably a group containing at least one of a linear, branched or circular aliphatic group and an aromatic group, more preferably a group containing at least one of a branched or cyclic aliphatic group and an aromatic group.

$Z^1$ may consist of at least one of a linear, branched or cyclic aliphatic group and an aromatic group alone, or also preferably, $Z^1$ is a combination of these groups and an oxygen atom and/or a linear or branched alkylene group. An aliphatic group contained as $Z^1$ is preferably a saturated aliphatic group.

The formation of a group containing at least one of a branched or cyclic aliphatic group and an aromatic group brings about a rigid structure, and thus incorporation of the compound tends to further improve the surface hardness of the film. The number of carbon atoms constituting $Z^1$ is preferably 2 to 20, more preferably 4 to 15.

$Z^1$ may be substituented, and specific examples of the substituents include the substituent group T, but $Z^1$ preferably has no substituent.

Specifically, linking groups exemplified below are preferable. * represents a position at which the group is bonded with $L^{41}$.

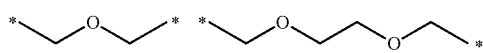

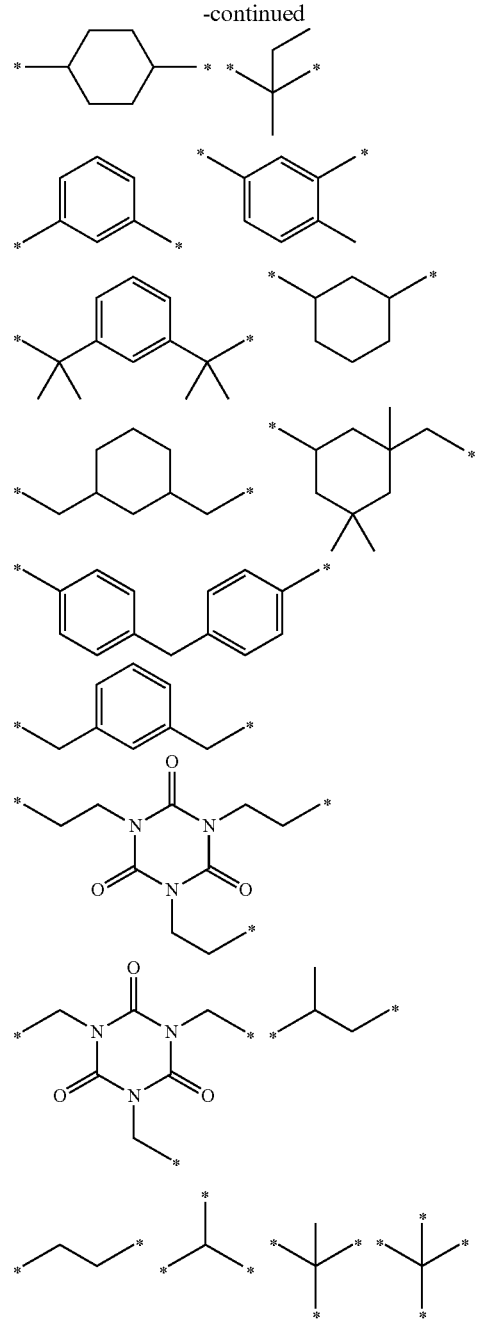

-continued

The compound represented by formula (I-1) preferably contains an aliphatic carbon ring or aromatic carbon ring as a ring structure. Furthermore, in compounds represented by formula (I-1), preferably either all $Q^3$s contain an aromatic group (preferably a benzene ring) or $Z^1$ has a cyclic aliphatic group or aromatic group, more preferably either all $Q^3$s consist of an unsubstituted aromatic group (preferably an unsubstituted benzene ring) or $Z^1$ has a linear or cyclic aliphatic group, further more preferably either all $Q^3$s consist of an unsubstituted aromatic ring group (preferably an unsubstituted benzene ring) or $Z^1$ consists of alicyclic group, and particularly preferably all $Q^3$s consist of an unsubstituted aromatic group (preferably an unsubstituted benzene ring) and $Z^1$ consists of a linear aliphatic group or an alicyclic group.

The compound represented by formula (I) is preferably a compound represented by formula (I-2) below.

$$(Q^4\text{-}(L^{52}\text{-}L^{51})_{n5}\text{-}A\text{-}(L^{61}\text{-}L^{62})_{n6})_{m1}\text{-}Z^2 \qquad \text{Formula (I-2)}$$

(In formula (I-2), each of $L^{51}$ and $L^{61}$ independently represents an alkylene group, and the alkylene group may be substituented. $L^{52}$ and $L^{62}$ represent either a single bond or any one of or any combination of —O—, —NR$^1$—, —S—, and —C(=O)—. R$^1$ represents a hydrogen atom or a substituent. n5 and n6 each represents an integer of 0 to 12, and either n5 or n6 is an integer equal to or higher than 1, and when $L^{51}$, $L^{52}$, $L^{61}$ and $L^{62}$ exist in plural number, they may be the same as or different from each other. Q$^4$ represents a substituted or unsubstituted phenyl group, a substituted or unsubstituted cyclohexyl group, a methyl group, an ethyl group, a propyl group, an isopropyl group or a t-butyl group, Z$^2$ represent a group containing at least one of a linear, branched or cyclic aliphatic group and an aromatic group, A represents *—O—C(=O)—NH— or *—NH—C(=O)—O— (* represents a bonding position with $L^{61}$). m1 represents an integer of 2 or 3, and Q$^4$ and A each exists in plural number may be the same as or different from each other, respectively. Furthermore, at least one of Z$^2$ and Q$^4$ existing in plural number includes a ring structure.)

Each of $L^{51}$ and $L^{61}$ independently has the same meaning as that of each of $L^{11}$ and $L^{21}$ in formula (I), and the same also applies to the preferable range.

Each of $L^{52}$ and $L^{62}$ independently has the same meaning as that of each of $L^{12}$ and $L^{22}$ in formula (I), and the same also applies to the preferable range.

In particular, the linking group represented by ($L^{61}$-$L^{62}$)) is preferably a single bond or an alkylene group. The linking group represented by ($L^{52}$-$L^{51}$) is preferably a single bond, an alkylene group, or a group represented by any of formulas (2A) to (2E) below. Details of formulas (2A) to (2E) are as those described above.

—{R$^b_{jb}$(CR$^a$R$^c$)$_{ja}$—O—(C=O)}—*    Formula (2A):

—{R$^b_{jb}$(CR$^a$R$^c$)$_{ja}$—O}—*    Formula (2B):

—{R$^b_{jb}$(CR$^a$R$^c$)$_{ja}$—(C=O)O—}-*    Formula (2C):

—{R$^b_{jb}$(CR$^a$R$^c$)$_{ja}$—NR$^1$(C=O)O—}-*    Formula (2D):

—{R$^b_{jb}$(CR$^a$R$^c$)$_{ja}$—O—(C=O)NR$^1$}—*    Formula (2E):

(In formulas (2A) to (2E), * represents a bonding position with Q$^4$ or Z$^2$, or a position for bonding with an adjacent group on the Q$^4$ or Z$^2$ side, and details of R$^a$ etc. are the same as those described above.)

Q$^4$ represents a substituted or unsubstituted phenyl group, a substituted or unsubstituted cyclohexyl group, a methyl group, an ethyl group, a propyl group, an isopropyl group or a t-butyl group. In formula (I-2), since m1 represents an integer of 2 or 3, in a compound represented by formula (I-2), there exists a plurality of (m) Q$^4$s. At least one of the plurality of Q$^4$s and Z$^2$s contains a ring structure.

A phenyl group represented by Q$^4$ may be substituented, or may be unsubstituted, and is preferably an unsubstituted phenyl group.

A cyclohexyl group represented by Q$^4$ may also have a substituent, or may be unsubstituted, and is preferably an unsubstituted cyclohexyl group.

Specific examples of substituents which may be substituted in the phenyl group or the cyclohexyl group include the substituent group T.

The substitution site of the substituent group. T is not particularly limited, and any of an ort-, metha- and para-sites may be substituted. The substituent is preferably a halogen atom, an alkyl group or an alkoxy group, more preferably an alkyl group having 1 to 3 carbon atoms or an alkoxy group having 1 to 3 carbon atoms.

More preferable examples of Q$^4$ include an unsubstituted phenyl group, an unsubstituted cyclohexyl group and a methyl group.

Z$^2$ is a group containing at least one of a branched or cyclic aliphatic group and an aromatic group, preferably a group containing at least one of a cyclic aliphatic group and an aromatic group, particularly preferably a group containing a cyclic aliphatic group. A ring structure contained in Z$^2$ is preferably an aliphatic carbon ring or an aromatic carbon ring.

Z$^2$ may consist of at least one of a branched or cyclic aliphatic group and an aromatic group alone, or Z$^2$ is also preferably a combination of these groups and an oxygen atom or a linear or branched alkylene group. The aliphatic group contained as Z$^2$ is preferably a saturated aliphatic group.

The number of carbon atoms constituting Z$^2$ is preferably 3 to 20, more preferably 4 to 15.

Z$^2$ may be substituented, and examples of the substituents include the substituent group T, but Z$^2$ preferably does not have a substituent.

Specific examples of Z$^2$ include groups containing at least one of a branched or cyclic aliphatic group and an aromatic group in the above-described Z$^1$.

n5 and n6 have the same meaning as that of n1, n2 in formula (I), and the same also applies to the preferable range.

m1 represents an integer of 2 to 3, and is preferably 2.

Examples of preferable embodiments of the compound represented by formula (I) include a compound represented by formula (I-3) below.

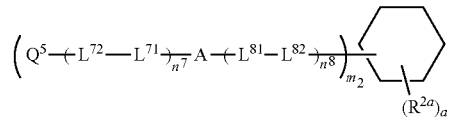

Formula (I-3)

(In formula (I-3), each of $L^{71}$ and $L^{81}$ independently represents an alkylene group, and the alkylene group may be substituented. Each of $L^{72}$ and $L^{82}$ independently represents a single bond or any one of or any combination of —O—, —NR$^1$—, —S— and —C(=O). R$^1$ represents a hydrogen atom or a substituent. Each of n7 and n8 independently represents an integer of 0 to 12, either n7 or n8 is an integer equal to or higher than 1, and when $L^{71}$, $L^{72}$, $L^{81}$ and $L^{82}$ exist in plural number, they may be the same as or different from each other. Q$^5$ represent a substituted or an unsubstituted phenyl group, a substituted or unsubstituted cyclohexyl group, a methyl group, an ethyl group, a propyl group, an isopropyl group or a t-butyl group. A represents *—O—C(=O)—NH— or *—NH—C(=O)—O— (* represents a bonding position with $L^{81}$), and R$^{2a}$ represents an alkyl group having 1 to 3 carbon atoms. m2 represents an integer of 2 or 3, and Q$^5$ and A existing in plural number may be the same as or different from each other, respectively. a represents an integer of 0 to 10, and, when a is an integer equal to or higher than 1, R$^{2a}$ existing in plural number may be the same as or different from each other.)

Each of $L^{71}$ and $L^{81}$ independently has the same meaning as that of each of $L^{11}$ and $L^{21}$ in formula (I), and the same also applies to the preferable range.

Each of $L^{72}$ and $L^{82}$ independently has the same meaning as that of each of $L^{12}$ and $L^{22}$ in formula (I), and the same also applies to the preferable range.

Each of n7 and n8 independently has the same meaning as that of each of n1 and n2 in formula (I), and the same also applies to the preferable range.

A linking group represented by ($L^{72}$-$L^{71}$) has the same meaning as that of the linking group represented by ($L^{52}$-$L^{51}$) in formula (I-2), and the same also applies to the preferable range.

A linking group represented by ($L^{81}$-$L^{82}$) has the same meaning as that of the linking group represented by ($L^{62}$-$L^{61}$) in formula (I-2), and the same also applies to the preferable range.

Among them, in formula (I-3), the linking group represented by ($L^{72}$-$L^{71}$) and the linking group represented by ($L^{81}$-$L^{82}$) are, in an embodiment, preferably the linking group represented by the above-described formula (2A) or formula (2B). In another embodiment, the linking group represented by the above-described formula (2D) or formula (2E) is preferable.

$R^{2a}$ represents an alkyl group having 1 to 3 carbon atoms and includes a methyl group, an ethyl group, a propyl group, an isopropyl group, and the like. $R^{2a}$ is preferably a methyl group.

m2 represents an integer of 2 or 3, and is preferably 2. a represents an integer of 0 to 10, and is preferably 0 to 6 because the effect of the present invention is effectively expressed.

$Q^5$ has the same meaning as that of $Q^4$ in formula (I-2), and the same also applies to the preferable range.

Specific examples of bonding positions of 2 or 3 side chains in the cyclohexane ring in formula (I-3) include the position described below.

described below is a position to be linked with a side chain below.

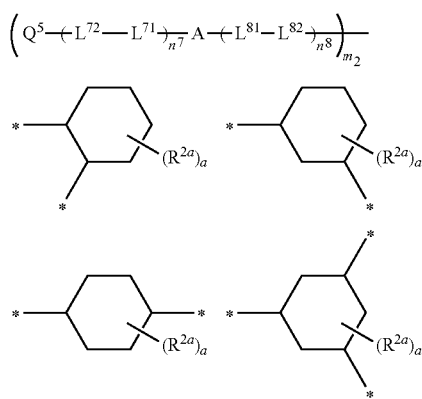

The cyclohexane ring preferably has a structure shown below.

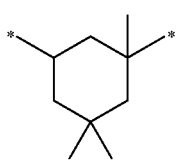

In formula (I-3), when $Q^5$ is a substituted or unsubstituted phenyl group, a compound represented by formula (I-3) is represented by formula (I-3-1) below.

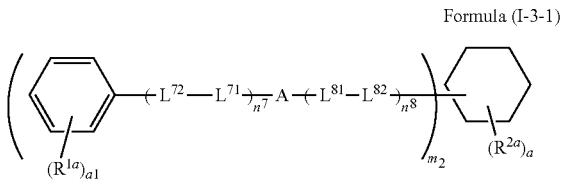

Formula (I-3-1)

(In formula (I-3-1), $R^{1a}$ represents an alkyl group having 1 to 3 carbon atoms or an alkoxy group having 1 to 3 carbon atoms. a1 represents an integer of 0 to 5, and when a1 is an integer equal to or higher than 1, $R^{1a}$ existing in plural number may be the same as or different from each other. $L^{71}$, $L^{72}$, $L^{81}$, $L^{82}$, n7, n8, m2, $R^{2a}$ and a each has the same meaning as that in formula (I-3), and the same also applies to the preferable range.)

$R^{1a}$ represents an alkyl group having 1 to 3 carbon atoms or an alkoxy group having 1 to 3 carbon atoms and includes a methyl group, an ethyl group, a propyl group, an isopropyl group, a methoxy group, an ethoxy group and the like, and is preferably a methyl group or a methoxy group.

a1 represents an integer of 0 to 5, and is preferably 0 to 3, more preferably 0.

Examples of preferable embodiments of the compound represented by formula (I) also include a compound represented by formula (I-4) below.

$$\left(Q^5 + L^{72} - L^{71}\right)_{n7} A + L^{81} - L^{82}\right)_{n8}\right)_{m2} \underset{(R^{2b})_b}{\bigcirc}$$

Formula (I-4)

In formula (I-4), each of $Q^5$, $L^{71}$, $L^{72}$, $L^{81}$, $L^{82}$, A, n7, n8 and m2 has the same meaning as that in formula (I-3). $R^{2b}$ represents an alkyl group having 1 to 3 carbon atoms. b represents an integer of 0 to 5, and when b is an integer equal to or higher than 1, $R^{2b}$ existing in plural number may be the same as or different from each other.

In formula (I-4), the linking group represented by ($L^{72}$-$L^{71}$)$_{n7}$ has the same meaning as that of the linking group represented by ($L^{52}$-$L^{51}$)$_{n5}$ in formula (I-2), and the same also applies to the preferable range.

In formula (I-4), the linking group represented by ($L^{81}$-$L^{82}$)$_{n8}$ has the same meaning as that of ($L^{62}$-$L^{61}$)$_{n6}$ in formula (I-2), and the same also applies to the preferable range.

Among them, in formula (I-4), the linking group represented by ($L^{72}$-$L^{71}$) and the linking group represented by ($L^{81}$-$L^{82}$) are, in an embodiment, preferably the linking group represented by the above-described formula (2A) or formula (2B). In another embodiment, linking group represented by the above-described formula (2D) or formula (2E) is preferable.

In formula (I-4), a preferable range of $Q^5$, A and m2 is the same as that in formula (I-3), respectively.

$R^{2b}$ represents an alkyl group having 1 to 3 carbon atoms and includes a methyl group, an ethyl group, a propyl group, an isopropyl group, and the like. $R^{2b}$ is preferably a methyl group.

b represents an integer of 0 to 5, and is more preferably 0 to 2, further preferably 0 from the viewpoint of light resistance.

Specific examples of bonding positions of 2 or 3 side chains in a benzene ring in formula (I-4) include the position described below.

described below is a position to be linked with a side chain below.

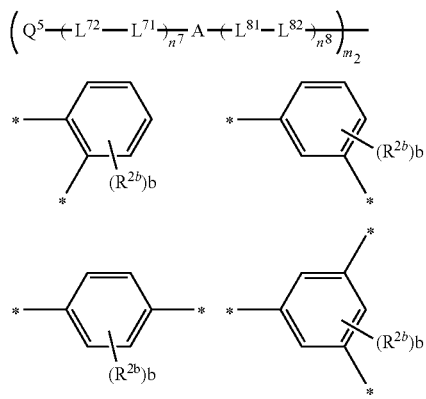

In formula (I-4), when $Q^5$ is a substituted or unsubstituted phenyl group, the compound represented by formula (I-4) is represented by formula (I-4-1) below.

Formula (I-4-1)

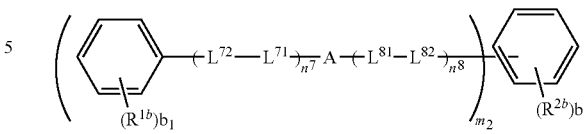

(In formula (I-4-1), $R^{1b}$ represents an alkyl group having 1 to 3 carbon atoms or an alkoxy group having 1 to 3 carbon atoms. b1 represents an integer of 0 to 5, and when b1 is an integer equal to or higher than 1, $R^{1b}$ existing in plural number may be the same as or different from each other. Each of $L^{71}$, $L^{72}$, $L^{81}$, $L^{82}$, n7, n8, m2, $R^{2b}$ and b has the same meaning as that in formula (I-4), and the same also applies to the preferable range.)

$R^{1b}$ represents an alkyl group having 1 to 3 carbon atoms or an alkoxy group having 1 to 3 carbon atoms and includes a methyl group, an ethyl group, a propyl group, an isopropyl group, a methoxy group, an ethoxy group and the like, and is preferably a methyl group and a methoxy group.

b1 represents an integer of 0 to 5, and is preferably 0 to 3, more preferably 0.

Examples of preferable embodiments of the compound represented by formula (I) also include a compound represented by formula (I-5) below.

Formula (I-5)

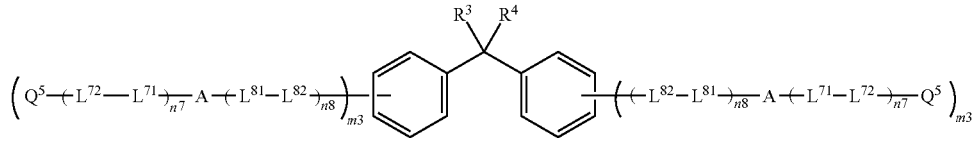

In formula (I-5), each of $Q^5$, $L^{71}$, $L^{72}$, $L^{81}$, $L^{82}$, A, n7 and n8 has the same meaning as that in formula (I-3).

In formula (I-5), the linking group represented by $(L^{72}\text{-}L^{71})_{n7}$ has the same meaning as that of the linking group represented by $(L^{52}\text{-}L^{51})_{n5}$ in formula (I-2), and the same also applies to the preferable range.

In formula (I-5), the linking group represented by $(L^{81}\text{-}L^{82})_{n8}$ has the same meaning as that of $(L^{62}\text{-}L^{61})_{n6}$ in formula (I-2), and the same also applies to the preferable range.

In formula (I-5), the preferable range of $Q^5$ and A is the same as that in formula (I-3), respectively.

In formula (I-5), m3 represents 1 or 2, and is preferably 1.

In formula (I-5), each of $R^3$ and $R^4$ independently represents a hydrogen atom or a methyl group, and preferably, each of $R^3$ and $R^4$ is a hydrogen atom, or each of $R^3$ and $R^4$ is a methyl group.

In formula (I-5), $Q^5$, $L^{71}$, $L^{72}$, $L^{81}$, $L^{82}$, A, n7, n8 and m3 existing in plural number may be the same as or different from each other.

Examples of preferable embodiments of a compound represented by formula (I-5) include formula (I-5-1) below.

Formula (I-5-1)

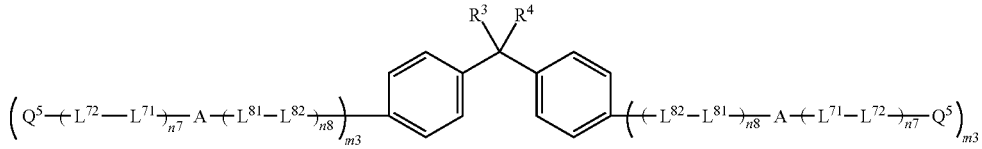

In formula (I-5-1), $Q^5$, $L^{71}$, $L^{72}$, $L^{81}$, $L^{82}$, A, n7, n8, m3, $R^3$, and $R^4$ have the same meaning as those in formula (I-5), respectively, and the same also applies to the preferable range.

In compounds represented by formula (I-3), (I-4) or (I-5), from the viewpoint of light resistance, preferable embodiments include compounds represented by formula (I-3) or (I-4).

Examples of preferable embodiments of the compound represented by formula (I) include a compound represented by formula (II) below and a compound represented by formula (III) below.

Formula (II)

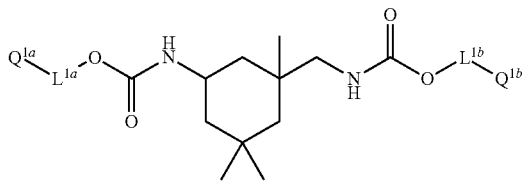

Formula (III)

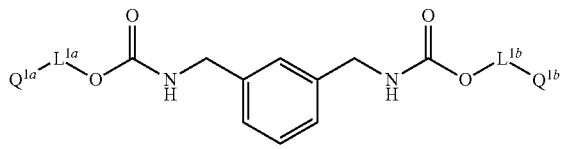

(In formulas (II), (III), each of $L^{1a}$ and $L^{1b}$ independently represents a single bond, an alkylene group, or a group represented by any of the above-described formulas (2A) to (2E), or a group consisting of a combination of a group represented by any of formulas (2A) to (2E) and two or three alkylene groups, and each of $Q^{1a}$ and $Q^{1b}$ independently represents a substituent, at least one of $Q^{1a}$ and $Q^{1b}$ represents a phenyl group which may have been substituted by an alkyl group having 1 to 3 carbon atoms or an alkoxy group having 1 to 3 carbon atoms.)

In an embodiment, in formulas (II) and (III), each of $L^{1a}$ and $L^{1b}$ independently represents a single bond, an alkylene group, a group represented by any of formulas (2A-1) to (2E-1) below, or a group comprised of a combination of one or more groups represented by any of formulas (2A-1) to (2E-1) below and one or more a alkylene groups, for example, two or three combination of the these groups.

—{$(CR^aR^c)_{ja}$—O—(C=O)}—*   Formula (2A-1):

—{$(CR^aR^c)_{ja}$—O}—*   Formula (2B-1):

—{$(CR^aR^c)_{ja}$—(C=O)O—}-*   Formula (2C-1):

—{$(CR^aR^c)_{ja}$—$NR^1$(C=O)O—}-*   Formula (2D-1):

—{$(CR^aR^c)_{ja}$—O—(C=O)$NR^1$}—*   Formula (2E-1):

(In formulas (2A-1) to (2E-1), * represents a bonding position with $Q^{1a}$ or $Q^{1b}$ or a position bonded with an adjacent group on the $Q^{1a}$ or $Q^{1b}$ side, each of $R^a$ and $R^c$ independently represents a hydrogen atom or an alkyl group having 1 to 3 carbon atoms, ja represents an integer equal to or higher than 1, and when $R^a$ and $R^c$ exist in plural number, each of the plurality of $R^a$s and $R^c$s may be the same as or different from each other. $R^1$ represents a hydrogen atom or an alkyl group having 1 to 4 carbon atoms, and, when $R^1$ exists in plural number, the plurality of $R^1$s may be the same as or different from each other.)

Each of $L^{1a}$ and $L^{1b}$ independently represents a single bond, an alkylene group, a group represented by any of formulas (2A-1) to (2E-1) below, or a group comprised of a combination of a group represented by any of formulas (2A-1) to (2E-1) below and two or more, for example, two or three alkylene groups. Ra, $R^c$, $R^1$, and ja in formulas (2A-1) to (2E-1) are the same as Ra, $R^c$, $R^1$, and ja in formulas (2A) to (2E), respectively.

Examples of the alkylene groups include a methylene group, an ethylene group, and the like.

$L^{1a}$ and $L^{1b}$ are preferably a group represented by any of formulas (2A-1) to (2E-1), a group comprised of a combination of two or more groups represented by any of formulas (2A-1) to (2E-1), or a group comprised of a combination of one or more groups represented by any of formulas (2A-1) to (2E-1) and one or more alkylene groups. The combination is, for example, a combination comprised of the two or three groups described above.

Each of $Q^{1a}$ and $Q^{1b}$ independently represents a substituent, and examples of the substituents include the substituent group T. At least one of $Q^{1a}$ and $Q^{1b}$ represents a phenyl group which may have been substituted by an alkyl group having 1 to 3 carbon atoms or an alkoxy group having 1 to 3 carbon atoms, and preferably both $Q^{1a}$ and $Q^{1b}$ represent a phenyl group which may have been substituted by an alkyl group having 1 to 3 carbon atoms or an alkoxy group having 1 to 3 carbon atoms. More preferably both $Q^{1a}$ and $Q^{1b}$ are unsubstituted phenyl groups.

Details of the alkyl group having 1 to 3 carbon atoms or alkoxy group having 1 to 3 carbon atoms that is to be a substituent in a phenyl group are as those described for $R^{1a}$ in formula (I-3-1).

In the group represented by any of formulas (2A-1) to (2C-1) included in formula (II), ja represents preferably an integer equal to or higher than 2, represent more preferably an integer ranging from 2 to 5, and is furthermore preferably 2 or 3. jc represents preferably an integer of 1 to 3, and is more preferably 1 or 2.

Preferable embodiments of a compound represented by formula (II) include formula (II-1) below.

Formula (II-1)

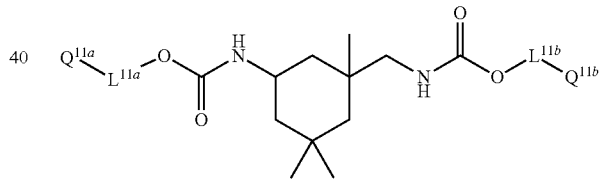

(In formula (II-1), each of $L^{11a}$ and $L^{11b}$ independently represents a single bond, an alkylene group, a group represented by any of formulas (2A-1) to (2E-1) below, a group comprised of a combination of two or more groups represented by any of formulas (2A-1) to (2E-1) below, or a group comprised of a combination of one or more groups represented by any of formulas (2A-1) to (2E-1) below and one or more alkylene groups, each of $Q^{11a}$ and $Q^{11b}$ independently represents a substituent. However, at least one of $Q^{11a}$ and $Q^{11b}$ represents a phenyl group which may have been substituted by an alkyl group having 1 to 3 carbon atoms or an alkoxy group having 1 to 3 carbon atoms.)

—{$(CR^aR^c)_{ja}$—O—(C=O)}—*   Formula (2A-1):

—{$(CR^aR^c)_{ja}$—O}—*   Formula (2B-1):

—{$(CR^aR^c)_{ja}$—(C=O)O—}-*   Formula (2C-1):

—{$(CR^aR^c)_{ja}$—$NR^1$(C=O)O—}-*   Formula (2D-1):

—{$(CR^aR^c)_{ja}$—O—(C=O)$NR^1$}—*   Formula (2E-1):

(In formulas (2A-1) to (2E-1), * represents a bonding position with $Q^{11a}$ or $Q^{11b}$ or a position bonded with an adjacent group on the $Q^{11a}$ or $Q^{11b}$ side, each of $R^a$ and $R^c$ independently represents a hydrogen atom or an alkyl group having 1 to 3 carbon atoms, $R^1$ represents a hydrogen atom or an alkyl group having 1 to 4 carbon atoms, ja represents an integer equal to or higher than 1, and, when $R^a$, $R^c$, and $R^1$ exist in plural number, the plurality of $R^a$s, $R^c$s, and $R^1$s may be the same as or different from each other.)

In formula (II-1), details of $Q^{11a}$, $Q^{11b}$, $L^{11a}$ and $L^{11b}$ are the same as those of $Q^{1a}$, $Q^{1b}$, $L^{1a}$, and $L^{1b}$ in formula (II), respectively.

In an embodiment, each of $L^{11a}$ and $L^{11b}$ independently represents a group represented by any of formulas (2A-1) to (2E-1) below, a group comprised of a combination of two or more groups represented by any of formulas (2A-1) to (2E-1) below, or a group comprised of a combination of one or more groups represented by any of formulas (2A-1) to (2E-1) below and one or more alkylene groups. The combination is for example, a combination comprised of two or three groups described above.

Preferable embodiments of a compound represented by formula (III) include formula (III-1) below.

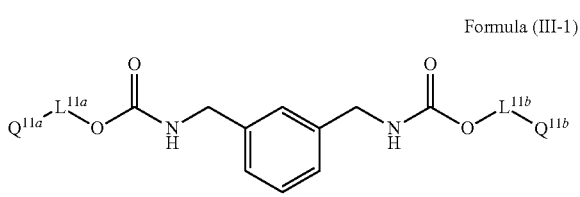

Formula (III-1)

(In formula (III-1), each of $L^{11a}$ and $L^{11b}$ independently represents a single bond, an alkylene group, a group represented by formula (2A-1) or any of (2C-1) to (2E-1) below, a group comprised of a combination of two or more groups represented by formula (2A-1) or any of (2C-1) to (2E-1) below, or a group comprised of a combination of one or more groups represented by formula (2A-1) or any of (2C-1) to (2E-1) below and one or more alkylene groups, each of $Q^{11a}$ and $Q^{11b}$ independently represents a substituent, and at least one of $Q^{11a}$ and $Q^{11b}$ represents a phenyl group which may have been substituted by an alkyl group having 1 to 3 carbon atoms or an alkoxy group having 1 to 3 carbon atoms.

—{(CHR$^a$)$_{ja}$—O—(C=O)}$_{jc}$—*  Formula (2A-1):

—{(CHR$^a$)$_{ja}$—(C=O)O-}$_{jc}$-*  Formula (2C-1):

—{(CR$^a$R$^c$)$_{ja}$—NR$^1$(C=O)O—}-*  Formula (2D-1):

—{(CR$^a$R$^c$)$_{ja}$—O—(C=O)NR$^1$}—*  Formula (2E-1):

(In formulas (2A-1), (2C-1) to (2E-1), * represents a bonding position with $Q^{11a}$ or $Q^{11b}$ or a position bonded with an adjacent group on the $Q^{11b}$ or $Q^{11b}$ side, each of $R^a$ and $R^c$ independently represents a hydrogen atom or an alkyl group having 1 to 3 carbon atoms, ja represents an integer equal to or higher than 1, $R^1$ represents a hydrogen atom or an alkyl group having 1 to 4 carbon atoms, and when $R^a$, $R^c$, and $R^1$ exist in plural number, the plurality of $R^a$s, $R^c$s, and $R^1$s may be the same as or different from each other.)

In formula (III-1), details of $Q^{11a}$, $Q^{11b}$, $L^{11a}$, and $L^{11b}$ are the same as those of $Q^{1a}$, $Q^{1b}$, $L^{1a}$, and $L^{1b}$ in formula (III), respectively.

In an embodiment each of, $L^{11a}$ and $L^{11b}$ independently represents a group represented by any of formulas (2A-1) to (2E-1) below, a group comprised of a combination of two or more groups represented by any of formulas (2A-1) to (2E-1) below, or a group comprised of a combination of one or more groups represented by any of formulas (2A-1) to (2E-1) below and one or more alkylene groups. The combination is, for example, a combination comprised of two or three groups described above.

Hereinafter, the compounds preferably used in the present invention will be exemplified, but the present invention is not limited to these.

Here, "k" in (1-1-k) is a number that is the same as the number of k in the compound. For example, when k=2, the compound number becomes (1-1-2), which means that k in —(CH$_2$)$_k$— in the compound is 2. The same also applies to compounds below.

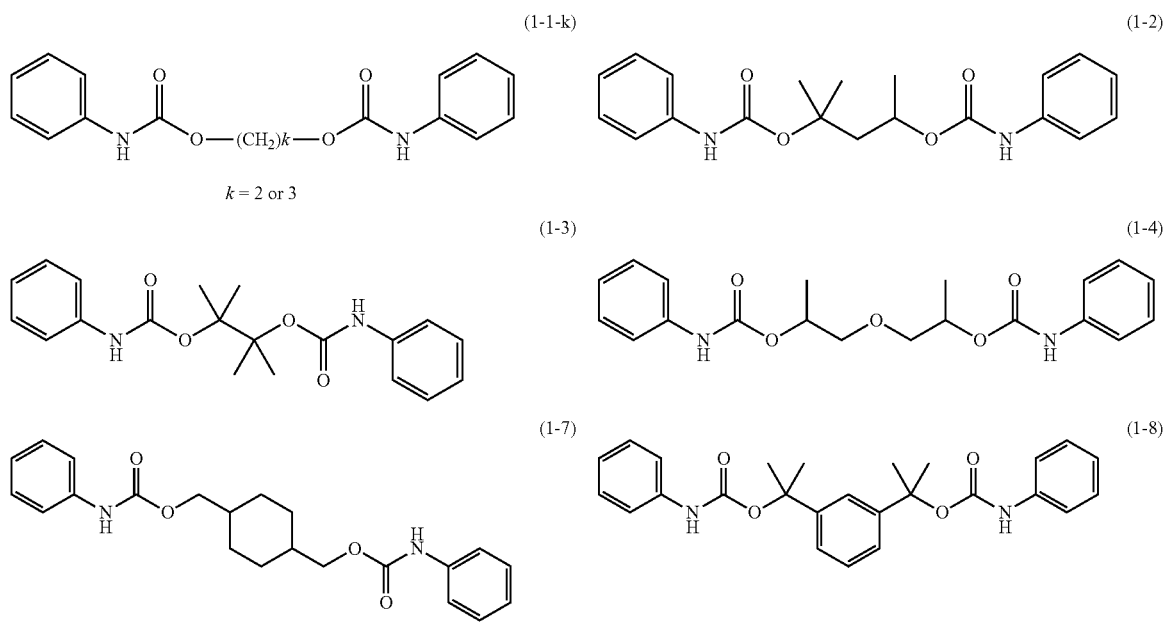

-continued
(1-11)
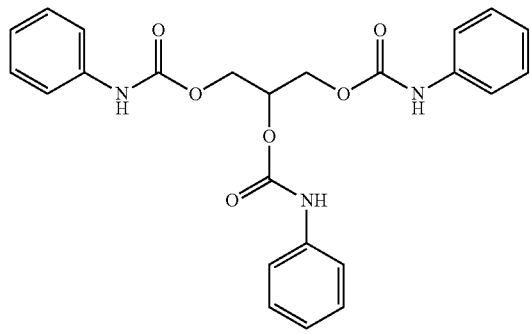
(1-12)
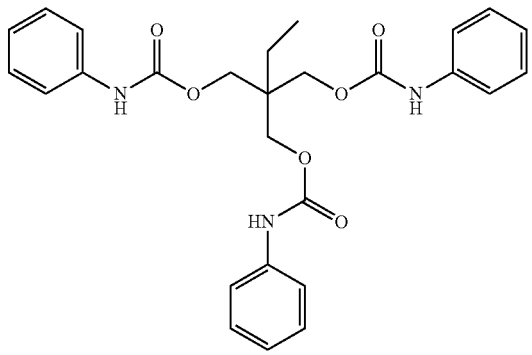
(1-13)
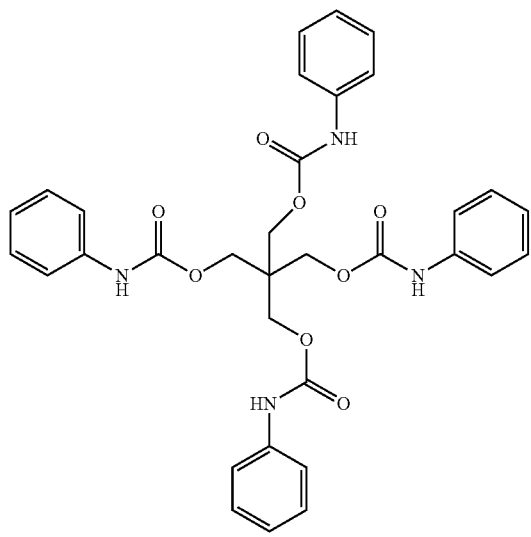
(1-14)
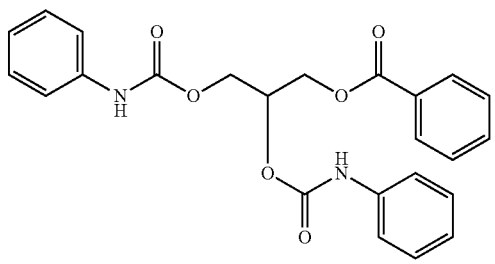
(1-15)
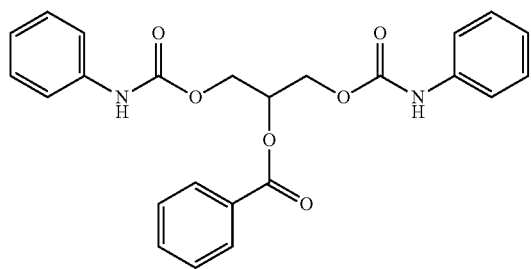
(1-16)
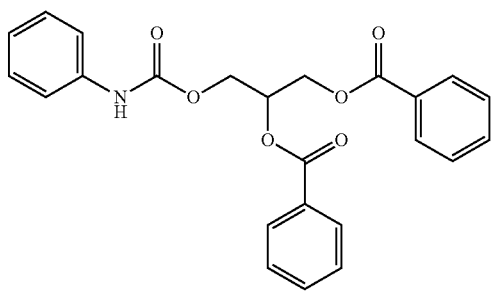
(1-17)
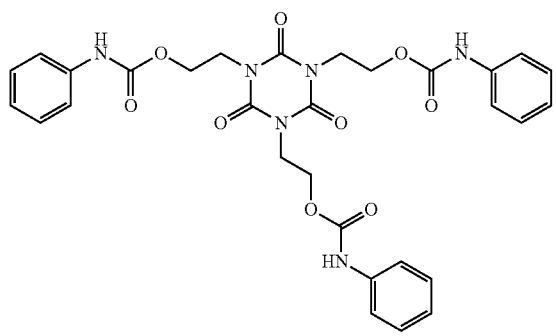
(1-18)
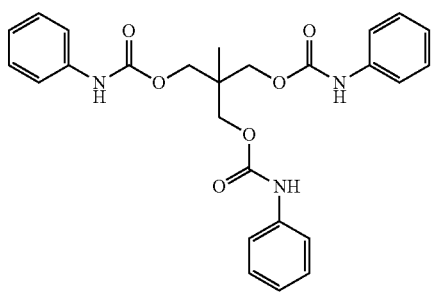

-continued
(1-21-k)
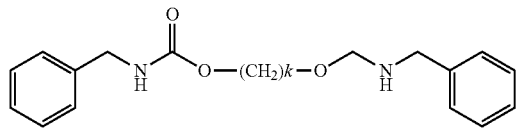
k = 2 or 3
(1-22)
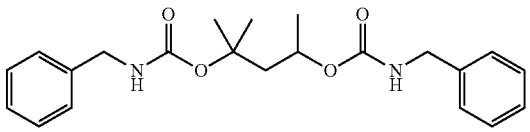
(1-23)
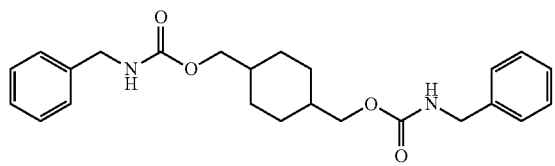
(1-24-k)
k = 2 or 3
(1-25)
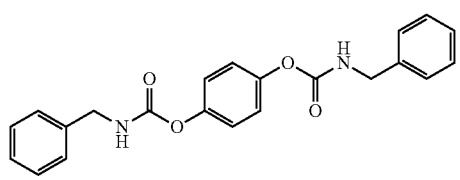
(1-26)
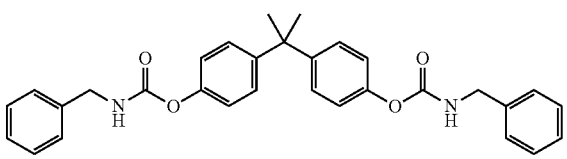
(1-28)
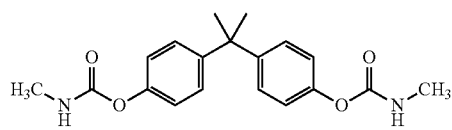
(2-1-1)
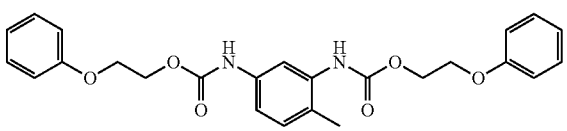
(2-1-2)
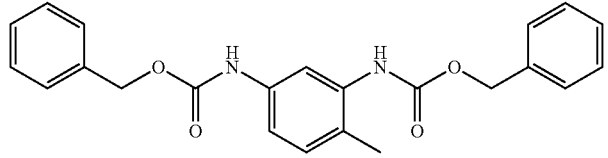
(2-2-1)
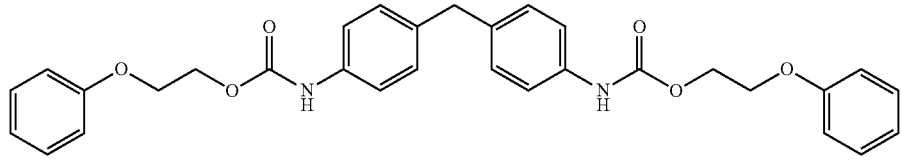
(2-2-2)
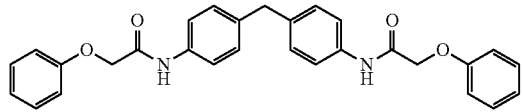
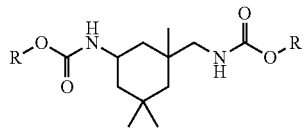
R = CH$_2$C$_6$H$_5$ (2-3-1)
= CH$_2$CH$_2$C$_6$H$_5$ (2-3-2)
= CH$_2$CH$_2$OC$_6$H$_5$ (2-3-3)
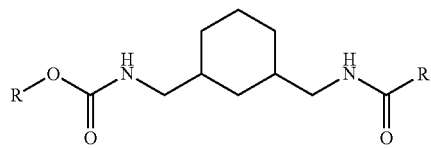
R = CH$_2$C$_6$H$_5$ (2-4-1)
= CH$_2$CH$_2$C$_6$H$_5$ (2-4-2)
= CH$_2$CH$_2$OC$_6$H$_5$ (2-4-3)
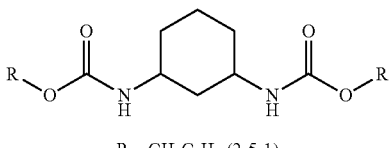
R = CH$_2$C$_6$H$_5$ (2-5-1)
= CH$_2$CH$_2$C$_6$H$_5$ (2-5-2)
= CH$_2$CH$_2$OC$_6$H$_5$ (2-5-3)

-continued
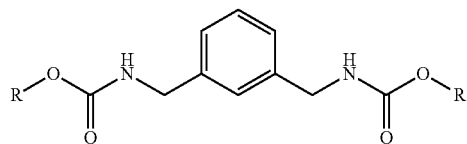
R = CH₂C₆H₅ (2-6-1)
  = CH₂CH₂C₆H₅ (2-6-2)
  = CH₂CH₂OC₆H₅ (2-6-3)
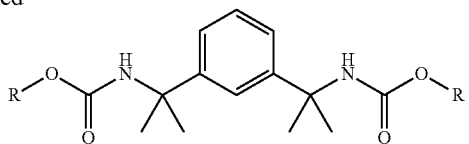
R = CH₂C₆H₅ (2-7-1)
  = CH₂CH₂C₆H₅ (2-7-2)
  = CH₂CH₂OC₆H₅ (2-7-3)
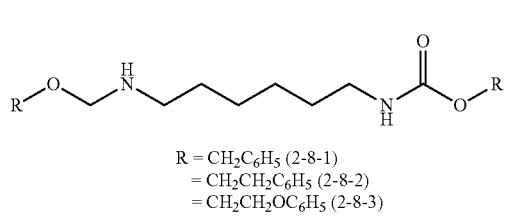
R = CH₂C₆H₅ (2-8-1)
  = CH₂CH₂C₆H₅ (2-8-2)
  = CH₂CH₂OC₆H₅ (2-8-3)
(2-9-1)
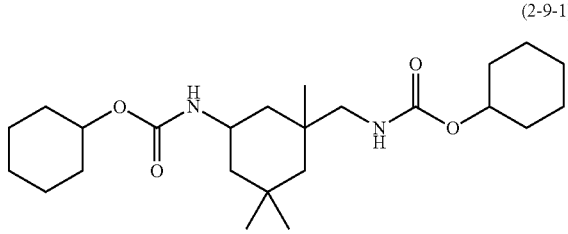
(2-9-2)
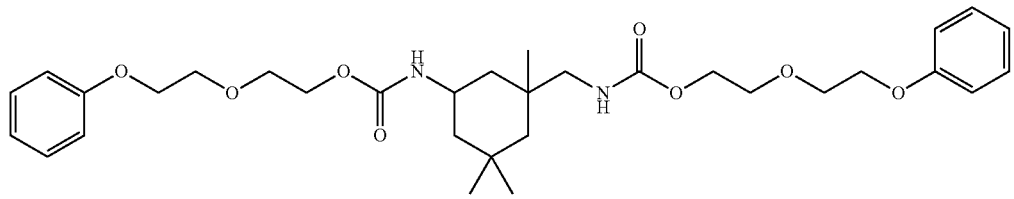
(2-9-3)
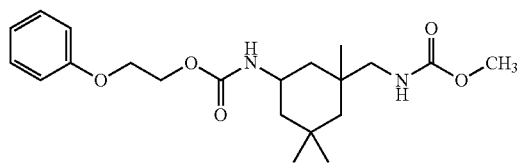
(2-9-4)
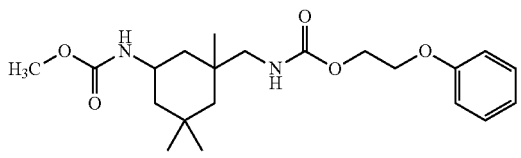
(2-11)
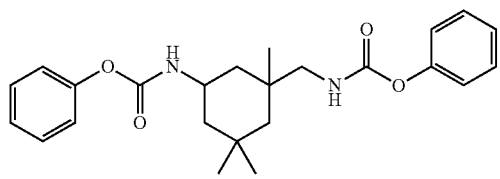
(2-12)
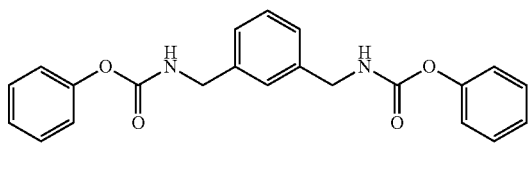
(2-13)
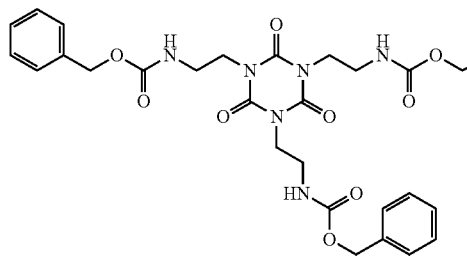
(2-15)
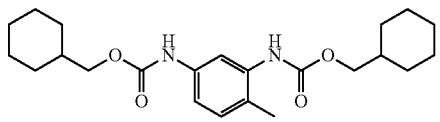
(2-16)
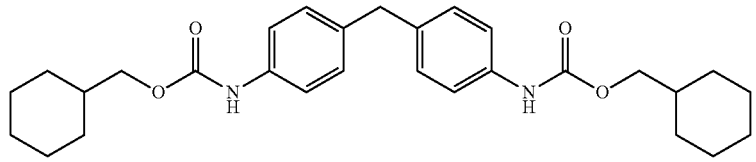

-continued
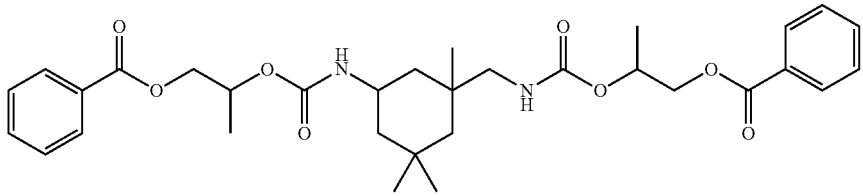
(3-1)
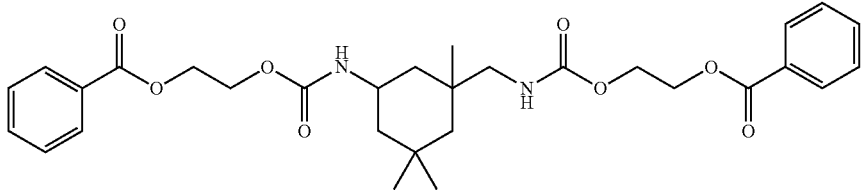
(3-2)
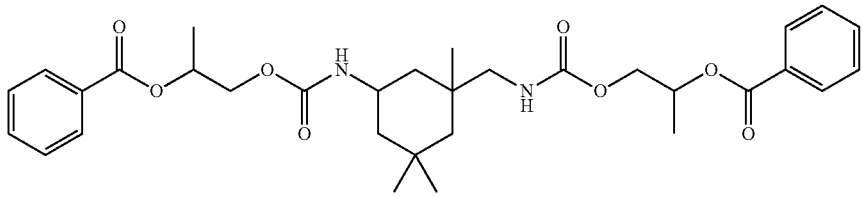
(3-3)
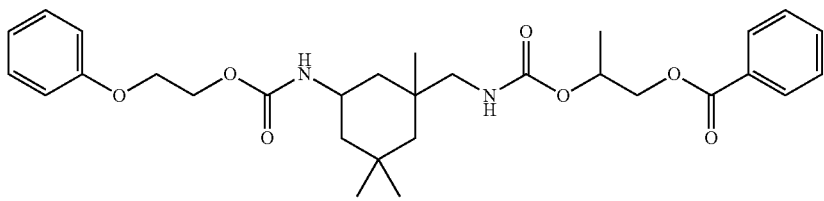
(3-4)
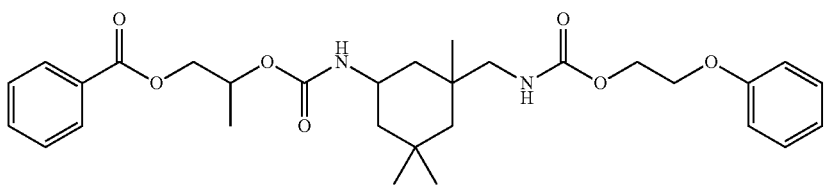
(3-5)
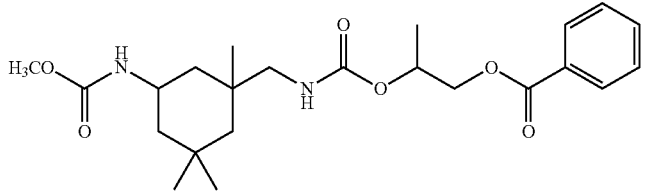
(3-6)
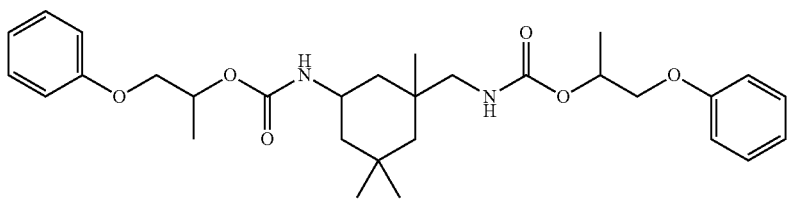
3-7
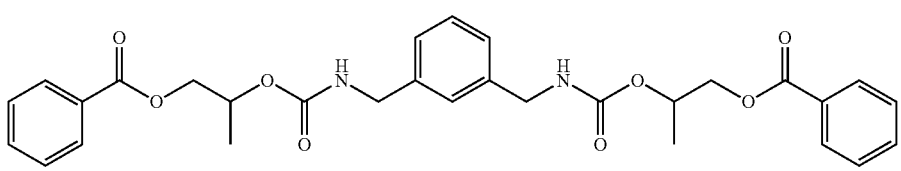
(3-8)

-continued
(3-9)
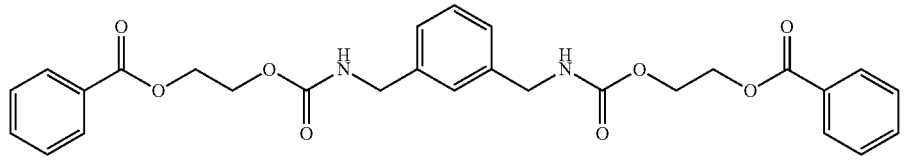
(3-10)
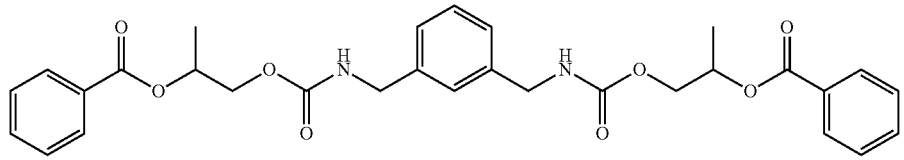
(3-11)
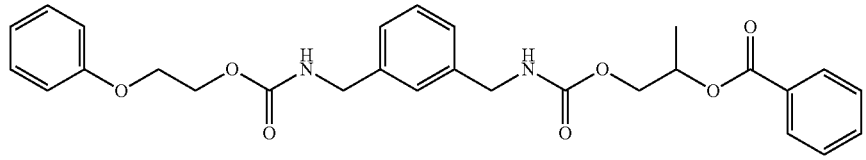
(3-12)
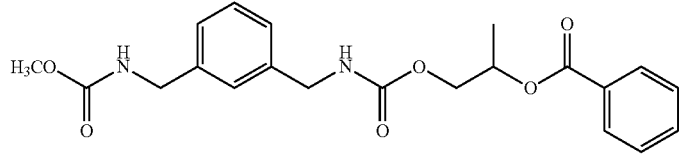
(3-13)
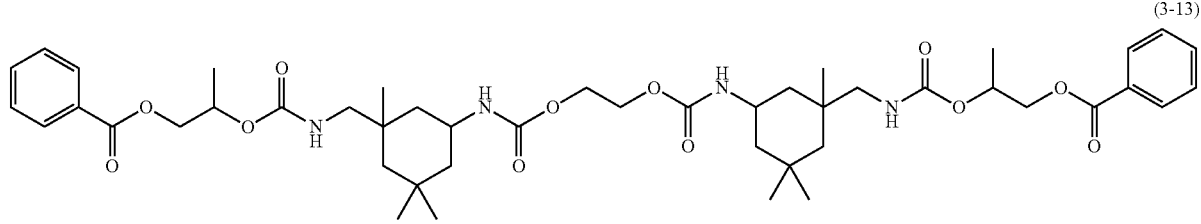
3-14
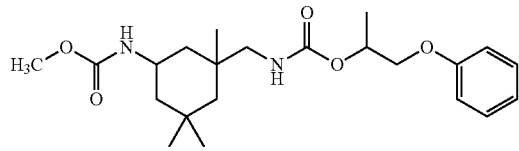
3-15
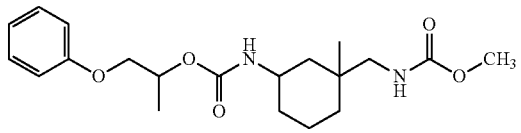
3-16
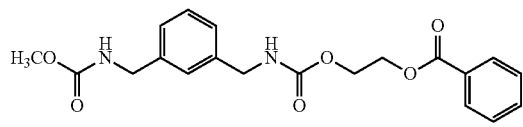
3-17
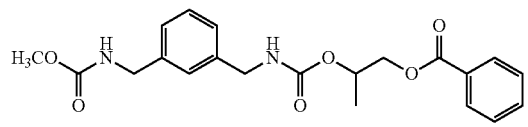
3-18
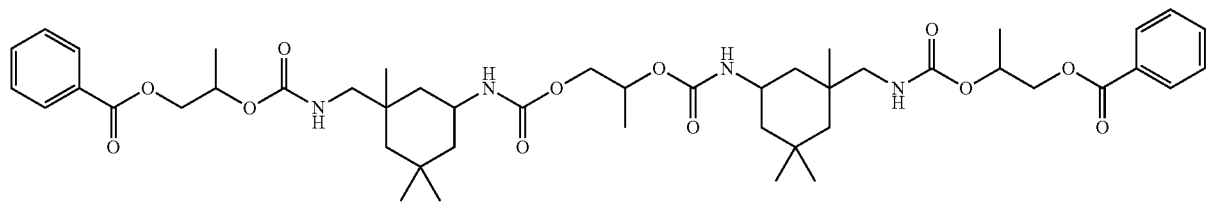
3-19
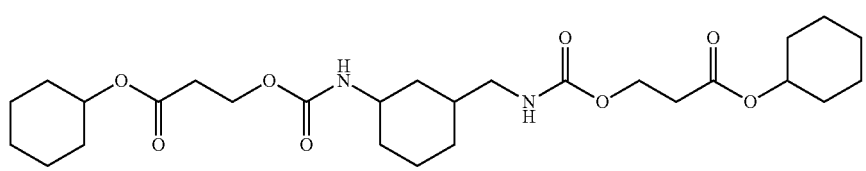

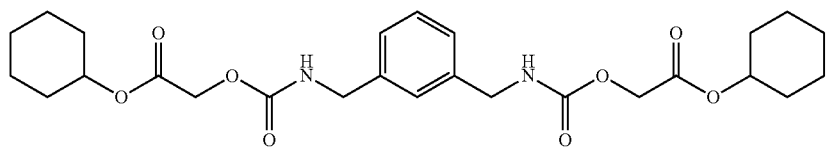
3-20
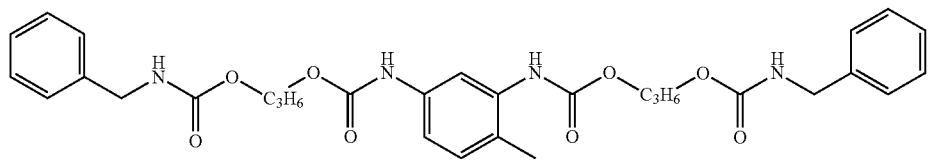
4-2
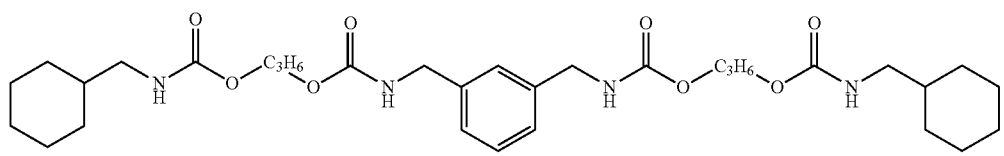
4-3
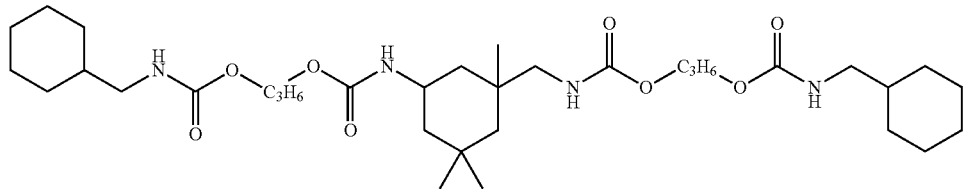
4-4
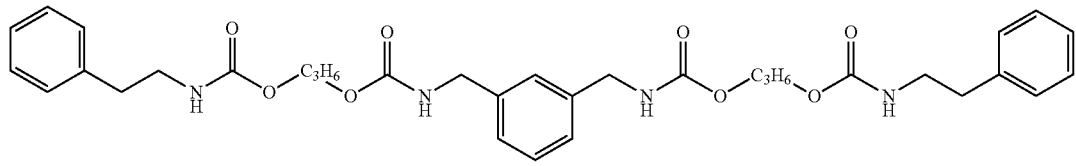
4-5
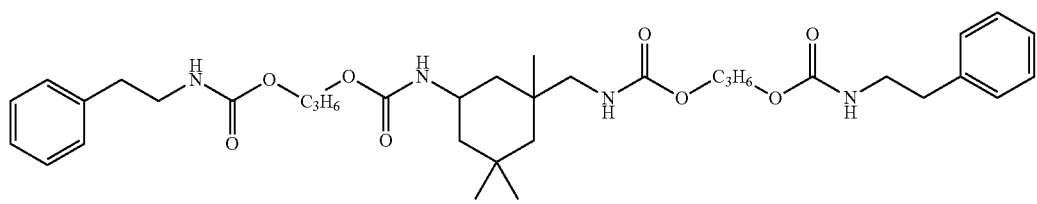
4-6
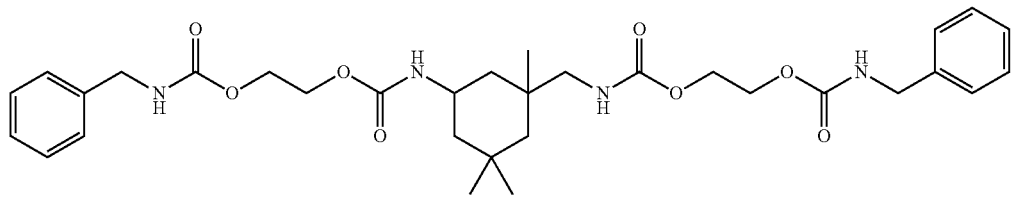
4-7
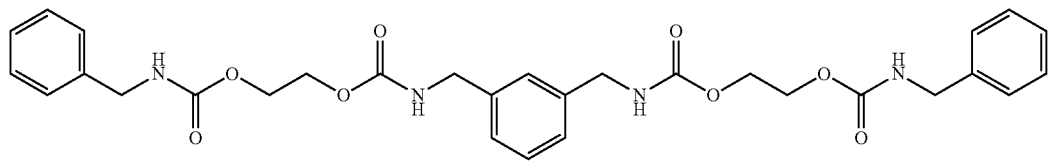
4-8
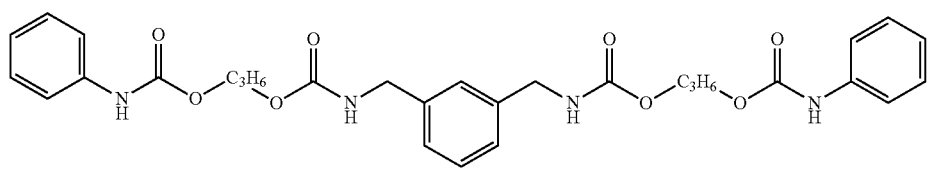
4-9

-continued
4-10
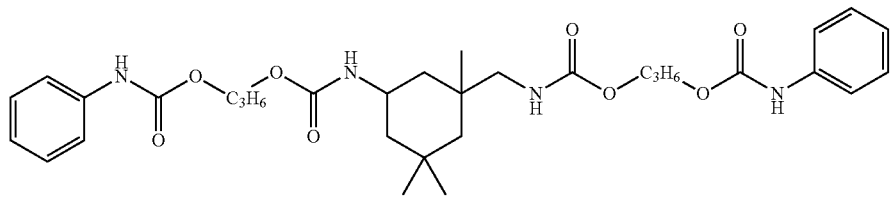
4-11
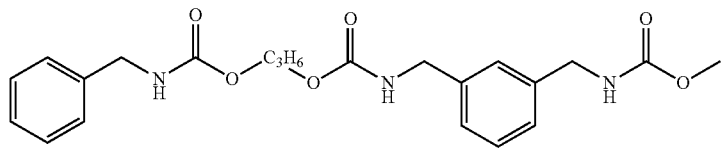
4-12
(mixture)
4-13
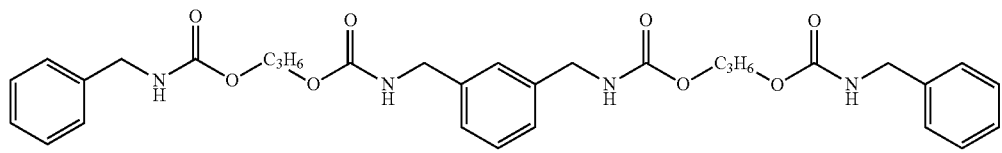
4-14
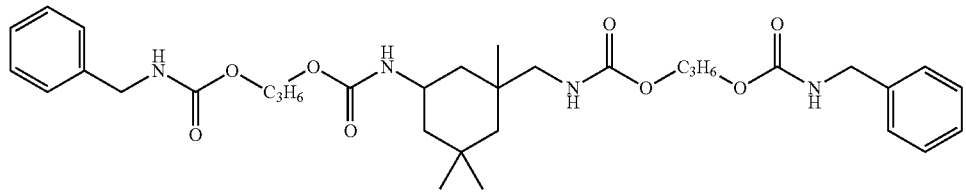
4-15
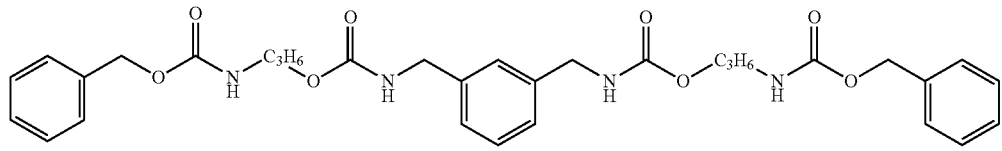
4-16
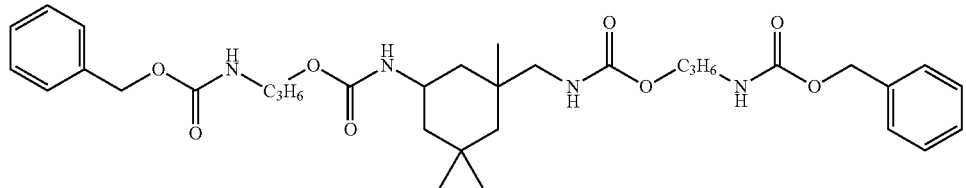
4-17
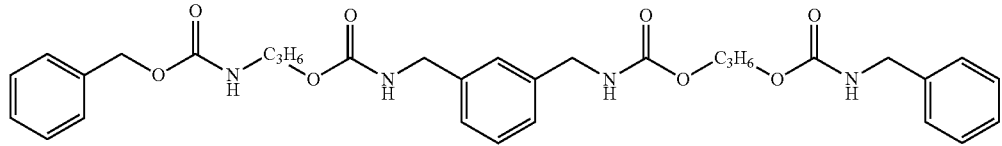

-continued
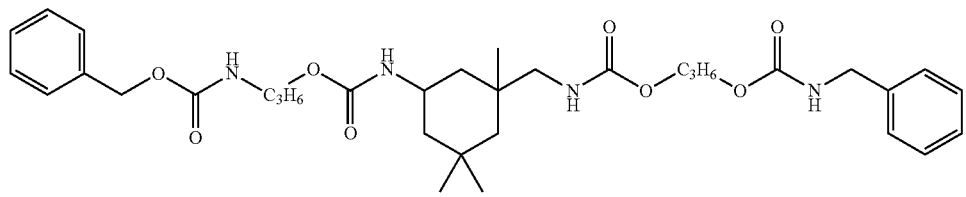
4-18
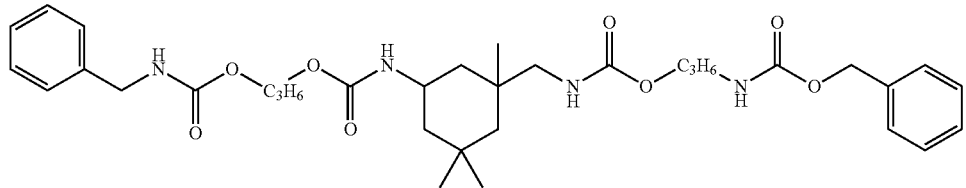
(mixture)
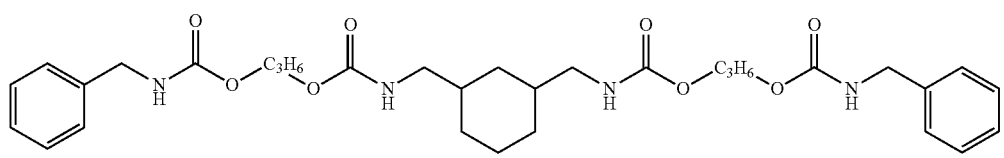
4-19
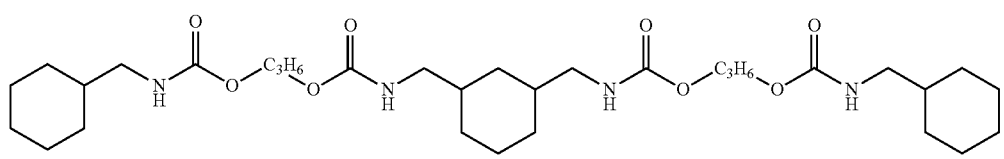
4-20
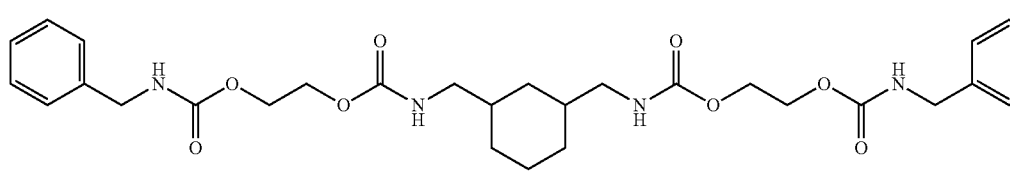
4-21
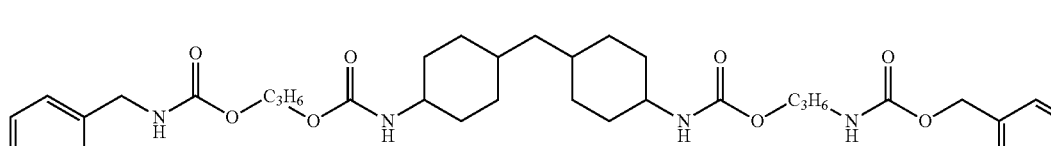
4-22
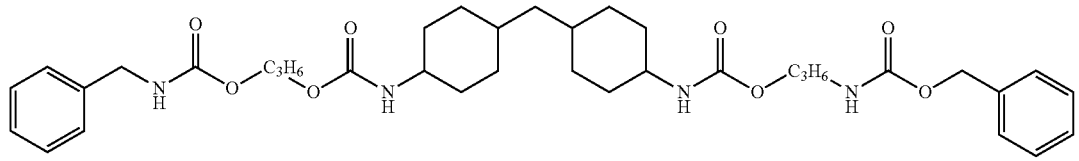
4-23
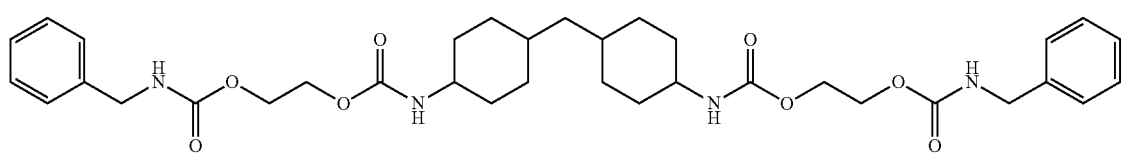
4-24
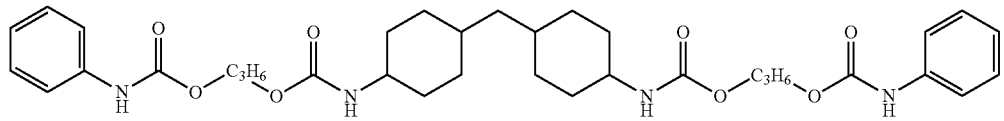
4-25
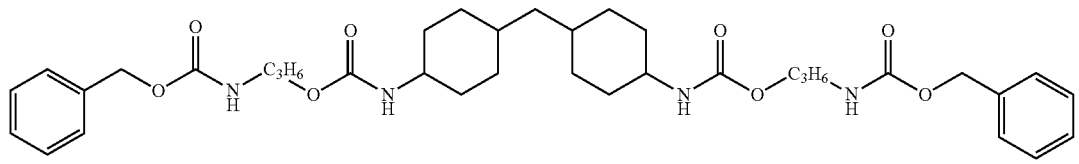

4-26
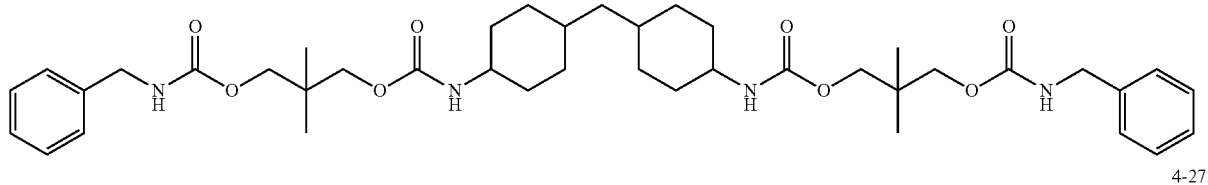
4-27
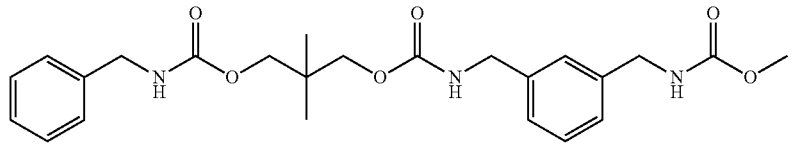
4-28
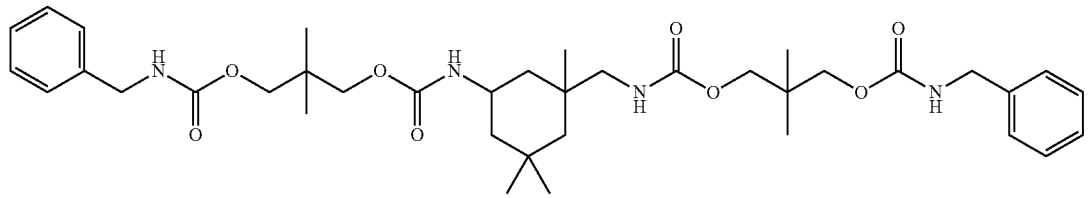
4-29
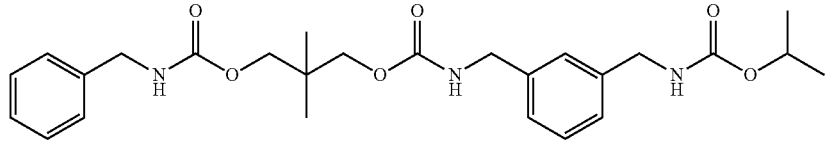
4-30
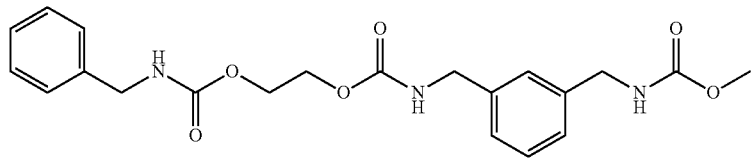
4-31
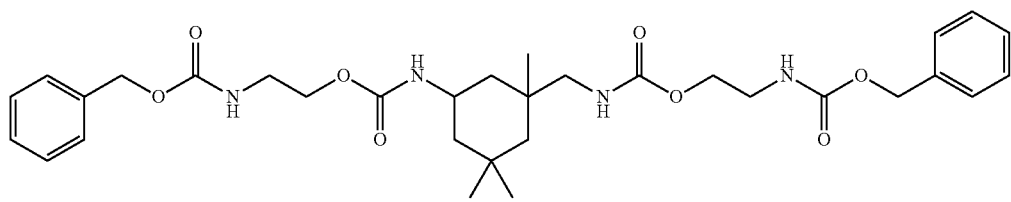
4-32
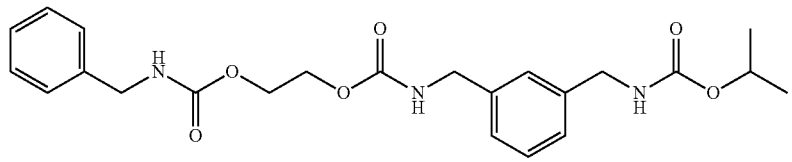
4-33
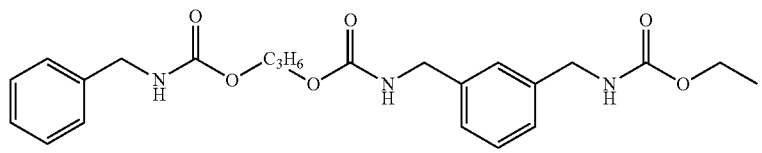
4-34
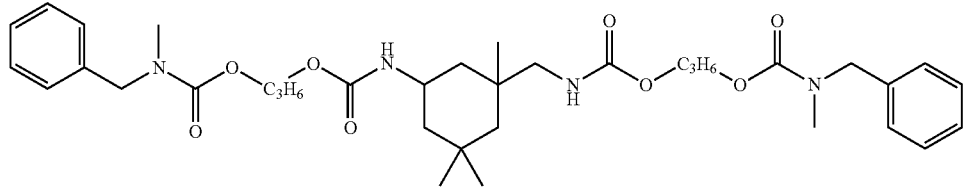

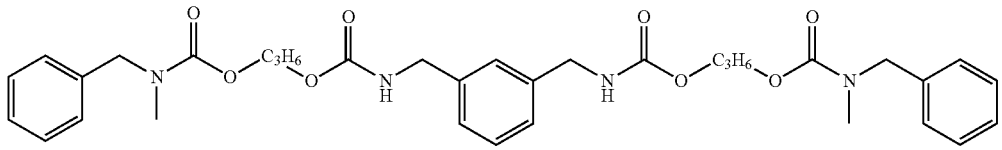
4-35
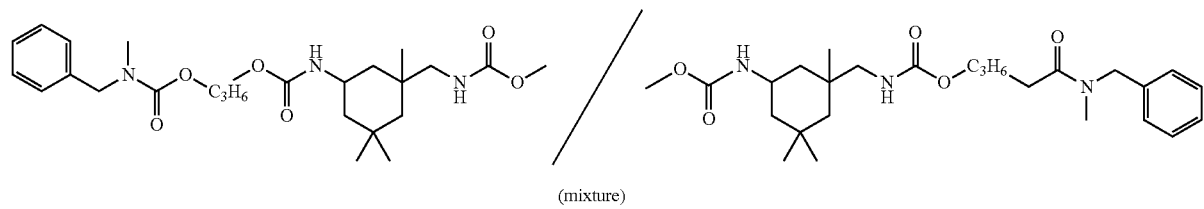
4-36
(mixture)
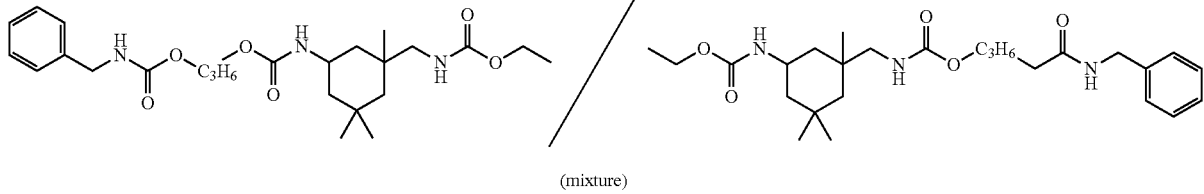
4-37
(mixture)
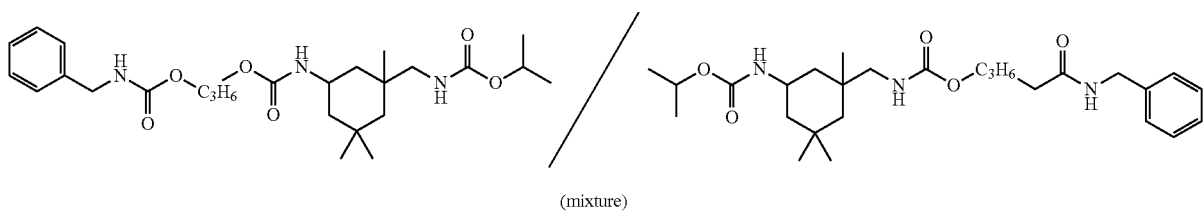
4-38
(mixture)
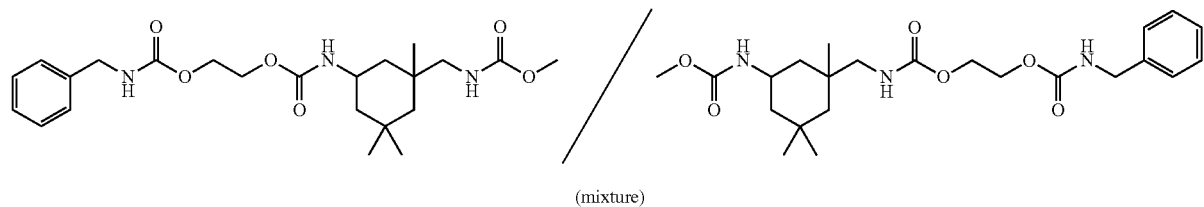
4-39
(mixture)
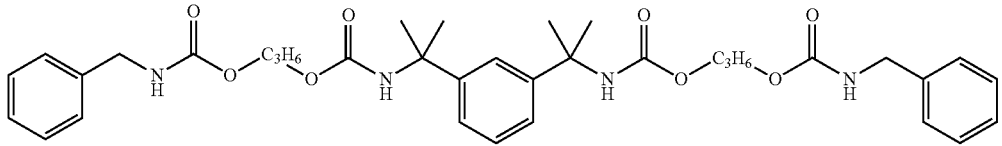
4-40
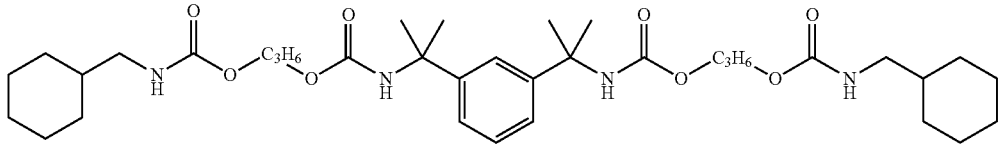
4-41
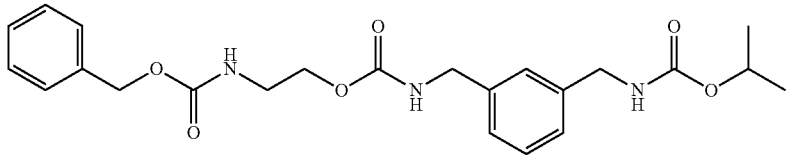
4-42

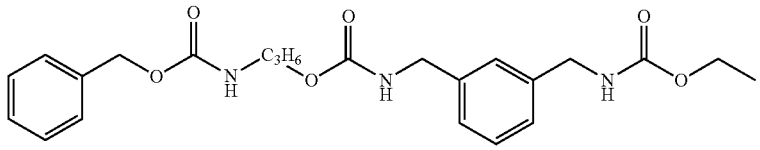

4-43

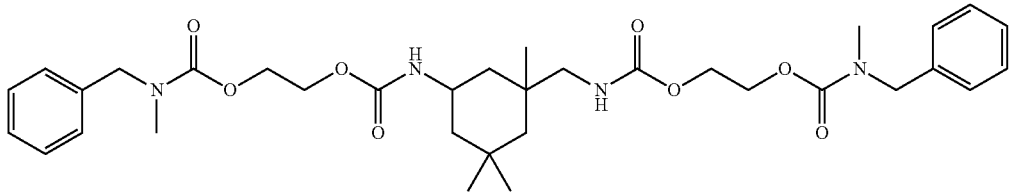

4-44

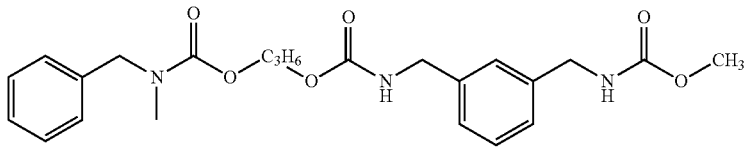

4-45

The compound represented by formula (I), and a compound represented by formula A to be described later can be manufactured by a known method.

Molecular weight of the compound represented by formula (I) ranges preferably from 230 to 2000, more preferably from 250 to 1500, further preferably from 300 relative to 1000, and further more preferably from 350 to 800, from the viewpoint of low volatilization or compatibility with polymer.

When the compound is a polymer, molecular weight means a weight-average molecular weight, unless otherwise noted in particular. The average molecular weight (weight-average molecular weight, number-average molecular weight) in the present invention means a value to be measured by gel permeation chromatography (GPC) in terms of polystyrene. An example of specific measurement conditions can include measurement conditions below. Average molecular weight shown in Example to be described later is a value measured under conditions below.

GPC apparatus: HLC-8320 (manufactured by Tosoh Corporation)

Column: combined use of TSK gel SuperHZM-H, TSK gel SuperHZ4000, TSK gel SuperHZ2000, (manufactured by Tosoh Corporation, 4.6 mm ID (inner diameter)×15.0 cm)

Eluent: tetrahydrofuran (THF)

Specific Embodiment 2 of the Above-Described Compound

A specific embodiment of the above-described compound also includes a compound that is represented by formula A and has an equivalent U equal to or lower than 515, which is obtained as U=[(molecular weight)/(number of a divalent linking group represented by —O—C(=O)—NH— contained per molecule)].

$Q^A$-$L^{a1}$-X—C(=O)—NH-$L^{a2}$-$Q^B$   Formula A

In formula A, X represents —O— or —NR—, and R represents a hydrogen atom or a substituent. Each of $L^{a1}$ and $L^{a2}$ independently represents a single bond, or any one of or any combination of an alkylene group, an arylene group, —O—, —S— and —C(=O)—. $R^1$ represents a hydrogen atom or a substituent. Each of $Q^A$ and $Q^B$ independently represents a substituent, and at least one of $Q^A$ and $Q^B$ represents a polar group being a residue of a compound having a C log P value equal to or lower than 0.85, or a terminal group contained in the substituent. When X represents —NR—, $L^1$ represents a single bond, and $Q^A$ contains a ring structure, the ring structure contained in $Q^A$ may be a ring structure formed together with R in —NR—. The C log P value is as described above. In an embodiment, the polar group is a polar group other than an aromatic heterocyclic ring-containing group being a residue of a compound having a C log P value equal to or lower than 0.85. Here, an aromatic heterocyclic ring means a ring structure containing a hetero atom in an aromatic ring. An example includes a triazine ring.

In formula A, X represents —O— or —NR—. R represents a hydrogen atom or a substituent, and examples of the substituent include those selected from the substituent group T. Among them, an alkyl group or an aryl group which may have been substituted is preferable as a substituent, and an alkyl group substituted by a cyano group being a polar group is more preferable. In formula A, a linking group selected from the above-described group, particularly a divalent linking group represented by —NH—C(=O)—O—, —O—C(=O)—NH— or —NH—C(=O)—NR—, —NR—C(=O)—NH— may be contained in equal to or higher than 1. The number of linking groups selected from the group is as described above. All linking groups that are selected from the group and exist in a compound may be the same as or different from one another.

Each of $Q^A$ and $Q^B$ independently represents a substituent and at least one of $Q^A$ and $Q^B$ represents the above-described polar group or a terminal group contained in the above-described polar group. Details of the polar group are as described above. In an embodiment, when one of $Q^A$ and $Q^B$ represents the above-described polar group or contains the above-described polar group, preferably the other is a substituent having a ring structure. Details thereof are as described above.

Each of $L^{a1}$ and $L^{a2}$ independently represents a single bond, or any one of or any combination of an alkylene group, an arylene group, —O—, —$NR^1$—, —S— and —C(=O)—. An alkylene group having 1 to 20 carbon atoms is preferable as an alkylene group represented by $L^{a1}$ and $L^{a2}$ or contained in $L^{a1}$ and $L^{a2}$, and an alkylene group having 1 to 12 carbon atoms is more preferable. The alkylene group may be any of linear, branched and cyclic ones. Specific examples of the alkylene groups include a methylene group, an ethylene group, a propylene group, a butylene group, a pentylene group, a hexylene group, a cyclohexylene group, a 2,2'-methylenebis(cyclohexylene) group, a hexahydroxylylene group, and the like. The alkylene group may be substituented. Examples of substituents the alkylene group may have include the substituent group T. Among them, an alkyl group, an acyl group, an aryl group, an alkoxy group or a carbonyl group is preferable as a substituent of the alkylene group. An alkylene group having 1 to 8 carbon atoms is more preferable as a linear or branched alkylene group, an alkylene group having 1 to 3 carbon atoms is further preferable, and a methylene group, an ethylene group, a propylene group or an isopropylene group is further more preferable. An alkylene group having 3 to 15 carbon atoms is more preferable as a cyclic alkylene group, and an alkylene group having 5 to 10 carbon atoms is further more preferable. A cyclohexylene group having a substituent is preferable as a cyclohexylene group, and an alkyl-substituted cyclohexylene group is more preferable. Examples of preferable alkyl-substituted cyclohexylene groups include those having a structure below. In the structure below, * represents a bonding position with another structure constituting a compound represented by formula A.

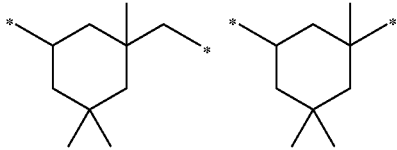

In addition, a preferable example of an alkyl-substituted cyclohexylene group can also include a hexahydroxylylene group shown below.

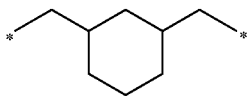

An arylene group represented by $L^{a1}$, $L^{a2}$ or contained in $L^{a1}$, $L^{a2}$ is preferably an arylene group having 5 to 20 carbon atoms, more preferably an arylene group having 5 to 15 carbon atoms, furthermore preferably an arylene group having 5 to 12 carbon atoms. Specific examples of an arylene group include a phenylene group, a xylylene group, a biphenylene group, a naphthylene group, a 2,2'-methylenebisphenyl group, etc. The arylene group may be substituented. Examples of substituents the arylene group may have include the substituent group T. Among them, as a substituent of the arylene group, an alkyl group, an acyl group, an aryl group, an alkoxy group or a carbonyl group is preferable. As a more preferable arylene group, a xylylene group or a tetramethylxylylene group is included.

When $L^{a1}$, $L^{a2}$ represent any one of or any combination of an alkylene group, an arylene group, —O—, —$NR^1$—, —S— and —C(=O)—, preferably they are any one of or any combination of an alkylene group, an arylene group, —O— and —C(=O)—. In the group represented by $L^{a1}$, $L^{a2}$, the number of carbon atoms in a main chain part ranges preferably from 1 to 10, more preferably from 1 to 5.

Preferable specific examples of groups represented by $L^{a1}$, $L^{a2}$ include an alkylene group and structures represented by formulas (2a) to (2e) below.

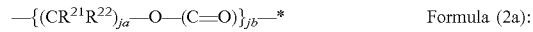 Formula (2a):

 Formula (2b):

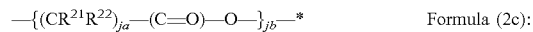 Formula (2c):

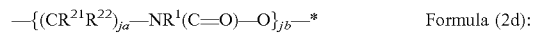 Formula (2d):

 Formula (2e):

In formulas (2a) to (2e), * represents a bonding position with a substituent represented by $Q^A$ or $Q^B$, each of $R^{21}$ and $R^{22}$ independently represents hydrogen atom or an alkyl group having 1 to 3 carbon atoms, each of ja and jb independently represents an integer equal to or higher than 1 and is preferably an integer ranging from 1 to 3, and when $R^{21}$ and $R^{22}$ exist in plural number, a plurality of $R^{21}$s and $R^{22}$s may be the same as or different from each other.

In formulas (2a) to (2e), when the structure represented by —($CR^{21}R^{22}$)— is contained in equal to or higher than 2, the instance where all $R^{21}$ and $R^{22}$ are hydrogen atoms, or at least either $R^{21}$ or $R^{22}$ is an alkyl group is preferable.

$R^1$ in —$NR^1$— represents a hydrogen atom or a substituent. Examples of the substituents include an alkyl group, an alkenyl group, an aryl group and an acyl group, and a hydrogen atom, an alkyl group having 1 to 8 carbon atoms, an alkenyl group having 2 to 8 carbon atoms, an alkynyl group having 2 to 8 carbon atoms or an aryl group having 6 to 18 carbon atoms (for example, a group of a benzene ring or a naphthalene ring) is preferable, and a hydrogen atom or an alkyl group having 1 to 4 carbon atoms is more preferable.

Furthermore, it is also preferable that $Q^A$ is a monovalent substituent represented by formula (a) below, or substituents of one or more of the monovalent substituent being bonded with $L^{a1}$ via a linking group.

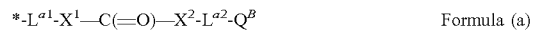 Formula (a)

Alternatively, it is also preferable that $Q^B$ is a monovalent substituent represented by formula (b) below, or substituents of one or more of the monovalent substituent being bonded with $L^{a2}$ via a linking group.

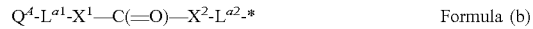 Formula (b)

In the formulas (a), (b), * is a bonding position with another structure constituting a compound represented by formula A, $Q^A$, $Q^B$, $L^{a1}$, $L^{a2}$ each has the same meaning as that in formula A, respectively, one of $X^1$ and $X^2$ represents —NH— and the other represents —O— or —NR—, and R has the same meaning as that in formula A. Examples of the linking group include those described regarding $Z^{a1}$ in formula A-1.

That is, a compound represented by formula A preferably has a structure represented by

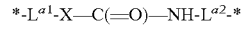

in equal to or higher than 2 per molecule. In the structure, * is a bonding position with another structure constituting a compound represented by formula A, and X, $L^{a1}$ and $L^{a2}$ each has the same meaning as that in formula A, respectively.

As above-described, in formula A, when X represents —NR—, $L^{a1}$ represents a single bond, and $Q^A$ contains a ring structure, the ring structure contained in $Q^A$ can be a ring structure formed together with R in —NR—. An embodiment that is a compound represented by formula A and has the above-described ring structure is represented by formula A-a below.

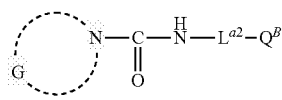

Formula A-a

In formula A-a, G represents a group of atoms forming a ring structure with a nitrogen atom to be linked, and $L^{a2}$, $Q^B$ have the same meaning as that in formula A, respectively.

A ring structure (nitrogen-containing heterocyclic ring) that is formed containing G is a substituted or unsubstituted nitrogen-containing heterocyclic ring, and is preferably a substituted or unsubstituted nitrogen-containing 6-membered heterocyclic ring, more preferably a substituted or unsubstituted morpholino group. As above-described, the nitrogen-containing heterocyclic ring is preferably an unsubstituted one. An embodiment that is a compound represented by formula A and has an unsubstituted morpholino group is represented by formula A-a1 below.

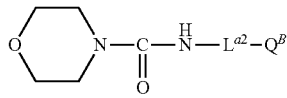

Formula A-a1

In formula A-a1, each of $L^{a2}$ and $Q^B$ has the same meaning as that in formula A.

The preferable embodiment of a compound represented by formula A can include a compound represented by formula A-1 below.

Formula A-1

In formula A-1, each of $L^{a11}$ and $L^{a21}$ independently represents a single bond, or any one of or any combination of an alkylene group, an arylene group, —O—, —$NR^1$—, —S— and —C(=O)—. $R^1$ represents a hydrogen atom or a substituent. $Q^{a1}$ represents a substituent, $Z^{a1}$ represents an ma-valent linking group, A represents a single bond, *—X—C(=O)—NH— or *—NH—C(=O)—X—, * represents a bonding position with $L^{a21}$, X represents —O— or —NR—, and R represents a hydrogen atom or a substituent. ma represents an integer ranging from 2 to 6, and each of $Q^{a1}$, A, $L^{a11}$ and $L^{a21}$ existing in plural number may be the same or different. At least one A represents *—X—C(=O)—NH— or *—NH—C(=O)—X—. In addition, at least one $Q^1$ represents the above-described polar group or a terminal group contained in the polar group.

As explained above for formula A, when A represents *—NH—C(=O)—X—, X represents —NR—, $L^{a11}$ represents a single bond, and $Q^{a1}$ contains a ring structure, the ring structure contained in $Q^{a1}$ may be a ring structure formed together with R in —NR—.

Each of $L^{a11}$ and $L^{a21}$ independently has the same meaning as that of each of $L^{a1}$ and $L^{a2}$ in formula A, and the same also applies to details of a preferable embodiment and the like.

$Q^{a1}$ represents a substituent, and preferably represents the above-described polar group or a termination group contained in the above-described polar group. Preferable polar groups are as described above.

Furthermore, preferably, any of ma $Q^{a1}$s represents the above-described polar group or represents a terminal group contained in the above-described polar group. In an embodiment, preferably, all represent the above-described polar group, one represents the above-described polar group and the other represents a terminal group contained in the above-described polar group, or all represent a terminal group contained in the above-described polar group, and more preferably all polar groups contained in ma $Q^{a1}$s are the above-described polar group described as preferable one. Furthermore, in another embodiment, preferably, any of ma $Q^{a1}$s represents the above-described polar group or represents a terminal group contained in the above-described polar group, and other $Q^{a1}$s represent a substituent containing a ring structure, and more preferably, the polar group is the above-described polar group described as preferable one. Details of a substituent containing the ring structure are as described above.

Furthermore, when $Q^{a1}$ represents a terminal group contained in the above-described polar group, the terminal group is, in an embodiment, preferably an alkyl group.

Moreover, when $Q^{a1}$ represents a terminal group contained in the above-described polar group, a polar group is also preferably constituted by the terminal group $Q^{a1}$ and the linking group A selected from the above-described group. In this case, $L^{a1}$ represents a single bond, and $Q^{a1}$ is linked directly with A.

A compound represented by formula A-1 also preferably contains a ring structure in the molecule thereof. In an embodiment, a ring structure is preferably contained in at least one of $Q^{a1}$ and $Z^{a1}$, and is at least preferably contained in $Z^1$. A ring structure that can be contained in $Z^1$ will be described later. A ring structure that can be contained in $Q^{a1}$ is as described above. Alternatively, in another embodiment, preferably, a ring structure is not contained in $Q^{a1}$ and $Z^{a1}$ but is contained in one of or both of $L^{a11}$ and $L^{a21}$.

More specifically, in formula A-1, preferably, a ring structure is contained in at least one of $L^{a11}$, $L^{a21}$, $Q^{a1}$ and $Z^{a1}$.

A represents a single bond, *—X—C(=O)—NH— or *—NH—C(=O)—X—. However, at least one A existing in plural number represents *—X—C(=O)—NH— or *—NH—C(=O)—X—. X has the same meaning as that of X in formula A. More specifically, at least one A existing in plural number represents a linking group selected from the above-described group. In formula A-1, since ma represents an integer ranging from 2 to 6, in a compound represented by formula A-1, there exist a plurality of (ma) constitutional units represented by ($Q^{a1}$-$L^{a11}$-A-$L^{a21}$). In at least one of constitutional units represented by ($Q^{a1}$-$L^{a11}$-A-$L^{a21}$) existing in plural number, when $L^{a21}$ is a single bond and A represents a linking group selected from the above-described group, a linking group represented by A is directly bonded with $Z^{a1}$. In this case, preferably, A represents *—NH—C(=O)—X— and is bonded with $Z^{a1}$ at the bonding position *. Details of the linking group selected from the above-described group are as described above.

$Z^{a1}$ represents an ma-valent linking group. Since ma is an integer ranging from 2 to 6, $Z^{a1}$ is a di- to hexa-valent linking group. $Z^{a1}$ is preferably a di- to tri-valent linking group, more preferably a divalent linking group. $Z^{a1}$ is preferably a group containing at least one of a linear, branched or cyclic aliphatic group and an aromatic group, more preferably a group containing at least one of a linear or cyclic aliphatic group and an aromatic group.

$Z^{a1}$ may consist of at least only one of a linear, branched or cyclic aliphatic group and an aromatic group alone, or is also preferably a combination of these groups and one or more of an oxygen atom and a linear or branched alkylene group. An aliphatic group contained as $Z^1$ is preferably a saturated aliphatic group.

A rigid structure is obtained by forming a group containing at least one of a branched or cyclic aliphatic group and an aromatic group, and thus hardness is improved. The number of carbon atoms constituting $Z^{a1}$ is preferably 3 to 20, more preferably 4 to 15.

$Z^{a1}$ may be substituented, and specific examples of the substituent include the above-described substituent group T. When $Z^{a1}$ contains a cyclic aliphatic group, the cyclic aliphatic group preferably has a substituent. In contrast, when $Z^{a1}$ contains an aromatic group, the aromatic group preferably does not have a substituent.

Specifically, $Z^{a1}$ is preferably a linking group exemplified below. * represents a position to be bonded with $L^{a21}$ (when $L^{a21}$ represents a single bond, directly bonded with A).

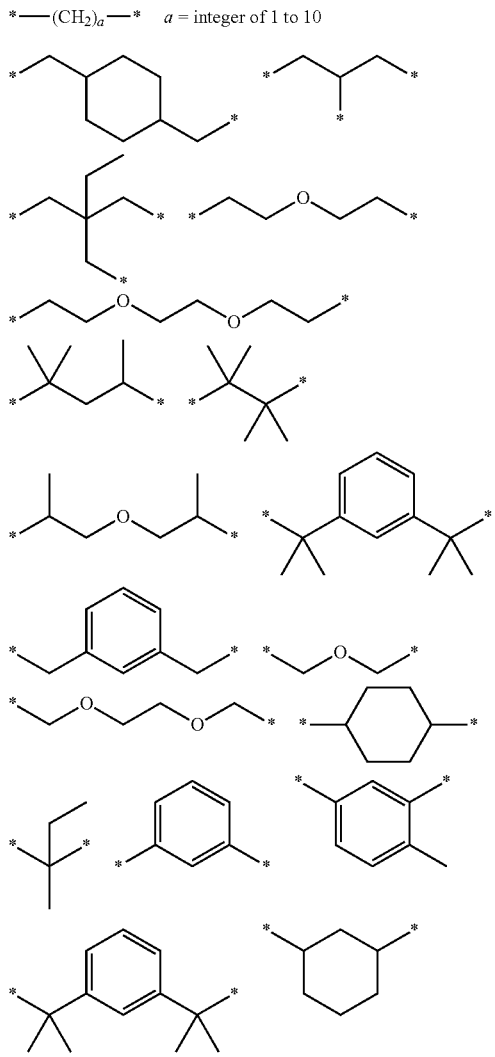

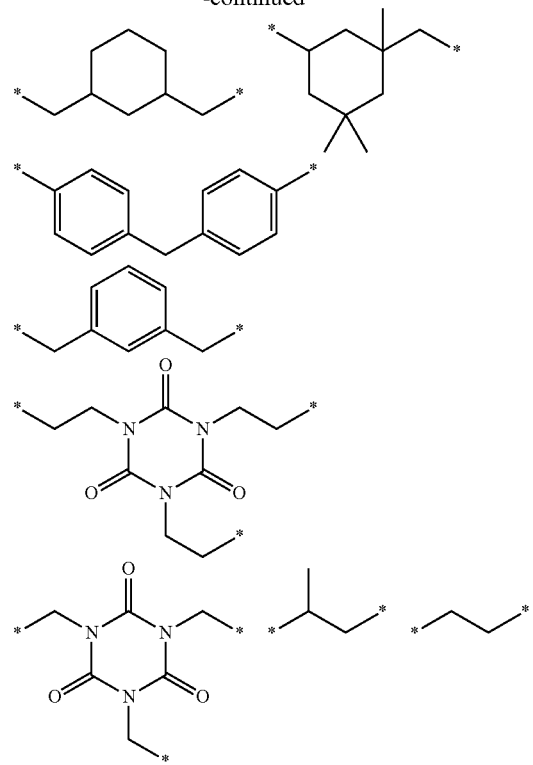

In an embodiment, $Z^{a1}$ preferably contains a ring structure, and more preferably is a group that contains at least one of a cyclic aliphatic group and an aromatic group. As a ring structure contained in $Z^{a1}$, a cyclohexane ring which may be substituented and a benzene ring which may be substituented, or a group in which these are bonded via a linking group (preferably an alkylene group having 1 to 3 carbon atoms) are preferable. More preferably, the ring structure is a cyclohexylene group which may be substituented, a phenylene group which may be substituented, or a xylylene group which may be substituented. A further more preferable ring structure contained in $Z^1$ is a cyclohexane ring having one or more groups selected from the group consisting of an alkyl group having 1 to 3 carbon atoms, a divalent linking group represented by —NH—(C=O)—O— and a divalent linking group represented by —NH—(C=O)—NR— as a substituent, or a benzene ring having one or more groups selected from the group consisting of an alkyl group having 1 to 3 carbon atoms, a divalent linking group represented by —NH—(C=O)—O— and a divalent linking group represented by —NH—(C=O)—NR—, as a substituent. In the embodiment, containing the ring structure in one of or both of both terminal groups of a compound represented by formula A-1 is preferable, and not containing the same is also preferable.

Moreover, in another embodiment, $Z^{a1}$ is preferably a linear aliphatic group, more preferably an alkylene group, further preferably, $Z^1$ is an alkylene group and at least one of both terminal groups of a compound represented by formula A-1 does not contain a ring structure, and further more preferably, $Z^{a1}$ is an alkylene group and both of both terminal groups of a compound represented by formula A-1 do not contain a ring structure.

Examples of preferable embodiments of the compound represented by formula A-1 can include a compound represented by formula A-2 below.

Formula A-2

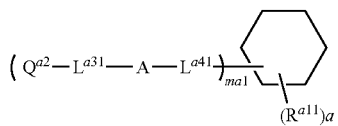

In formula A-2, $Q^{a2}$ represents a substituent, each of $L^{a31}$ and $L^{a41}$ independently represents a single bond, or any of an alkylene group, an arylene group, —O—, —NR$^1$—, —S— and —C(=O)— or a group comprised of a combination of two or more of them. $R^1$ represents a hydrogen atom or a substituent. A represents a single bond, *—X—C(=O)—NH—, or *—NH—C(=O)—X—, and * represents a bonding position with $L^{a41}$. $R^{a11}$ represents an alkyl group having 1 to 3 carbon atoms. a represents an integer ranging from 0 to 10, and, when a is equal to or higher than 1, $R^{a11}$ existing in plural number may be the same as or different from each other. ma1 represents 2 or 3, and $Q^{a2}$, $L^{a31}$, $L^{a41}$ and A each exists in plural number may be the same as or different from each other, respectively. However, at least one A represents *—X—C(=O)—NH— or *—NH—C(=O)—X—. At least one of $Q^{a2}$ existing in plural number represents the above-described polar group, or represents a terminal group contained in the above-described polar group. When A represents *—NH—C(=O)—X—, X represents —NR—, $L^{a31}$ represents a single bond, and $Q^{a2}$ contains a ring structure, a ring structure contained in $Q^{a2}$ may be a ring structure formed together with R in —NR—.

$Q^{a2}$ represents a substituent, and at least one of $Q^{a2}$ existing in plural number represents the above-described polar group. $Q^{a2}$ has the same meaning as that of $Q^{a1}$ in formula A-1, and the same also applies to the preferable range.

Each of $L^{a31}$ and $L^{a41}$ independently has the same meaning as that of each of $L^{a11}$ and $L^{a21}$ in formula A-1, and the same also applies to the preferable range.

$R^{a11}$ represents an alkyl group having 1 to 3 carbon atoms and includes a methyl group, an ethyl group, a 1-propyl group, a 2-propyl group, and the like. $R^{11}$ is preferably a methyl group.

ma1 represents 2 or 3, and 2 is preferable. a represents an integer of 0 to 10, and is preferably 0 to 5, more preferably 0 to 3, further more preferably 1 to 3.

Specific examples of bonding positions of two or three side chains in a cyclohexane ring in formula (A-2) include those described below.

described below is a position to be bonded with

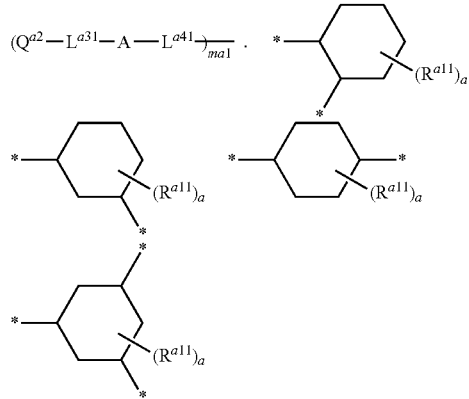

Preferable embodiments of a compound represented by formula A-1 can also include a compound represented by formula (A-3) below.

Formula A-3

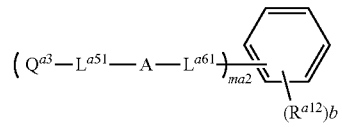

In formula A-3, V represents a substituent, each of $L^{a51}$ and $L^{a61}$ independently represents a single bond, or any one of or any combination of an alkylene group, —O—, —NR$^1$—, —S— and —C(=O)—. $R^1$ represents a hydrogen atom or a substituent. A represents a single bond, *—X—C(=O)—NH—, or *—NH—C(=O)—X—, and * represents a bonding position with $L^{a61}$. $R^{a12}$ represents an alkyl group having 1 to 3 carbon atoms, and b represents an integer ranging from 0 to 5. When b is an integer equal to or higher than 1, $R^{a12}$ existing in plural number may be the same as or different from each other. ma2 represents 2 or 3, and $Q^{a3}$, $L^{a51}$, $L^{a61}$ and A existing in plural number may be the same as or different from each other. At least one A existing in plural number represents *—X—C(=O)—NH— or *—NH—C(=O)—X—, and at least one $Q^{a3}$ existing in plural number represents the above-described polar group or represents a terminal group contained in the above-described polar group.

$Q^{a3}$ represents a substituent, and at least one $Q^{a3}$ existing in plural number contains the above-described polar group. V has the same meaning as that of $Q^{a1}$ in formula A-1, and the same also applies to the preferable range.

Each of $L^{a51}$ and $L^{a61}$ independently has the same meaning as that of each of $L^{a11}$ and $L^{a21}$ in formula A-1, and the same also applies to the preferable range.

$R^{a12}$ represents an alkyl group having 1 to 3 carbon atoms and includes a methyl group, an ethyl group, a 1-propyl group, a 2-propyl group, and the like. $R^{a12}$ is preferably a methyl group.

ma2 represents 2 or 3, and is preferably 2. b represents an integer of 0 to 5, and is preferably 0 to 3, particularly preferably 0.

Specific examples of bonding positions of two or three side chains in a benzene ring in formula A-3 include those described below.

below is a position to be bonded with

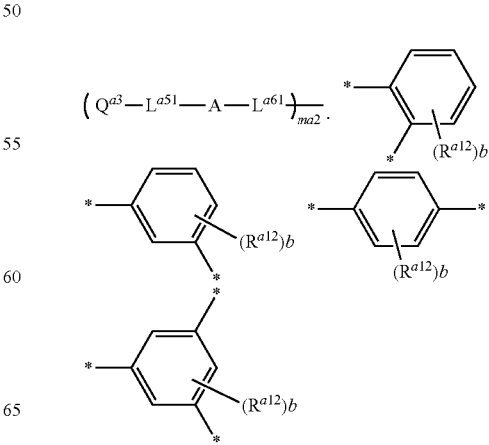

Preferable embodiments of a compound represented by formula A-2 can include a compound represented by formula A-4 below, and preferable embodiments of a compound represented by formula A-3 can include a compound represented by formula A-5 below.

Formula A-4

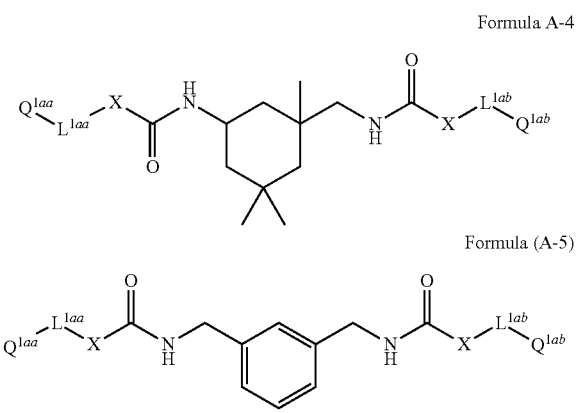

Formula (A-5)

In formulas A-4, A-5, each of $L^{1aa}$ and $L^{1ab}$ independently represents a single bond, or any one of or any combination of an alkylene group, an arylene group, —O— and —C(=O)—. X represents —O— or —NR—, and R represents a hydrogen atom or a substituent. X existing in plural number may be the same as or different from each other. Each of $Q^{1aa}$ and $Q^{1ab}$ independently represents a cyano group, a hydroxyl group, a succinimide group, a hexahydrophthalimide group, a methoxycarbonyl group, an alkoxycarbonylamino group, an alkylaminocarbonyloxy group, an alkylaminocarbonylamino group, an alkyl group, a phenyl group or a benzyl group, or a morpholino group that is formed together with R in —NR— when an adjacent $L^{1aa}$ or $L^{1ab}$ represents a single bond and X represents —NR—. At least one of $Q^{1aa}$ and $Q^{1ab}$ represents the above-described polar group, or a terminal group contained in the above-described polar group.

Each of $L^{1aa}$ and $L^{1ab}$ independently represents a single bond, or any one or of any combination of an alkylene group, an arylene group, —O— and —C(=O)—. The alkylene group has the same meaning as that described before, regarding the alkylene group contained in $L^{a1}$ and $L^{a2}$ in formula A. Furthermore, in groups represented by $L^{1aa}$ and $L^{1ab}$, the number of carbon atoms in the main chain part preferably ranges from 1 to 10, and more preferably ranges from 1 to 5.

Each of $Q^{1aa}$ and $Q^{1ab}$ independently represents a cyano group, a hydroxyl group, a succinimide group, a hexahydrophthalimide group, a methoxycarbonyl group, an alkoxycarbonylamino group, an alkylaminocarbonyloxy group, an alkylaminocarbonylamino group, an alkyl group, a phenyl group or benzyl group, or represents the above-described morpholino group. At least one of them represents the above-described polar group, or represents a terminal group contained in the above-described polar group. Preferable combinations of $Q^{1aa}$ and $Q^{1ab}$ include combinations described below.
(Combination 1) cyano group/cyano group
(Combination 2) succinimide group/succinimide group
(Combination 3) hexahydrophthalimide group/hexahydrophthalimide group
(Combination 4) cyano group/phenyl group
(Combination 5) methoxycarbonyl group/phenyl group
(Combination 6) hydroxyl group/hydroxyl group
(Combination 7) morpholino group/cyano group
(Combination 8) alkoxycarbonylamino group/alkoxycarbonylamino group
(Combination 9) alkoxycarbonylamino group/aminocarbonyloxy group
(Combination 10) alkoxycarbonylamino group/alkyl group
(Combination 11) aminocarbonyloxy group/alkyl group X has the same meaning as that of X in formula A-1, and the same also applies to the preferable range.

Examples of preferable embodiments of a compound represented by formula A-4 can include a compound represented by formula A-6 below, and examples of preferable embodiments of a compound represented by formula A-5 can include a compound represented by formula A-7 below and a compound represented by formula A-8 below.

Formula A-6

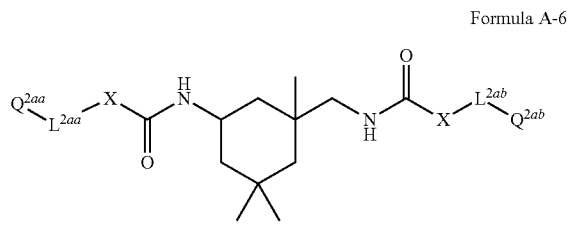

In formula A-6, each of $Q^{2aa}$ and $Q^{2ab}$ independently represents a cyano group, a methoxycarbonylamino group, an ethoxycarbonylamino group, a 1-propoxycarbonylamino group, a 2-propoxycarbonylamino group, a methylaminocarbonyloxy group, an ethylaminocarbonyloxy group, a 1-propylaminocarbonyloxy group, a 2-propylaminocarbonyloxy group, an alkyl group, a phenyl group, or a benzyl group, and at least one of them represents a cyano group, a methoxycarbonylamino group, an ethoxycarbonylamino group, a 1-propoxycarbonylamino group, a 2-propoxycarbonylamino group, a methylaminocarbonyloxy group, an ethylaminocarbonyloxy group, a 1-propylaminocarbonyloxy group, or a 2-propylaminocarbonyloxy group. Preferably both $Q^{2a}$ and $Q^{2b}$ represent a cyano group. Each of $L^{2aa}$ and $L^{2ab}$ independently represents a single bond, or any one of or any combination of an alkylene group, an arylene group, —O— and X represents —O— or —$NR^1$—, and $R^1$ represents a hydrogen atom or a substituent. X existing in plural number may be the same as or different from each other.

Formula A-7

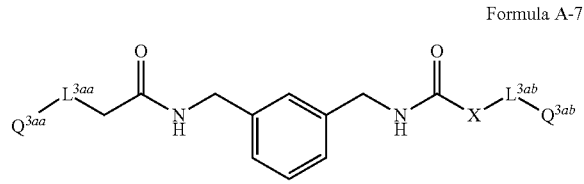

In formula A-7, one of $Q^{3aa}$ and $Q^{3ab}$ represents a cyano group, a succinimide group or a hexahydrophthalimide group, and the other represents an alkyl group, a phenyl group or a benzyl group.

In a preferable embodiment, one of $Q^{3aa}$ and $Q^{3ab}$ represents a cyano group, and the other represents a phenyl group.

Furthermore, in another embodiment, in a compound represented by formula A-7, preferably, both $Q^{3aa}$ and $Q^{3ab}$ do not contain a cyano group at the same time. For example, when one of $Q^{3aa}$ and $Q^{3ab}$ is a cyano group-substituted alkyl group, the other is preferably a succinimide group or a hexahydrophthalimide group. Moreover, when one of $Q^{3aa}$ and $Q^{3ab}$ is a cyano group, the other is preferably a phenyl group or a benzyl group.

In an embodiment, the alkyl group is an unsubstituted alkyl group, and, in another embodiment, the alkyl group is a substituted alkyl group. Examples of substituted alkyl groups include an arylcarbonylalkyl group such as a benzoylalkyl group, an aryloxyalkyl group such as a phenyloxyalkyl group, and the like.

Each of $L^{3aa}$ and $L^{3ab}$ independently represents a single bond, or any one of or any combination of an alkylene group, an arylene group, —O— and —C(=O)—. X represents —O— or —NR—, and R represents a hydrogen atom or a substituent. X existing in plural number may be the same as or different from each other.

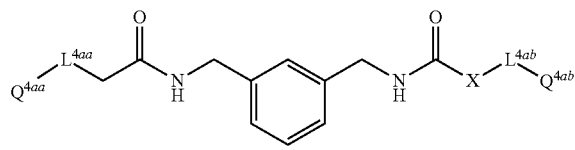

Formula A-8

In formula A-8, each of $Q^{4aa}$ and $Q^{4ab}$ independently represents a methoxycarbonylamino group, an ethoxycarbonylamino group, a 1-propoxycarbonylamino group, a 2-propoxycarbonylamino group, a methylaminocarbonyloxy group, an ethylaminocarbonyloxy group, a 1-propylaminocarbonyloxy group, a 2-propylaminocarbonyloxy group, an alkyl group, an phenyl group or a benzyl group, and at least one of these represents a methoxycarbonylamino group, an ethoxycarbonylamino group, a 1-propoxycarbonylamino group, a 2-propoxycarbonylamino group, a methylaminocarbonyloxy group, an ethylaminocarbonyloxy group, a 1-propylaminocarbonyloxy group or 2-propylaminocarbonyloxy group. Each of $L^{4aa}$ and $L^{4ab}$ independently represents a single bond, or any one or any combination of an alkylene group, an arylene group, —O— and —C(=O)—. X represents —O— or —NR—, and R represents a hydrogen atom or a substituent. X existing in plural number may be the same as or different from each other.

$L^{2aa}$, $L^{a2b}$, $L^{3aa}$, $L^{3ab}$, $L^{4aa}$, and $L^{4ab}$ in formulas A-6, A-7, and A-8 have the same meaning as that of $L^{1aa}$, and $L^{1ab}$ in formulas A-4, and A-5, respectively, and the same also applies to the preferable range.

X in formulas A-6, A-7, and A-8 has the same meaning as that of X in formula A-1, and the same also applies to the preferable range.

Compounds explained above has an equivalent U equal to or lower than 515, the U being obtained as U=[(molecular weight)/(number of linking groups selected from the group consisting of a divalent linking group represented by —NH—(C=O)—O— and a divalent linking group represented by —NH—(C=O)—NR— and R represents a hydrogen atom or a substituent, contained per molecule)]. A smaller value of the equivalent U means that the content ratio of the linking group per one molecule is higher. The value of the equivalent U is preferably equal to or lower than 450, more preferably equal to or lower than 420, and further more preferably equal to or lower than 300. The lower limit thereof is not particularly limited, and, for example, is equal to or higher than 100.

Hereinafter, compounds to be preferably used in the present invention among the above-described compounds are exemplified, but the present invention is not limited to these.

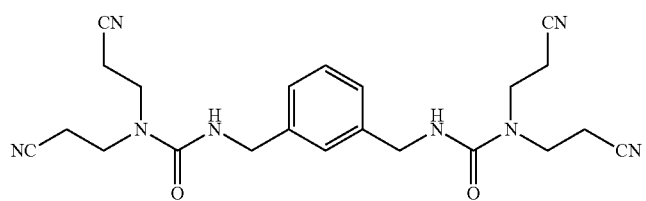

11-1

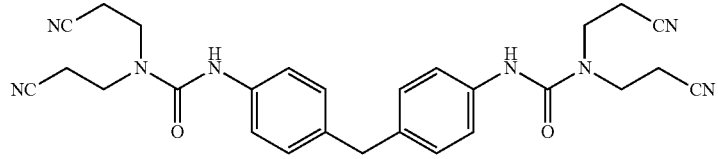

11-2

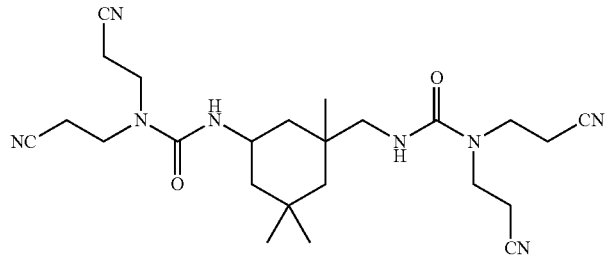

11-3

11-4
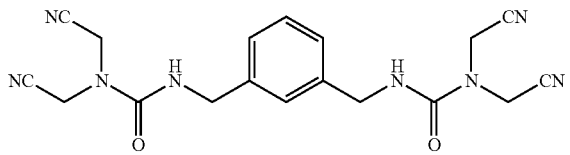
11-5
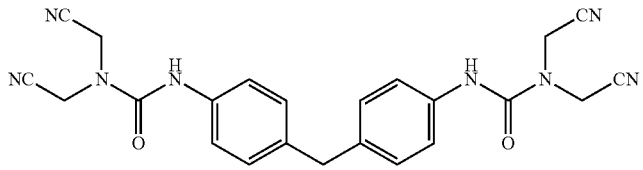
11-6
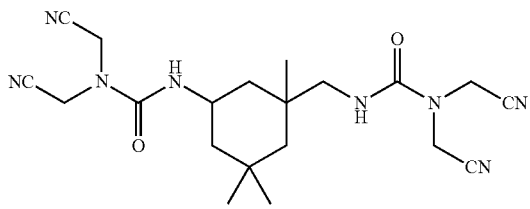
11-7
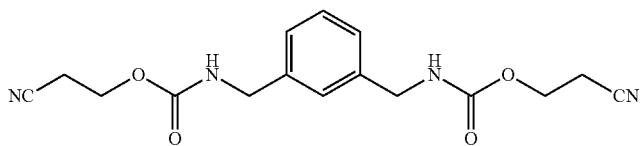
11-8
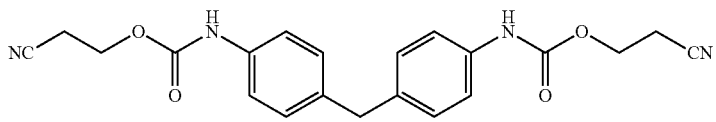
11-9
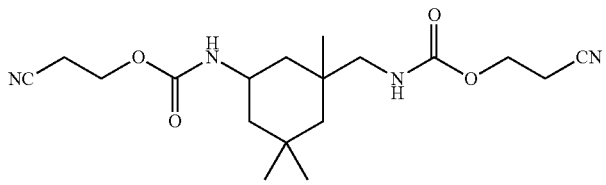
11-10
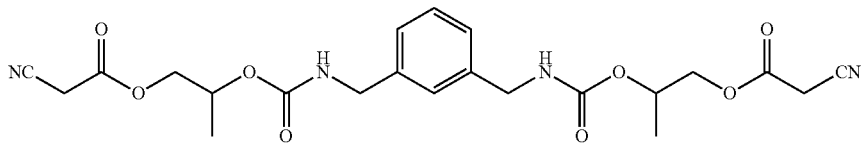
11-11
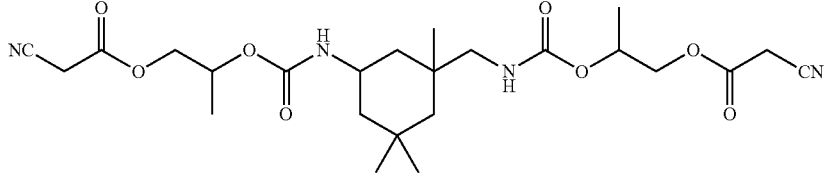
11-12
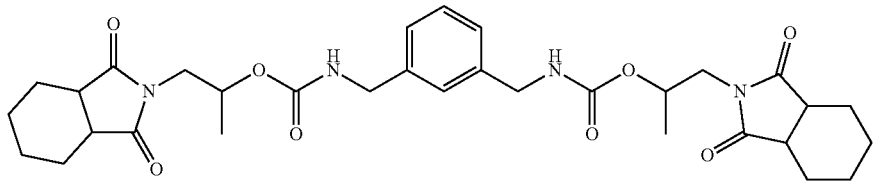

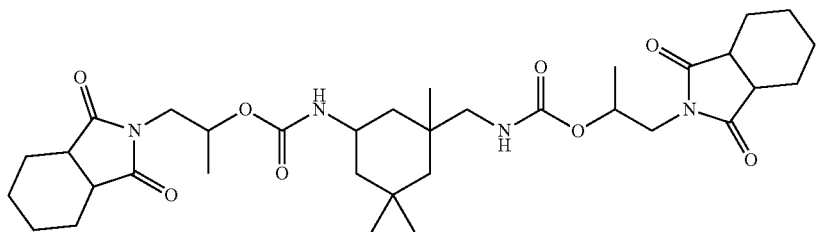
11-13
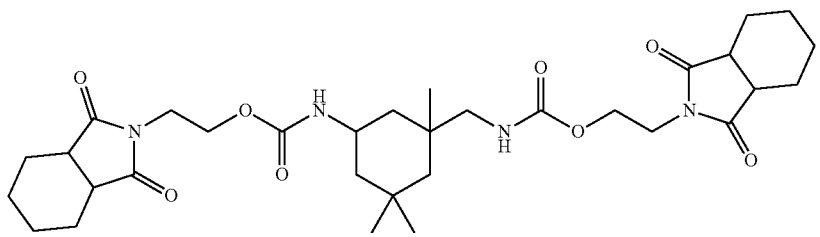
11-14
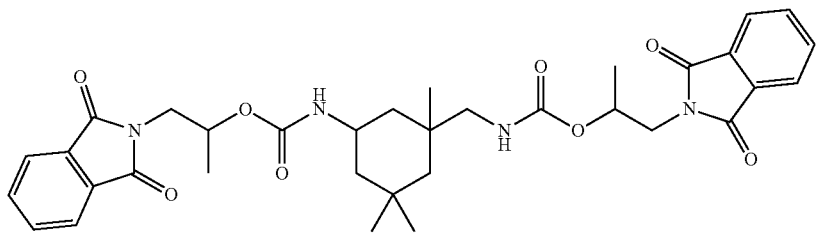
11-15
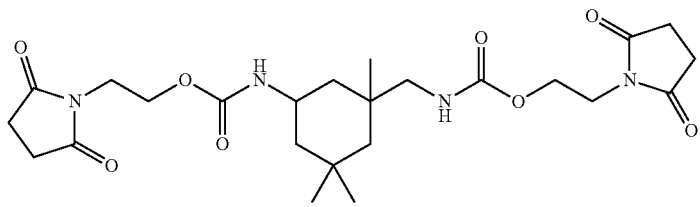
11-16
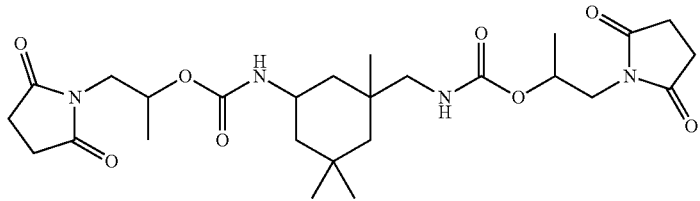
11-17
TABLE 1
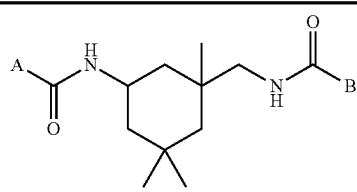
| Compound No. | A | B | Compound No. | A | B |
|---|---|---|---|---|---|
| 12-1-A | *—OCH$_2$CH$_2$OPh | *—N(CH$_3$)CH$_2$COOCH$_3$ | 2-1-B | *—N(CH$_3$)CH$_2$COOCH$_3$ | *—OCH$_2$CH$_2$OPh |
| 12-2-A | *—OCH$_2$CH$_2$OPh | *—N(CH$_2$CH$_2$CN)$_2$ | 2-2-B | *—N(CH$_2$CH$_2$CN)$_2$ | *—OCH$_2$CH$_2$OPh |

TABLE 1-continued
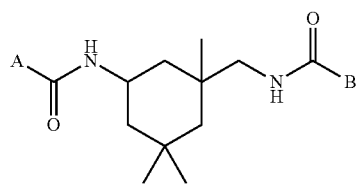
| Compound No. | A | B | Compound No. | A | B |
| --- | --- | --- | --- | --- | --- |
| 12-3-A | *—OCH₂CH₂OPh | *—N(CH₂CN)₂ | 2-3-B | *—N(CH₂CN)₂ | *—OCH₂CH₂OPh |
| 12-4-A | *—OCH₂CH₂CN | *—N(CH₂CH₂CN)₂ | 2-4-B | *—N(CH₂CH₂CN)₂ | *—OCH₂CH₂CN |
| 12-5-A | *—OCH₂CH₂CN | *—N(CH₂CN)₂ | 2-5-B | *—N(CH₂CN)₂ | *—OCH₂CH₂CN |
| 12-6-A | *—OCH₂CH₂OPh | *—OCH₂CH₂CN | 2-6-B | *—OCH₂CH₂CN | *—OCH₂CH₂OPh |
(In Table, Ph: a phenyl group, *: a bonding position)
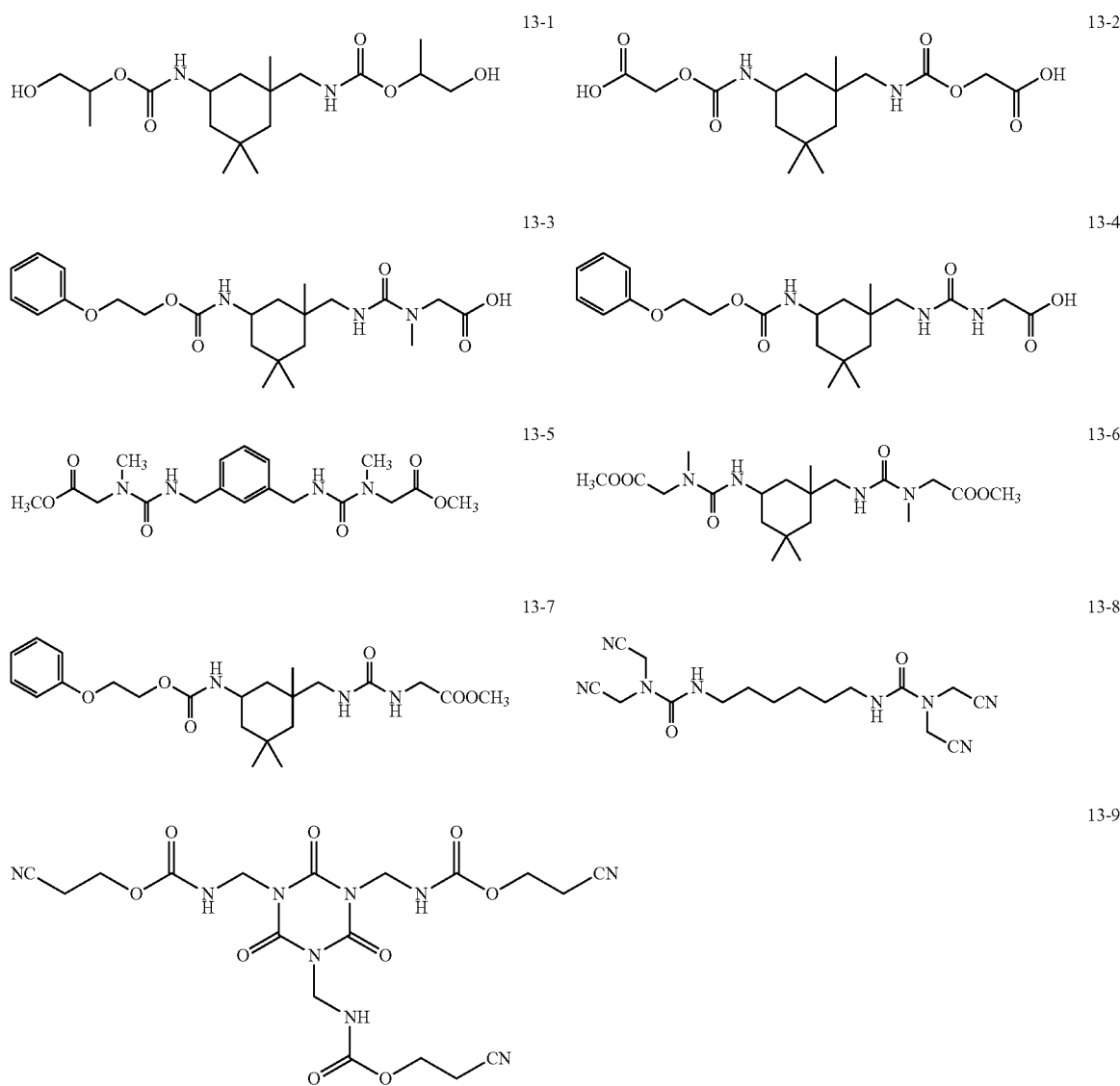

-continued
13-10
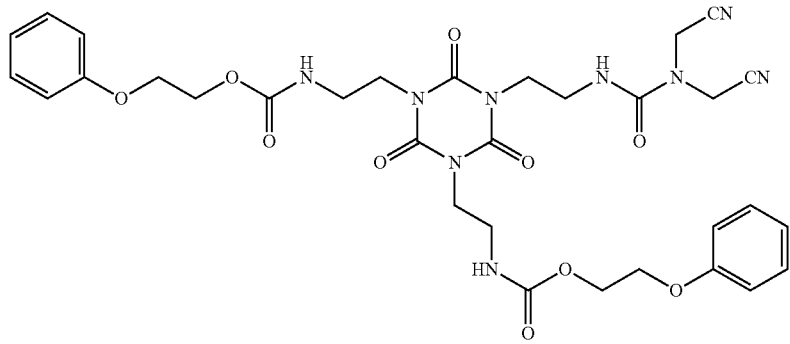
13-11
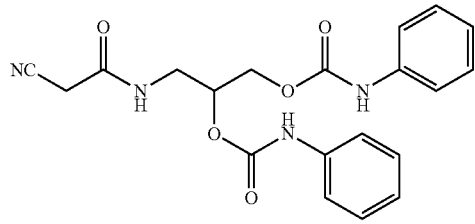
13-12
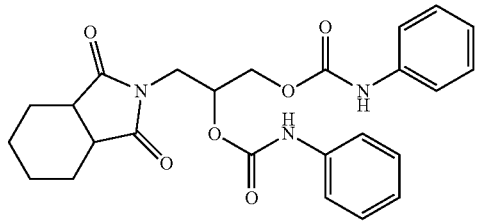
13-13
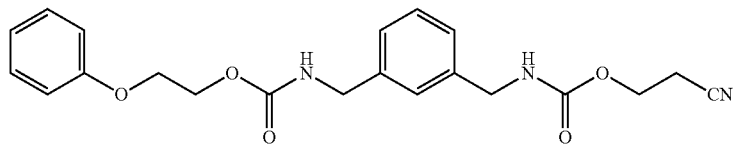
13-14
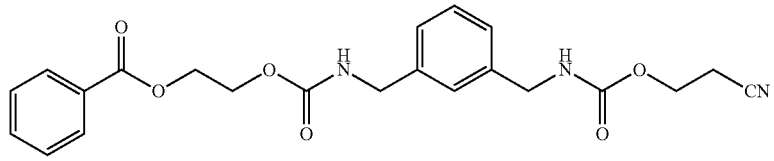
13-15
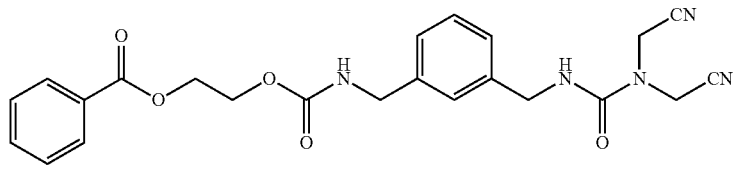
13-16
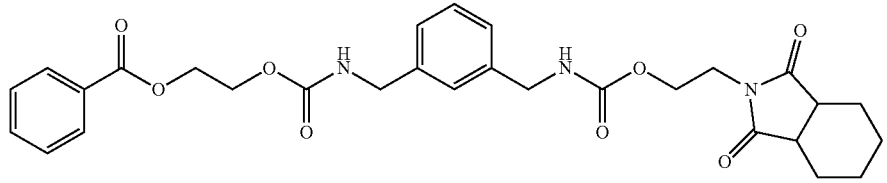
13-17
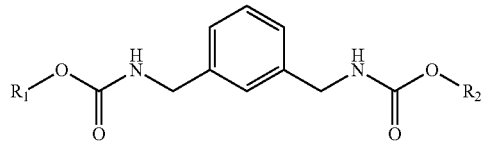
Mixture of
$R_1, R_2 =$ —CH$_2$CH$_2$OPh, —CH$_2$CH$_2$CN 13-18
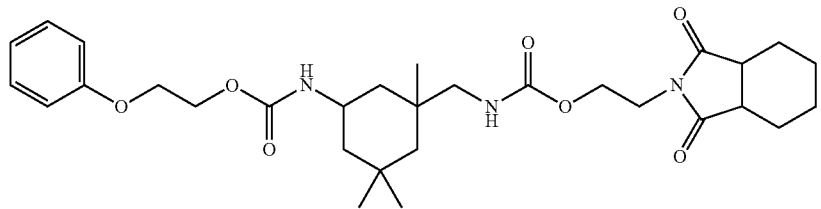
13-19
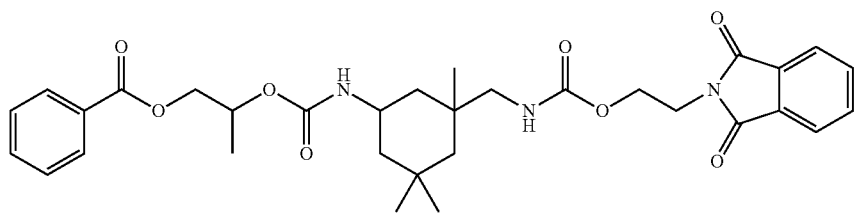
13-20
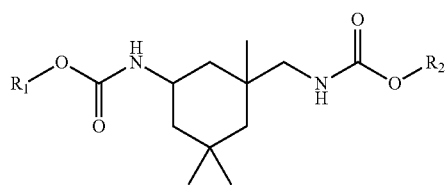
Mixture of
R₁, R₂ = —CH₂CH₂OPh, —CH₂CH₂CN
13-21
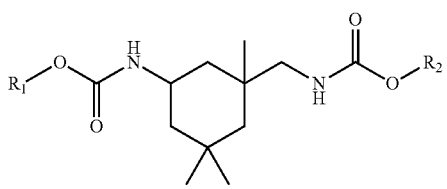
Mixture of
R₁, R₂ = —CH₂CH₂OPh, —CH₂CH₂-N(phthalimide)
13-22
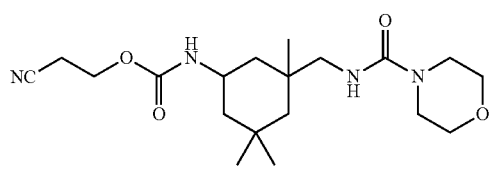
14-1
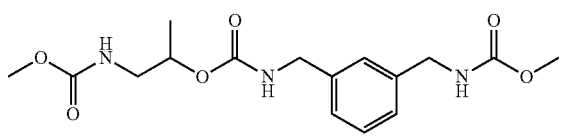
14-2
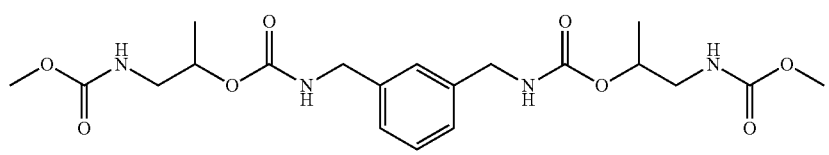
14-3
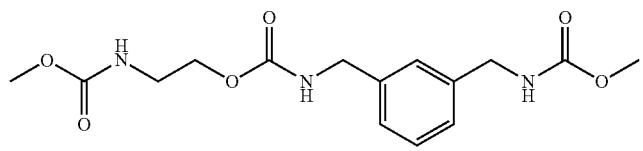
14-4
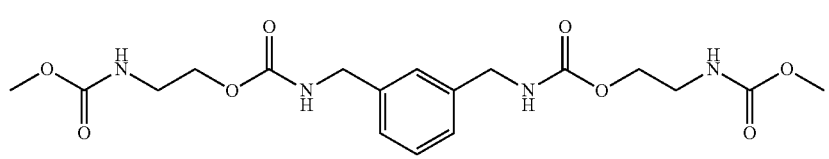

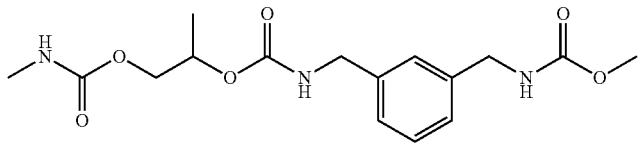
14-5
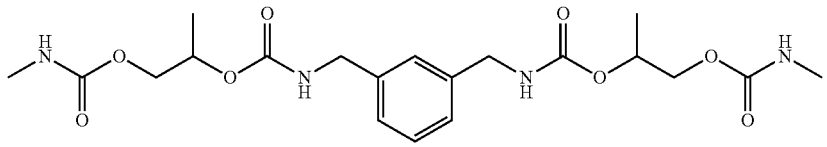
14-6
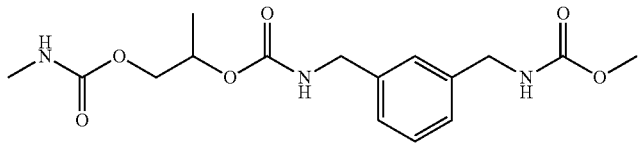
14-7
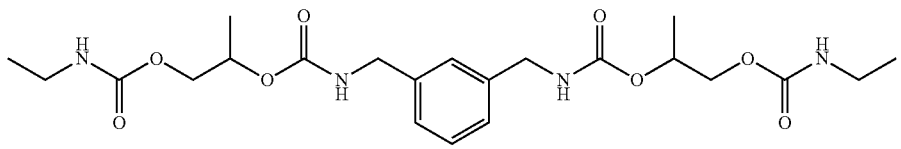
14-8
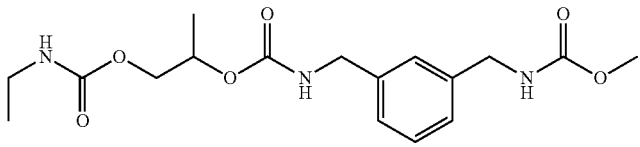
14-9
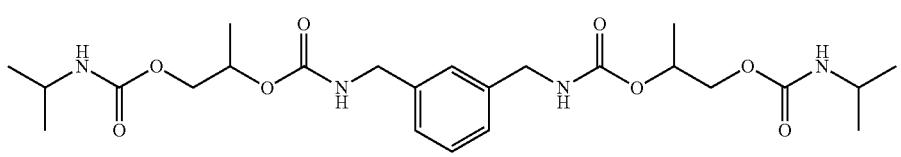
14-10
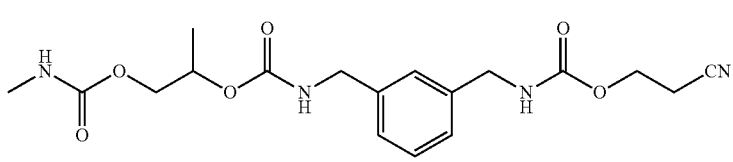
14-11
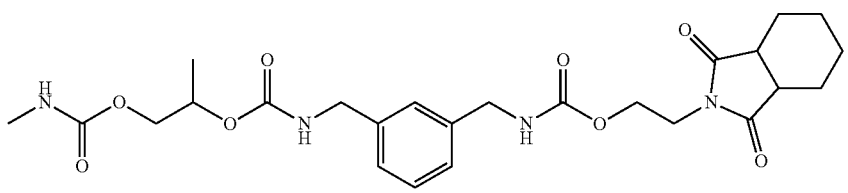
14-12
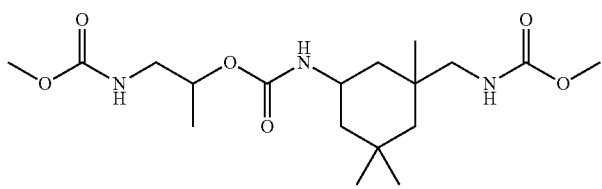
15-1

-continued
15-2
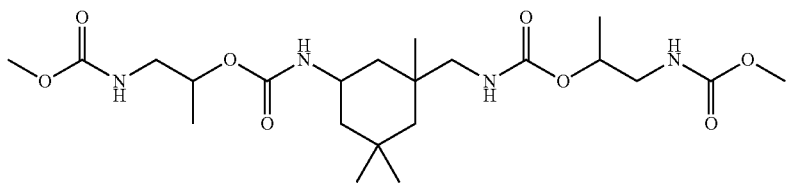
15-3
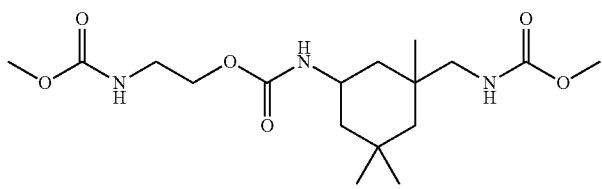
15-4
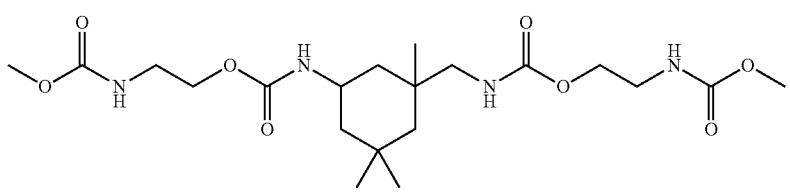
15-5
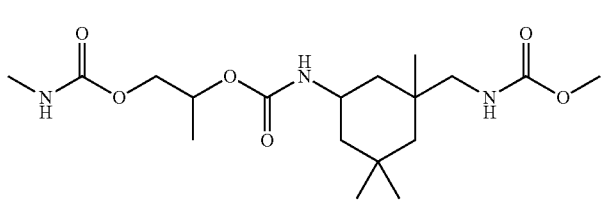
15-6
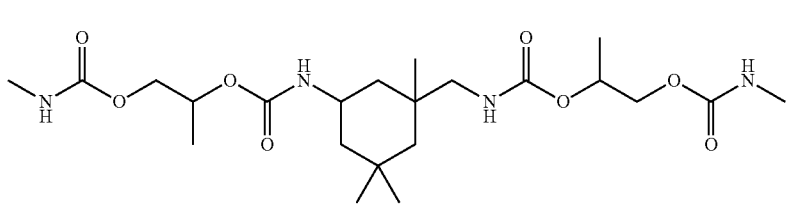
15-7
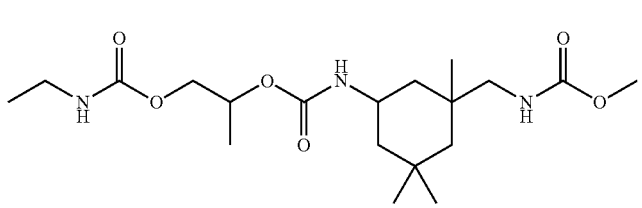
15-8
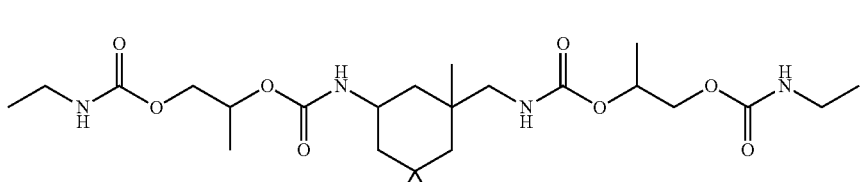
15-9
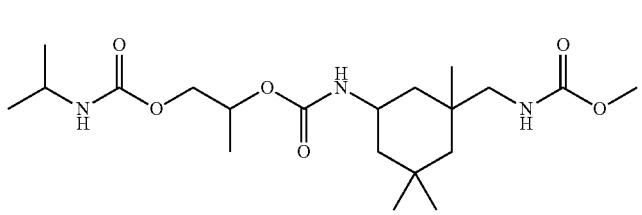

15-10
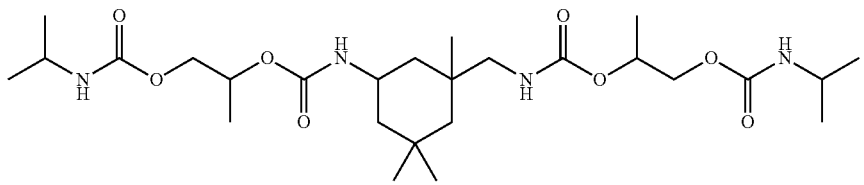

15-11
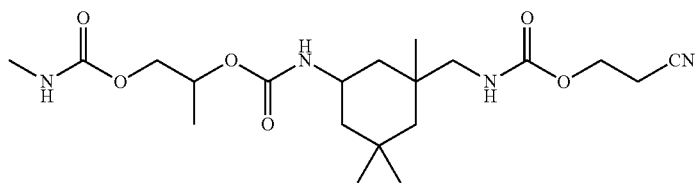

15-12
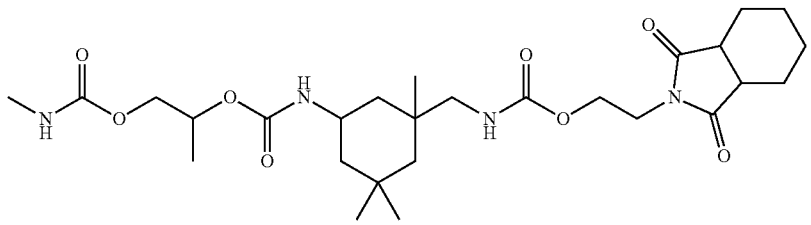

16-1
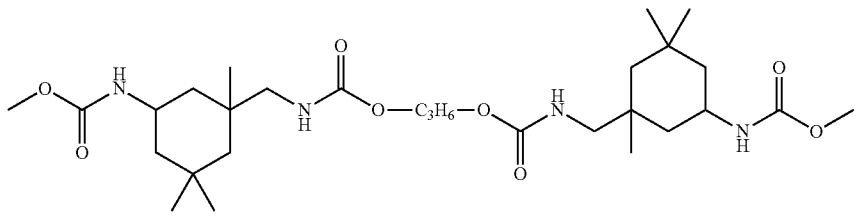

16-2
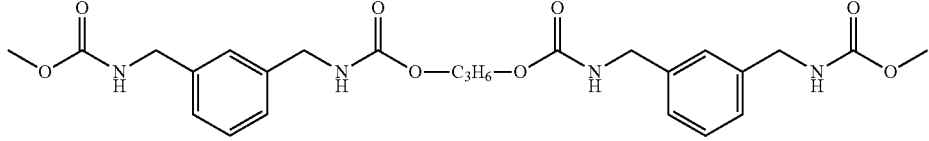

16-3
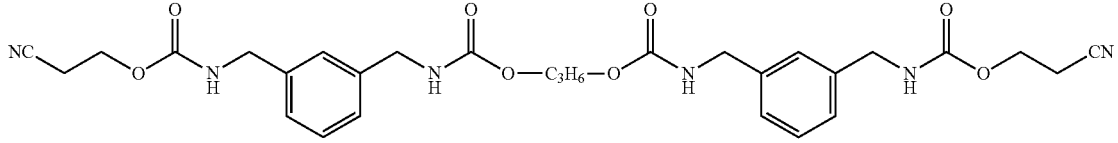

(In exemplified compounds 16-1 to 16-3, —C$_3$H$_6$— is —CH(CH$_3$)— or —CH$_2$—CH(CH$_3$)—.)

The degree of hydrophilicity of the above-described compound as a whole can be represented as a C log P value. The C log P is as described above. The C log P of the compound is preferably −1.0 to 12.0, more preferably 0.0 relative to 100, and further more preferably 1.0 to 8.0.

In addition, the melting point of the compound is preferably −50 to 250° C., more preferably −30 to 200° C. By setting the melting point in the range, the effect of the present invention tends to be exerted more effectively.

A measurement method of the melting point is not particularly limited, and can be selected appropriately from known methods, including, for example, a measurement method that uses a melting point measurement apparatus for a minute amount.

Hereinbefore, specific embodiments of compounds having each of δh and δχ in the above-described range are represented, but the represented embodiments are a mere exemplification and the present invention is not limited to these. Furthermore, certain compounds represented by formula (I) or formula A can have δχ that is in the above-described range or that is not in the above-described range, by the relationship with a polymer co-existing in the polymer film. In the production of a polymer film, a compound having δχ that is in the above-described range, by the relationship with a co-existing polymer, can be selected and used.

<Carbonyl Bond-Containing Polymer>

Examples of carbonyl bond-containing polymers can include various polymers each having a carbonyl bond (C=O). A polymer film may contain only one kind of carbonyl bond-containing polymer, or may contain two or more kinds of carbonyl bond-containing polymers that may have different structures. In the polymer film, a component having the largest ratio (the component is referred to as the "main component") is preferably a carbonyl bond-containing polymer. As to the content of a carbonyl bond-containing polymer in the polymer film, the carbonyl bond-containing polymer is preferably contained in an amount equal to or higher than 50% by mass relative to the total amount of resin components in the polymer film, preferably in an amount equal to or higher than 60% by mass, more preferably in an amount equal to or higher than 70% by mass, still more preferably in an amount equal to or higher than 80% by mass, and further more preferably in an amount equal to or higher than 85% by mass. The upper limit of the polymer content is not particularly limited. In a polymer film containing two or more kinds of carbonyl bond-containing polymers, the content means the total content of two or more kinds of carbonyl bond-containing polymers. The same also applies to other components. In addition, the polymer film can contain approximately 50 to 95% by mass of resin components relative to the film mass, but the ratio is not limited to this.

Examples of carbonyl bond-containing polymers suitable for a film member for a liquid crystal display device include cellulose ester, (meth)acrylic polymer and cycloolefin-based polymer. Hereinafter, these will be explained in more details, but the present invention is not limited to embodiments using the polymer described below.

(Cellulose Ester)

As a cellulose ester, known cellulose esters to be used in the manufacturing of a cellulose ester film can be used without any limitation. The cellulose ester is preferably cellulose acylate. As cellulose acylate, known cellulose acylate to be used in the manufacturing of a cellulose acylate film can be used without any limitation. The substitution degree of cellulose acylate means an acylation percentage of three hydroxyl groups existing in a constitutional unit of cellulose (glucose in a (β)1,4-glycosidic bond state). The substitution degree (acylation degree) can be calculated by measuring the amount of bonded fatty acid (or bonded carboxylic acid) per mass of the constitutional unit of cellulose. In the present invention, the substitution degree of a cellulose body can be calculated by dissolving the cellulose body in a solvent such as deuterated dimethyl sulfoxide and measuring the $^{13}$C-NMR spectrum thereof to thereby obtain a peak intensity ratio of carbonyl carbon in an acyl group. The substitution degree is obtained by substituting a remaining hydroxyl group of cellulose acylate to another acyl group different from the acyl group cellulose acylate itself has, and, after that, by performing $^{13}$C-NMR measurement. Details of the measurement method are described in Tezuka, et al. (Carbohydrate. Res., 273 (1995) 83-91).

The substitution degree of cellulose acylate is preferably equal to or higher than 1.50 and equal to or lower than 3.00, more preferably 2.00 to 2.97, furthermore preferably equal to or higher than 2.30 and less than 2.97, particularly preferably 2.30 to 2.95.

Furthermore, in a cellulose acetate in which only an acetyl group is used as an acyl group of the cellulose acylate, from the viewpoint that the compound gives a large improvement effect of film scratch resistance, the substitution degree is preferably equal to or higher than 2.00 and equal to or lower than 3.00, more preferably 2.20 to 3.00, further preferably 2.30 to 3.00, further more preferably 2.30 to 2.97, and particularly preferably 2.30 to 2.95.

An acetyl group, a propionyl group, or a butyryl group is preferable as an acyl group of cellulose acylate, and an acetyl group is more preferable.

A mixed fatty acid ester comprising two or more kinds of acyl groups is also used preferably as cellulose acylate in the present invention. Also in this case, an acetyl group or an acyl group having 3 to 4 carbon atoms is preferable as an acyl group. Furthermore, when an acetyl group is contained as an acyl group in the case where a mixed fatty acid ester is to be used, the substitution degree thereof is preferably less than 2.5, more preferably less than 1.9. On the other hand, the substitution degree when an acyl group having 3 to 4 carbon atoms is contained is preferably 0.1 to 1.5, more preferably 0.2 to 1.2, particularly preferably 0.5 to 1.1.

In the present invention, two kinds of cellulose acylates in which one or both of a substituent and a substitution degree are different may be used together in a mixture, or a film comprising a plurality of layers comprising different cellulose acylates may be formed by a co-casting method to be described later and the like.

Moreover, mixed acid esters having an aliphatic acyl group and a substituted or unsubstituted aromatic acyl group, described in JP-A-No. 2008-20896, paragraphs 0023 to 0038 can also be used preferably in the present invention. The content of the above publication is expressly incorporated herein by reference in its entirety The cellulose acylate preferably has a weight-average polymerization degree of 250 to 800, and more preferably has a weight-average polymerization degree of 300 to 600. Furthermore, the cellulose acylate to be used in the present invention preferably has a number-average molecular weight of 40000 to 230000, more preferably has a number-average molecular weight of 60000 to 230000, and most preferably a number-average molecular weight of 75000 to 200000.

Cellulose acylate can be synthesized using acid anhydride or acid chloride as an acylating agent. When the acylating agent is acid anhydride, an organic acid (for example, acetic acid) or methylene chloride is used as a reaction solvent. In addition, a protic catalyst such as sulfuric acid can be used as a catalyst. When the acylating agent is acid chloride, a basic compound can be used as the catalyst. In the industrially most common synthetic method, cellulose acylate is synthesized by esterifying cellulose with a mixed organic acid component containing organic acids (acetic acid, propionic acid, butyric acid) or acid anhydrides thereof (acetic anhydride, propionic anhydride, butyric anhydride) corresponding to an acetyl group and other acyl groups.

In the above-described method, there are many cases where cellulose such as cotton linter or wood pulp is subjected to an activation treatment with an organic acid such as acetic acid, and, after that, is esterified using a mixed liquid of the above-described organic acid components under the presence of a sulfuric acid catalyst. The organic acid anhydride component is usually used in an excessive amount relative to the amount of hydroxyl groups existing in cellulose. In an esterification process, a hydrolysis reaction (depolymerization reaction) of the cellulose main chain ((β)1,4-glycosidic bond) proceeds in addition to an esterification reaction. When the hydrolysis reaction of main chain proceeds, the polymerization degree of cellulose acylate is decreased and physical properties of a cellulose acylate film to be manufactured are lowered. Therefore, reaction conditions such as reaction temperature are preferably determined in consideration of the polymerization degree and molecular weight of cellulose acylate to be obtained.

(Meth)Acrylic Polymer)

A (meth)acrylic polymer can be obtained by polymerizing a (meth)acrylic monomer. Here, the (meth)acrylic monomer is used in a sense of including an acrylic monomer and a methacrylic monomer. (Meth)acrylic acid to be described later is used in a sense of including acrylic acid and methacrylic acid, in the same way. Furthermore, in the present invention, a monomer is a compound polymerizable with the same kind of monomer or another compound, and is not limited to a monomer but may be a polymer such as an oligomer. The (meth)acrylic polymer may contain a structural unit that is obtained from a monomer other than a (meth)acrylic monomer. The (meth)acrylic polymer is not particularly limited, and one obtained by polymerizing a monomer composition containing an ultraviolet absorptive monomer and a (meth)acrylic monomer is preferable.

The ultraviolet absorptive monomer is a monomer modified by an ultraviolet absorption site, and is preferably a benzophenone-based ultraviolet absorptive monomer or a benzotriazole-based ultraviolet absorptive monomer, more preferably a benzotriazole-based ultraviolet absorptive monomer.

The ultraviolet absorptive monomer may be used alone, or in combination of two or more kinds thereof.

Examples of the (meth)acrylic monomers include various (meth)acrylic monomers such as (meth)acrylic acid and (meth)acrylic acid esters. An alkyl ester of (meth)acrylic acid having 1 to 6 carbon atoms is preferable, and methyl methacrylate is more preferable.

The (meth)acrylic monomer may be used alone, or in combination of two or more kinds thereof.

A (meth)acrylic polymer having a ring structure such as a lactone ring, a maleimide ring or maleic anhydride is preferable as the (meth)acrylic polymer, from the viewpoint of having high heat resistance, high transparency, and high mechanical strength.

A (meth)acrylic polymer manufactured from a monomer composition that additionally contains the above-described ultraviolet absorptive monomer in a monomer composition to be used in manufacturing a (meth)acrylic polymer having a lactone ring structure is preferable as the (meth)acrylic polymer having a lactone ring structure, the polymer being described in JP-A-Nos. 2000-230016, 2001-151814, 2002-120326, 2002-254544, 2005-146084, 2006-171464 or the like. The contents of the above publications are expressly incorporated herein by reference in their entirety.

The weight-average molecular weight (Mw) of the (meth) acrylic polymer is preferably equal to or higher than 1,000 and equal to or lower than 2,000,000, more preferably equal to or higher than 5,000 and equal to or lower than 1,000,000, and further more preferably equal to or higher than 10,000 and equal to or lower than 1,000,000.

(Cycloolefin Polymer)

The cycloolefin polymer is preferably a cycloolefin polymer having a carbonyl bond and at least a polar group. As the result that a cycloolefin polymer has at least one polar group, solubility in an organic solvent is enhanced, thereby making it possible to perform solution film formation. The solution film formation can be performed at lower temperatures than that of melting film formation, and thus decomposition and vaporization of additives are difficult to occur, which is preferable.

Examples of the polar groups include a hydroxyl group, an alkoxy group having 1 to 10 carbon atoms, an acyloxy group having 1 to 10 carbon atoms, an alkoxycarbonyl group having 2 to 10 carbon atoms, an aryloxycarbonyl group, a cyano group, an amide group, an imide ring-containing group, a triorganosiloxy group, a triorganosilyl group, an amino group, an acyl group, an alkoxysilyl group having 1 to 10 carbon atoms, a sulfonyl-containing group, a carboxyl group, and the like. Regarding these polar groups, specifically, examples of the alkoxy group include a methoxy group, an ethoxy group, and the like, examples of the acyloxy group include alkylcarbonyloxy groups such as an acetoxy group and a propionyloxy group, and arylcarbonyloxy groups such as a benzoyloxy group, examples of the alkoxycarbonyl group include a methoxycarbonyl group, an ethoxycarbonyl group, and the like, examples of the aryloxycarbonyl group include a phenoxycarbonyl group, a naphthyloxycarbonyl group, a fluorenyloxycarbonyl group, a biphenylyloxycarbonyl group, and the like, examples of the triorganosiloxy group include a trimethylsiloxy group, a triethylsiloxy group, and the like, examples of the triorganosilyl group include a trimethylsilyl group, a triethylsilyl group, and the like, examples of the amino group include a primary amino group, and examples of the alkoxysilyl group include a trimethoxysilyl group, a triethoxysilyl group, and the like.

Among them, an alkoxycarbonyl group is preferable, and a methoxycarbonyl group is more preferable.

A polymer represented by formula (RC) below is preferable as the cycloolefin polymer,

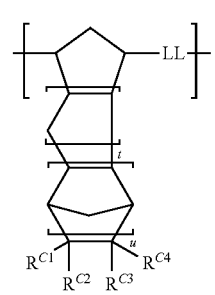

Formula (RC)

In formula (RC), t represents 0 or 1, and u represents 0 or an integer equal to or higher than 1. LL represents a vinylene group or an ethylene group, each of $R^{C1}$ to $R^{C4}$ independently represents a hydrogen atom, a halogen atom, a substituted or unsubstituted hydrocarbon group having 1 to 30 carbon atoms or a polar group, and the hydrocarbon group may be bonded via a linking group having an oxygen atom, a nitrogen atom, a sulfur atom or a silicon atom. Here, two of $R^{C1}$ and $R^{C2}$ or $R^{C3}$ and $R^{C4}$ may be bonded to each other to thereby form a divalent hydrocarbon group, or may form a carbocycle or a heterocycle. A plurality of LL, $R^{C1}$, $R^{C2}$, $R^{C3}$ and $R^{C4}$ may be the same as or different from each other. However, at least one of $R^C$ to $R^{C4}$ is a carbonyl group.

u is preferably an integer of 0 to 2, more preferably 0 or 1.

In addition, the halogen atom in $R^{C1}$ to $R^{C4}$ includes a fluorine atom, a chlorine atom and a bromine atom.

Examples of the hydrocarbon groups having 1 to 30 carbon atoms in $R^{C1}$ to $R^{C4}$ include alkyl groups such as a methyl group, an ethyl group and a propyl group, cycloalkyl groups such as a cyclopentyl group and a cyclohexyl group, alkenyl groups such as a vinyl group, an aryl group and a propenyl group, aryl groups such as a phenyl group, a biphenyl group, a naphthyl group and an anthracenyl group, etc. These hydrocarbon groups may have been substituted, and examples of the substituents include halogen atoms such as a fluorine atom, a chlorine atom and a bromine atom, a phenylsulfony group, etc.

The hydrocarbon group may be directly bonded to the ring structure, or may be bonded via a linking group (linkage). Examples of the linking groups include divalent hydrocarbon groups such as an alkylene group having 1 to 10 carbon atoms represented by —(CH$_2$)$_m$-(m is an integer of 1 to 10), and linking groups containing an oxygen atom, a nitrogen atom, a sulfur atom or a silicon atom. Specific examples of the linking groups containing an oxygen atom, a nitrogen atom, a sulfur atom or a silicon atom include a carbonyl group [—C(=O)—], a carbonyloxy group [—C(=O)O—], an oxycarbonyl group [—OC(=O)—], a sulfonyl group [—SO$_2$—], an ether bond [—O—], a thioether bond [—S—], an imino group [—NH—], an amide bond [—NH—C(=O)—, —C(=O)NH—], a siloxane bond [—OSi(R$^{CA}$)$_2$— (in the formula, R$^{CA}$ is an alkyl group such as a methyl group or an ethyl group)], groups formed by linking two or more of them groups, and the like.

Two of R$^{C1}$ and R$^{C2}$ or R$^{C3}$ and R$^{C4}$ may be bonded to each other to thereby form a divalent hydrocarbon group, a carbocycle or a heterocycle, but preferably do not form the same. The carbocycle or heterocycle may have a monocyclic structure or a polycyclic structure, and the carbocycle and heterocycle may be an aromatic ring or a nonaromatic ring, but the nonaromatic ring is preferable.

Furthermore, regarding a cycloolefin polymer, JP-A-No. 2014-59548, paragraphs 0227 to 0250 can also be referred to. The content of the above publication is expressly incorporated herein by reference in its entirety.

Regarding a method of synthesizing a cycloolefin polymer, JP-A-No. 2001-114836, paragraphs 0039 to 0068 can be referred to. The content of the above publication is expressly incorporated herein by reference in its entirety.

In the cycloolefin polymer, the glass transition temperature (Tg) measured by a differential scanning calorimeter (DSC) is preferably equal to or higher than 70° C., more preferably 90° C. to 185° C., further preferably 100 to 165° C., particularly preferably 120 to 160° C.

The weight-average molecular weight (Mw) of the cycloolefin polymer is preferably 5,000 relative to 1000,000, more preferably 8,000 to 200,000.

In the cycloolefin polymer, saturated water absorption is preferably equal to or lower than 1% by mass, more preferably equal to or lower than 0.8% by mass.

<Additives that May Optionally be Contained in Polymer Film>

The polymer film may contain other additives in addition to a carboxyl group-containing polymer and compounds previously described in detail. Examples of the additives include a known plasticizer, organic acid, dye, polymer, retardation adjuster, ultraviolet absorber, antioxidant, matting agent, and the like. Regarding these, descriptions in JP-A-No. 2012-155287, paragraphs 0062 to 0097 can be referred to, and these contents are incorporated by reference in the specification of the present application. Furthermore, the additive also includes an exfoliation accelerator, an organic acid and polyvalent carboxylic acid derivatives. Regarding these, descriptions in International Publication WO 2015/005398, paragraphs 0212 to 0219 can be referred to, and these contents are incorporated by reference in the specification of the present application.

The content of an additive (where the polymer film contains two or more kinds of additives, the total content thereof) is preferably equal to or lower than 50 parts by mass relative to 100 parts by mass of the carbonyl bond-containing polymer, more preferably equal to or lower than 30 parts by mass.

(Plasticizer)

A plasticizer can be exemplified as one of preferable additives. The hydrophobicity of the polymer film can be enhanced by adding a plasticizer to the polymer film. This is preferable from the viewpoint of lowering the moisture content of the polymer film. The use of a plasticizer can make it difficult to generate display unevenness of a liquid crystal display device caused by humidity where the polymer film is used as a polarizing plate protective film, which is preferable.

The molecular weight of a plasticizer is, from the viewpoint of obtaining satisfactorily the effect caused by the addition, preferably equal to or lower than 3,000, more preferably equal to or lower than 1,500, and further more preferably equal to or lower than 1,000. The molecular weight of a plasticizer is, from the viewpoint of a low vaporization property, for example, equal to or higher than 300, preferably equal to or higher than 350. In the case of a plasticizer of a polymer, the molecular weight means a number-average molecular weight.

Examples of the plasticizers include polyvalent ester compounds of polyhydric alcohols (hereinafter, also referred to as a "polyhydric alcohol ester plasticizer"), polycondensation ester compounds (hereinafter, also referred to as a "polycondensation ester plasticizer"), and carbohydrate compounds (hereinafter, also referred to as a "carbohydrate derivative plasticizer"). Regarding the polyhydric alcohol ester plasticizer, JP-A-No. 2014-077130, paragraphs 0081 to 0098 can be referred to, regarding the polycondensation ester plasticizer, the same gazette, paragraphs 0099 to 0124 can be referred to, and regarding the carbohydrate derivative plasticizer, the same gazette paragraphs 0125 to 0140 can be referred to. The content of the above publication is expressly incorporated herein by reference in its entirety. The content of these plasticizers is, from the viewpoint of satisfying both the addition effect of a plasticizer and the suppression of precipitation of the plasticizer, preferably 1 to 20 parts by mass relative to 100 parts by mass of a polymer, more preferably 2 to 15 parts by mass, and further preferably 5 to 15 parts by mass.

(Antioxidant)

An antioxidant can also be exemplified as one of preferable additives. Regarding the antioxidant, descriptions in International Publication WO 2015/005398, paragraphs 0143 to 0165 can also be referred to, and these contents are incorporated by reference in the specification of the present application.

(Radical Scavenger)

A radical scavenger can also be exemplified as one of preferable additives. Regarding the radical scavenger, descriptions in International Publication WO 2015/005398, paragraphs 0166 to 0199 can be referred to, and these contents are incorporated by reference in the specification of the present application.

(Deterioration Inhibitor)

A deterioration inhibitor can also be exemplified as one of preferable additives. Regarding the deterioration inhibitor, descriptions in International Publication WO 2015/005398, paragraphs 0205 to 0206 can be referred to, and these contents are incorporated by reference in the specification of the present application.

(Barbituric Acid Compound)

The polymer film can also contain a compound having a barbituric acid structure (barbituric acid compound). The barbituric acid compound is a compound that can make the polymer film express various functions by adding the compound. For example, the barbituric acid compound is effective for enhancing the hardness of the polymer film. The barbituric acid compound is also effective for improving durability of a polarizing plate provided with a polymer film containing the compound for light, heat, humidity and the like. Regarding the barbituric acid compound that can be added to the polymer film, for example, descriptions in International Publication WO 2015/005398, paragraphs 0029 to 0060 can be referred to, and these contents are incorporated by reference in the specification of the present application.

<Method of Manufacturing Polymer Film>

The method of manufacturing the polymer film is not specifically limited. The manufacturing is preferably done by the melt film-forming method or solvent casting method, and more preferably done by the solvent casting method, from the viewpoint of volatilization and/or decomposition of additives. For examples of manufacturing polymer films by the solvent casting method, each specification of U.S. Pat. Nos. 2,336,310, 2,367,603, 2,492,078, 2,492,977, 2,492,978, 2,607,704, 2,739,069, and 2,739,070; UK patents 640,731 and 736,892; JP-B-Showa Nos. 45-4554 and 49-5614; JP-A-Nos. Showa 60-176834, 60-203430, and 62-115035, can be referred. Polymer films can also be subjected to stretching treatment. JP-A-Showa No. 62-115035 and Heisei Nos. 4-152125, 4-284211, 4-298310, 11-48271, and the like, can be referred. The contents of the above publications are expressly incorporated herein by reference in their entirety.

(Casting Methods)

Solution casting methods exist in the form of the method of uniformly extruding a prepared dope onto a metal support member through a pressure die; the method based on a doctor blade consisting of adjusting the film thickness of a dope that has been cast onto a metal support member with a blade; the method based on a reverse roll coater of adjustment with a roll rotating in reverse; and the like. The method based in a pressure die is preferred. Examples of a pressure die include a coat hanger type and a T-die type. Any of them is preferably employed. In addition to the examples of methods given here, various conventionally known methods of casting films with polymer solutions can be applied. The various conditions can be set by taking into account differences in the boiling point and the like of the solvent employed.

—Co-Casting

In the formation of the polymer film, the use of a lamination casting method such as a co-casting method, a sequential casting method or an application method is preferable, and the use of a simultaneous co-casting (also referred to as simultaneous multilayer co-casting) method is particularly preferable from the viewpoint of stable manufacturing and manufacturing cost reduction.

Figure 2:
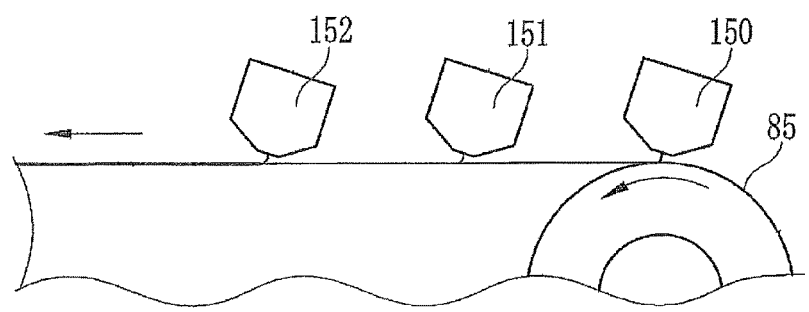
FIG. 2 is a schematic drawing (partially enlarged drawing) showing an example of a manufacturing method (co-casting) of a polymer film.

When the manufacturing is performed by a co-casting method and a sequential casting method, first, cellulose acetate solutions (dope) for respective layers are prepared. The co-casting method (multilayered simultaneous casting) is a casting method in which dopes are extruded from a casting Giesser that extrudes simultaneously respective casting dopes for respective layers (three layers, or more layers are acceptable) from separate slits and the like onto a casting support (band or drum) to thereby simultaneously cast respective layers, and the resultant layers were peeled off at an appropriate timing from the support and dried to thereby form a film. By using the co-casting Giesser, a dope for surface layer and a dope for core layer can be extruded and cast simultaneously for three layers, on the casting support. FIG. 1 is a schematic drawing showing an example of a casting die to be used in co-casting. FIG. 2 is a schematic drawing (partially expanded drawing) showing an example of co-casting. The co-casting according to an example shown in FIGS. 1 and 2 will be further explained in Examples to be described later.

The sequential casting method is a casting method in which a first layer casting dope is first extruded and cast through a casting gisa onto a casting support and, with or without drying, the second layer casting dope is extruded and cast with the casting gisa over the first layer. The dopes of the third, and subsequent layers are sequentially cast and laminated by this procedure as needed. At a suitable time, the film is separated from the support and dried to form a polymer film. The coating method is a method generally in which a core layer film is formed into a film form by a solution film-forming method, the coating liquid that will be coated on the outer layer is prepared, and a suitable coating apparatus is employed to coat and dry the coating liquid on each of, or simultaneously on both of surfaces of the core layer, thereby molding a polymer film of laminate structure.

A polymer film of high scratch resistance and transparency can be obtained by incorporating the above compound into any one or more of these layers, or all of the layers.

(Stretching Process)

A manufacturing method of a polymer film preferably includes a process of stretching a formed polymer film. Regarding the stretching direction of a polymer film, both the polymer film conveying direction (MD (Machine Direction)) and the direction orthogonal to the conveying direction (TD (Transverse Direction)) are preferable, and the direction orthogonal to the polymer film conveying direction (TD) is particularly preferable from the viewpoint of a subsequent polarizing plate processing process using the polymer film. A plurality of stretching process may be performed by dividing the process into two or more steps.

TD direction stretching methods are described in, for example, the publications of JP-A-Showa No. 62-115035 and Heisei Nos. 4-152125, 4-284211, 4-298310, and 11-48271. The contents of the above publications are expressly incorporated herein by reference in their entirety. When conducting stretching in the MD direction, for example, the speed of the conveyor rollers of the polymer film is adjusted so that the winding rate of the polymer film is greater than the peeling rate of the polymer film, thereby stretching the polymer film. When conducting stretching in the TD direction, the polymer film is conveyed while holding the width with a tenter, and gradually widening the width of the tenter to stretch the polymer film. After drying the polymer film, stretching can be conducted with a stretching apparatus (preferably uniaxial stretching with a Long stretching apparatus).

When employing a polymer film as a protective film on a polarizer (also referred to as a "polarizing plate protective film"), to inhibit leakage of light when viewing the polarizing plate diagonally, it is also preerable to dispose the transmission axis of the polarizer and the in-plane slow axis of the polymer film in parallel. Since the transmission axis of a polarizer in the form of a continuously manufactured roll film is generally parallel to the width direction of the roll film, the continuously adhesion of a protective film comprised of a polymer film in the form of a roll film on the polarizer in the form of a roll film requires that the in-plane slow axis of the protective film in the form of a roll film be parallel to the width direction of the polymer film. Accordingly, greater stretching is preferable in the TD direction. The stretch processing can be conducted during the film manufacturing process, or the film can be manufactured and the wound raw sheet can be stretch processed.

The stretching in the TD direction is preferably 5 to 100%, preferably 5 to 80%, and more preferably, 5 to 40%. The term "unstretched" means stretched by 0%. The stretch processing can be conducted during the film manufacturing process, or the film can be manufactured and the wound raw sheet can be stretch processed. In the former case, stretching can be conducted with a quantity of residual solvent present. Stretching is preferably conducted so that the quantity of residual solvent, which is equal to (mass of residual volatized fraction/mass of film after heat treatment)×100%, is 0.05 to 50%. It is preferable to conduct 5 to 80% stretching with the quantity of residual solvent being 0.05 to 5%.

Subjecting the polymer film containing the compound set forth above to stretch processing can further increase the scratch resistance of the film.

<Physical Properties of Polymer Film>
(Surface Hardness)

The polymer film can have excellent scratch resistance by containing the compound described in detail before. Surface hardness can be exemplified as an index of scratch resistance. The surface hardness can be evaluated by, for example, Knoop hardness. The Knoop hardness in the present invention means a value obtained by a method below in accordance with the method of JIS Z 2251 (2009). JIS Z 2251 (2009) is Japanese Industrial Standards made on the basis of ISO4545.

Using a Fischer scope model H100Vp hardness meter manufactured by Fischer Instruments, a surface of a sample fixed to a glass substrate is measured under conditions of loading time of 10 sec, creep time of 5 sec, unloading time of 10 sec, maximum load of 50 mN with a Knoop indenter that is disposed so that the direction of the short axis of the indenter is parallel to the conveying direction (longitudinal direction) of a cellulose acylate film in manufacture in accordance with the method of JIS Z 2251 (2009). Hardness is calculated from the relationship between the contact area of the indenter and a sample obtained from indentation depth and the maximum load for five points, and an average value thereof is obtained. The above-described operations are performed for ten polymer films produced under the same condition, and the arithmetic average of the obtained values is defined as Knoop hardness.

Unless otherwise noted in particular, the Knoop hardness in the present invention means Knoop hardness obtained by the above method.

The polymer film preferably shows Knoop hardness equal to or higher than 210 $N/mm^2$, more preferably shows Knoop hardness equal to or higher than 220 $N/mm^2$, in at least one surface, preferably in both surfaces. The Knoop hardness may be, for example, approximately equal to or lower than 315 $N/mm^2$, or approximately equal to or lower than 300 $N/mm^2$, but, since a higher value is preferable from the viewpoint of improvement of scratch resistance, the upper limit is not particularly limited.

The surface hardness can also be evaluated by pencil hardness. The polymer film may have surface hardness that gives A or B, preferably A in the determination results of evaluation on the basis of pencil hardness tests in Examples.

(Haze)

In the polymer film, haze measured by a method below is preferably equal to or lower than 1%, more preferably equal to or lower than 0.7%, particularly preferably equal to or lower than 0.5%. The polymer film containing the above-described compound can show haze positioned in the range. The polymer film that shows such haze is excellent in transparency and, therefore, is suitable as a film member for a liquid crystal display device. The lower limit of the haze is, for example, equal to or higher than 0.001%, but is not particularly limited.

The haze is measured for a 40 mm×80 mm sample of polymer film in accordance with JIS K7136 (2000) with a hazemeter (HGM-2DP, made by Suga Test Instruments Co., Ltd.) in an environment of 25° C. and 60% relative humidity.

(Other Physical Properties)
Water Content:

The water content of the polymer film can be evaluated by measuring the equilibrium water content at a certain temperature and humidity. The equilibrium water content is determined by placing the sample for 24 hours at the above temperature and humidity, measuring the quantity of water in the sample that has reached equilibrium by the Karl Fischer method, and dividing the quantity of water (g) by the mass of the sample (g).

The water content of the polymer film at 25° C. and 80% relative humidity is preferably less than or equal to 5% by mass, more preferably less than or equal to 4% by mass, and most preferably, less than 3% by mass. Keeping the water content of the polymer film low can cause display nonuniformity not to occur in liquid crystal display devices at high temperature and high humidity when the polymer film is incorporated as a protective film on a polarizing plate in a liquid crystal display device. The lower limit of the water content is, for example, greater than or equal to 0.1% by mass, but not specifically limited.

Thickness:

Thickness of the polymer film can appropriately be determined in accordance with an application, and is, for example, 5 to 100 μm. By setting it to be equal to or higher than 5 μm, handling properties upon producing a web-like film is improved, which is preferable. By setting it to be equal to or lower than 100 μm, correspondence for temperature variation becomes easy and maintenance of optical characteristics becomes easy. The thickness of the polymer film is more preferably 8 to 80 μm, further preferably 10 to 70 μm.

When the polymer film has a laminate structure with three or more layers, the thickness of the core layer is preferably 3 to 70 μm, more preferably 5 to 60 μm. The thickness of each of skin layer A and skin layer B is preferably 0.5 to 20 μm, more preferably 0.5 to 10 μm, and optimally, 0.5 to 3 μm. The core layer refers to the middle portion in a three-layer structure, and the skin layers refer to the outermost layers in a three-layer structure.

Width:

When the polymer film is manufactured, the width of the polymer film is preferably 700 to 3,000 mm, more preferably 1,000 to 2,800 mm, and most preferably, 1,300 to 2,500 mm.

(Saponification)

The above polymer film can be subjected to an alkali saponification treatment to impart adhesion to the material of a polarizer such as polyvinyl alcohol, permitting use as the protective film of a polarizing plate.

For example, the method described in JP-A-No. 2007-86748, paragraphs 0211 and 0212, can be employed as the saponification method. The content of the above publication is expressly incorporated herein by reference in its entirety.

For example, the alkali saponification treatment of the polymer film is preferably conducted in a cycle of immersing the film surface in an alkali solution followed by neutralization with an acidic solution, washing with water, and drying. Examples of the alkali solution are a potassium hydroxide solution and sodium hydroxide solution. The concentration of the hydroxide ions preferably falls within a range of 0.1 to 5.0 mol/L, more preferably within a range of 0.5 to 4.0 mol/L. The temperature of the alkali solution preferably falls within a range of room temperature to 90° C., more preferably within a range of 40 to 70° C.

Alternatively, adhesion-enhancing processing such as is described in JP-A-Heisei Nos. 6-94915 and 6-118232 can be conducted for the polymer film, instead of an alkali saponification treatment. The contents of the above publications are expressly incorporated herein by reference in their entirety.

Polarizing Plate (Configuration of Polarizing Plate)

A polarizing plate of an aspect of the present invention has the above-described polymer film and a polarizer.

In an embodiment, the polarizing plate contains a polarizer and one polarizing plate protective film protecting one surface thereof or two polarizing plate protective films protecting both surfaces thereof, and can have at least one polymer film as the polarizing plate protective film.

Furthermore, as described before, a liquid crystal display device usually has such a configuration that a liquid crystal cell is disposed between a polarizing plate on the viewer-side and a polarizing plate on the backlight side. The above-described cellulose acylate film can be used as any of protective films positioned on the inner side and outer-side of the polarizing plate on the viewer-side and those positioned on the inner side and outer-side of the polarizing plate on the backlight side.

Together with the polymer film, another film member may also be used as a polarizing plate protective film. The film member to be used in this case is not particularly limited, various film members usually used as a polarizing plate protective film can be used.

For example, a polyvinyl alcohol film that has been immersed in an iodine solution and stretched can be employed as a polarizer. When employing a polarizer obtained by immersing a polyvinyl alcohol film in an iodine solution and stretching it, for example, the saponification-treated side of the polymer film can be directly bonded to at least one side of the polarizer with adhesive. The adhesive employed can be an aqueous solution of a polyvinyl alcohol or polyvinyl acetal (such as polyvinyl butyral), the latex of a vinyl polymer (such as polybutyl acrylate), or an ultraviolet curing adhesive. The aqueous solution of a fully saponified polyvinyl alcohol is a preferred adhesive.

The polarizing plate protective film is preferably bonded to the polarizer in such a manner that the transmission axis of the polarizer is essentially parallel, orthogonal or aligned with 45° to the slow axis of the polarizing plate protective film. The slow axis can be measured by various known measurement methods. For example, it can be measured with a birefringence meter (KOBRA DH, made by Oji Scientific Instruments (Ltd.)).

In the present invention, the term "essentially parallel, orthogonal or aligned with 45°" means that the misalignment between the direction of the main refractive index $n_x$ of the polarizing plate protective film and the direction of the transmission axis of the polarizing plate is less than or equal to 5°. This misalignment is preferably less than or equal to 1°, more preferably less than or equal to 0.5°. A misalignment of less than or equal to 1° is preferable in that light leakage tends not to occur and the degree of polarization performance of the polarizing plate in crossed-nicols tends not to decrease.

<Multifunctionalization of Polarizing Plate>

To the extent that no departure is made from the spirit of the present invention, the polarizing plate can be employed as a functionalized polarizing plate which is combined with a view-enhancing antireflective film, brightness enhancement film, and/or an optical film having functional layer(s) such as a hard coat layer, forward-scattering layer, and antiglare layer. For details in this regard, the descriptions given in JP-A-No. 2012-082235, paragraphs 0229 to 0242, 0249, and 0250, and JP-A-No. 2012-215812, paragraphs 0086 to 0103, can be referred, the entire contents of which are hereby incorporated by reference.

As an example, a hard coat layer will be explained below.

(Hard Coat Layer)

As required, a hard coat layer can be provided on the polymer film. For example, a hard coat layer can be formed on the polymer film by applying an application composition on a cellulose acylate film and curing it. By adding a filler or an additive to a hard coat layer, mechanical, electric or optical physical performances or chemical performances such as water repelling or oil repelling properties can be given to the hard coat layer. The thickness of the hard coat layer ranges preferably from 0.1 to 6 μm, more preferably from 3 to 6 μm. A polarizing plate containing a hard coat layer, in which physical properties such as brittleness and suppression of curling have been improved and weight reduction and manufacture cost reduction have been achieved, can be obtained by providing a thin hard coat layer in the range.

An example of an application composition for forming a hard coat layer contains a monomer, oligomer or polymer for a binder for forming a matrix and an organic solvent. A hard coat layer can be formed by curing the application composition after application. A crosslinking reaction or a polymerization reaction can be utilized for the curing. Regarding details of these, descriptions in JP-A-No. 2012-215812, paragraphs 0088 to 0101 can be referred to, and these contents are incorporated by reference in the specification of the present application.

The application composition can be prepared, for example, by dissolving and/or dispersing the above-described component in an organic solvent. The application composition suitable for forming the hard coat layer is a curable composition containing a (meth)acrylic compound.

Liquid Crystal Display Device

The liquid crystal display device of an aspect of the present invention includes at least one polarizinig plate of an aspect of the present invention. For details regarding liquid crystal display devices, JP-A-No. 2012-082235, paragraphs 0251 to 0260, can be referred, the entire contents of which are hereby incorporated by reference. The polarizing plate of an aspect of the present invention can be used as a polarizing plate on any of the viewer-side and on the backlight side.

Although not exemplified, as another configuration, the polarizing plate of the present invention can also be used as a part of a circular polarization plate disposed as the use application of antireflection of a reflective or semitransmissive liquid crystal display device or a self light-emitting element such as an organic EL (Electro Luminescence).

EXAMPLES

Examples are given below to further specifically describe the present invention. Suitable modification of the materials, reagents, quantities and ratios of materials, operations and the like indicated in Examples below is possible without departing from the spirit of the present invention. Accordingly, the scope of the present invention is not limited to the specific examples given below.

1. Calculation of δh of Compound

The δh of respective compounds was calculated according to the method described in a literature "Properties of Polymers 3$^{rd}$, ELSEVIER, (1990)," pp 214 to 220, column "2) Method of Hoy (1985, 1989)". Specifically, the structure of respective compounds is cut and divided into partial structures according to the description in the column of the literature, and numerical values assigned to respective partial structures in the column of the literature are summed up to thereby calculate the δh. For example, the structure of a compound is cut and divided into partial structures such as $CH_3$, $CH_2$, CH and —O—(C=O)—NH—. In addition, a phenyl group is cut and divided into five CH and one C.

δh calculated for compounds used in Examples and Comparative examples are shown in Table described later.

2. Calculation of χ and δχ of Compound

In Examples and Comparative examples, χ of respective compounds in the polymer film is calculated by a method described below, and δχ was obtained from the calculated χ and equation 1.

GROMCS (version 4.5.5), which is a free software, was used as a molecular dynamics (MD) calculation program. A general-purpose force field general Amber force field (GAFF) was used as a force field, according to descriptions in J. Wang, R. M. Wolf, J. W. Caldwell, P. A. Kollman, D. A. Case, J. Comput. Chem. 25, 1157 (2004). A RESP charge calculated from the result of a quantum chemical calculation HF/6-31 G* method using Gaussian 09 (revision A.02) was used as a charge.

An initial structure for the calculation was made according to a method described below.

One structure of a compound was obtained by, first, making a structure randomly, next performing structure relaxation by MD calculation, and finally performing structure optimization by the HF/6-31G* method. As the result, one obtained by calculating the RESP charge for the structure is defined as the charge of the molecule. The structure of one compound is prepared in three kinds, which are locally stable structures respectively and have different structures one another.

Regarding one structure of a polymer contained in a polymer film, first, the structure optimization is performed on one of repeating units constituting the polymer, by the HF/6-31G* method, and, after that, the RESP charge is made, and structure optimization is performed on a structure obtained by connecting repeating units having the number of repeating units contained in the polymer, by MD calculation. Regarding the structure of the polymer, only one kind is prepared.

From three kinds of structures of a compound thus prepared, one is selected, and a structure obtained by disposing randomly eight molecules of the selected structure and fifteen molecules of the polymer was set to be an initial mixed structure. Here, two initial mixed structures were made for each of three kinds of structures of the compound, and thus total 3×2=6 structures were prepared. The density of a system upon making the initial mixed structure was set to be 0.1 [g/cm³].

For the initial mixed structure, structure relaxation calculation by MD calculation was performed to thereby give the final amorphous structure in terms of molecular dynamics. The structure relaxation calculation was performed, after performing a Steepest descent method, by performing calculation in NPT ensemble and NVT ensemble by continuous calculation sequentially using calculation conditions shown in Table 2. Here, a pressure control method and a temperature control method for NPT, NVT are the Parrinello-Rahman method and the Nose-Hoover method. Calculation parameters used are shown in Table 3.

For the final structure obtained by the relaxation calculation, calculation of temperature of 300K, 1 atmospheric pressure, compressibility=4.5 $e^{-5}$ [$bar^{-1}$] and time of 250 ps was performed, and amorphous structure coordinate data of the compound of eight molecules in the polymer contained in the polymer film were sampled for every 1 ps.

TABLE 2 calculation conditions to be used in structure relaxation by MD calculation (calculation is performed in order of calculation condition number)

| Calculation condition number | ensemble | Calculation time [ps] | Temp. [K] | Pressure [atmospheric pressure] | compressibility [$bar^{-1}$] |
| --- | --- | --- | --- | --- | --- |
| 1 | NPT | 170 | 400 | 300 | 9.5e⁻⁵ |
| 2 | NPT | 150 | 500 | 300 | 9.5e⁻⁵ |
| 3 | NPT | 100 | 300 | 300 | 9.5e⁻⁵ |
| 4 | NVT | 50 | 600 | | |
| 5 | NVT | 100 | 400 | | |
| 6 | NPT | 100 | 300 | 100 | 9.5e⁻⁵ |
| 7 | NVT | 100 | 500 | | |
| 8 | NVT | 100 | 300 | 100 | 9.5e⁻⁵ |
| 9 | NVT | 100 | 500 | | |
| 10 | NPT | 100 | 300 | 100 | 9.5e⁻⁵ |
| 11 | NVT | 100 | 500 | | |
| 12 | NPT | 800 | 300 | 1.0 | 4.5e⁻⁵ |
| 13 | NVT | 100 | 400 | | |
| 14 | NPT | 200 | 300 | 1.0 | 4.5e⁻⁵ |

TABLE 3 parameters necessary for MD calculation

| rlist | rvdw | nstlist | nsttcouple | nstpcouple |
| --- | --- | --- | --- | --- |
| 1.0 | 1.0 | 10 | 1 | 1 |
| tau_t | tau-p | pcoupltype | nh-chain-length | dt |
| 0.1 | 1.0 | anistorpic | 1 | 0.001 |

From the obtained sampling data of the coordinate of compound in the amorphous structure, the arithmetic average of interatomic distance of atoms that are most distant from each other per molecule, among atoms excluding hydrogen atoms in a compound was obtained.

Atoms that are most distant from each other in a molecule are defined as follows. Two atoms are selected in a structural formula, and a route along bonds existing between them is considered. A route having the smallest number of bonds contained in the route is called a path and a pair of atoms having the largest number of bonds contained in the path is defined as atoms most distant from each other in the molecule. For example, in compound 101-2, the atoms are C1, C2 shown below, and, in compound 102-8, they are C3, C4 shown below.

Compound 101-2

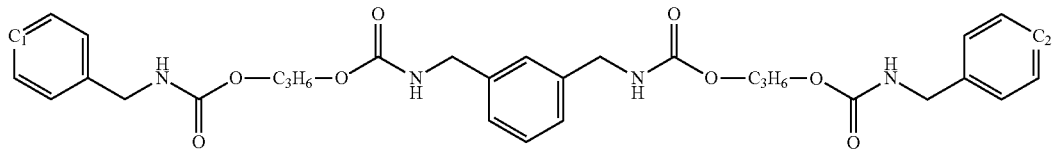

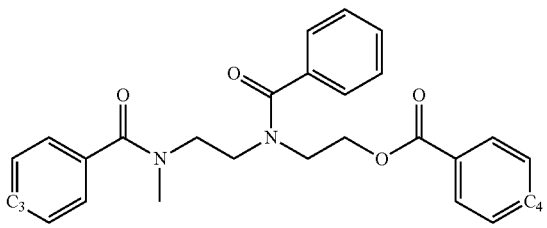

Compound 102-8

3. Evaluation of Absorption Property of Compound

Absorbance of a solution prepared by dissolving 1 mg of a compound in 50 cm³ in a mixed solvent of methanol/dichloromethane=13/87 (volume ratio), in the wavelength region of 280 to 800 nm was measured with light path length of 1 cm by using a ultraviolet-visible spectrophotometer (UV3100PC, manufactured by Shimadzu Corporation).

As a blank test, absorbance of the mixed solvent alone containing no compound was measured in the same way.

The absorbance obtained in the blank test was 0 abs, and thus the absorbance measured for the mixed solvent containing the compound was defined as the absorbance of the compound. All evaluated compounds exhibited good solubility for the mixed solvent.

As the result of the evaluation, it was confirmed that all compounds used in Examples below did not have absorption in the wavelength region of 280 to 800 nm.

In contrast to this, a compound 102-9 used in Comparative example showed absorbance of 2.9 abs at wavelength of 280 nm, and had absorption in the wavelength region of 280 to 800 nm.

4-1-1. Production of Polymer Film

[Examples 101 to 129, Comparative Examples 201 to 212]

-Film Formation of Cellulose Acylate Film- (Preparation of Cellulose Acylate Solution)

A composition below was fed into a mixing tank, which was stirred and the resultant respective components were dissolved to thereby prepare a cellulose acylate solution.

Composition of Cellulose Acylate Solution

| | |
|---|---|
| cellulose acetate (acetyl substitution degree: 2.88, number-average molecular weight: 163000) | 100.0 parts by mass |
| compound described in Table 4 | see Table 4 |
| ultraviolet absorber (C) | 2.4 parts by mass |
| methylene chloride (first solvent) | 353.9 parts by mass |
| methanol (second solvent) | 89.6 parts by mass |
| n-butanol (third solvent) | 4.5 parts by mass |

Ultraviolet Absorber (C)

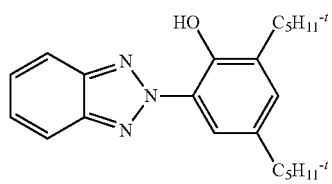

Plasticizers S1 and S2 used in Examples and Comparative examples containing a plasticizer are compounds described below. The plasticizer was added in an amount described in Table 4 at the time of preparing the cellulose acylate solution.

Plasticizer S1

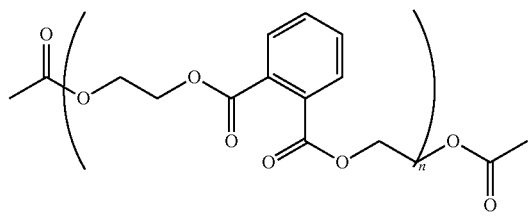

(number-average molecular weight: about 800)

Plasticizer S2 (Acetyl-Substituted Body of D-Glucose)

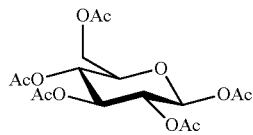

(In the above, Ac represents an acetyl group.)

The prepared cellulose acylate solution was cast using a drum casting machine. The cast product was peeled off in a state where the amount of residual solvent in the dope was about 70% by mass, which was dried in a state where the amount of the residual solvent was 3 to 5% by mass. Subsequently, by conveying a film between rollers of a heat treatment apparatus, the film was further dried to thereby give a cellulose acylate film having a thickness shown in Table 4.

Cellulose acylate films were produced as reference samples for respective Examples and Comparative examples in evaluating surface hardness to be described later, in the same way as that in respective Examples and Comparative examples, except for not adding the compound described in Table 4.

4-1-2. Production of Polymer Film

[Examples 130 to 136, and Comparative Example 213]

-Film Formation of Cellulose Acylate Film- (1) Synthesis of Cellulose Acylate

After preparing a mixture by adding 7.8 parts by mass of sulfuric acid and acetic acid for introducing an acyl substituent (acetyl group) into cellulose relative to 100 parts by mass of cellulose, an acylation reaction was performed by heating the mixture to 40° C. The substitution degree by an acetyl group (acetyl substitution degree) was adjusted by changing the addition amount of acetic acid. Next, water was further added to the obtained mixture, which was then heated to 40° C. and aged. Subsequently, the mixture was washed with acetone, and low-molecular weight components of cellulose acylate contained in the mixture was removed.

In this way, cellulose acetate having an acetyl substitution degree of 2.43 and cellulose acetate having an acetyl substitution degree of 2.81 were obtained, respectively.

(2) Preparation of Cellulose Acylate Dope for Core Layer

A cellulose acylate dope for a core layer was prepared by feeding a composition below into a mixing tank, and then dissolving the respective components through stirring.

Composition of Cellulose Acylate Dope for Core Layer

| | |
|---|---|
| cellulose acetate (acetyl substitution degree: 2.43) synthesized in (1) above | 100.0 parts by mass |
| compound described in Table 4 | described in Table 4 |
| methylene chloride | 403.0 parts by mass |
| methanol | 60.2 parts by mass |

(3) Preparation of Cellulose Acylate Dope for Skin Layer

A cellulose acylate dope for a skin layer was prepared by feeding a composition below into a mixing tank, and then dissolving the respective components through stirring.

Composition of Cellulose Acylate Dope for Skin Layer

| | |
|---|---|
| cellulose acetate (acetyl substitution degree: 2.81) synthesized in (1) above | 100.0 parts by mass |
| methylene chloride | 388.0 parts by mass |
| methanol | 58.0 parts by mass |

(4) Preparation of Matting Agent Dispersion Liquid

A matting agent dispersion liquid was prepared by feeding a composition below into a disperser, and then dissolving the respective components through stirring.

Composition of Matting Agent Dispersion Liquid

| | |
|---|---|
| matting agent (Aerosil (registered trade mark) R972, manufactured by NIPPON AEROSIL CO., LTD.) | 0.2 parts by mass |
| methylene chloride | 72.4 parts by mass |
| methanol | 10.8 parts by mass |
| cellulose acylate dope for skin layer | 10.3 parts by mass |

(5) Preparation of Cellulose Acylate Dope for Skin Layer Containing Matting Agent A cellulose acylate dope for a skin layer containing a matting agent was prepared by mixing the matting agent dispersion liquid prepared in (4) above to the cellulose acylate dope for a skin layer prepared in (3) above, at a ratio shown below.

Composition of Cellulose Acylate Dope for Skin Layer Containing Matting Agent

| | |
|---|---|
| cellulose acylate dope for skin layer | 100.0 parts by mass |
| matting agent dispersion liquid | 7.1 parts by mass |

(6) Film Formation of Cellulose Acylate Film (Casting)

The cellulose acylate dope for a core layer and the cellulose acylate dope for a skin layer containing a matting agent, prepared in (2) and (5), respectively, were cast with a band casting machine.

When casting dopes, as shown in FIG. 1, dopes supplied from a casting die 89 onto a running casting band 85 were subjected to co-casting (simultaneous multilayer casting) so as to give a three-layer configuration of first skin layer/core layer/second skin layer, as shown in FIG. 2. Here, simultaneous multilayer casting was performed so that the thickness of the core layer became largest, and that thicknesses of films resultantly obtained after a stretching process gave values below in respective Examples and Comparative examples, by adjusting casting amounts of respective dopes, with the result that a casting film 70 was formed.

Among the thicknesses of films obtained after stretching, thicknesses of the first skin layer and the second skin layer: each 1.5 µm thickness of the core layer: a value obtained by subtracting thicknesses of the first skin layer and second skin layer from the thickness described in Table 4

(Drying)

Next, the casting film 70 was peeled off from the casting band 85, and after being made to be a wet film, was dried at a transition part and in a tenter apparatus (not shown) to made a film. The amount of a residual solvent directly after peeling off the dope was about 25% by mass. The film was sent to a drying room, and drying was sufficiently accelerated during conveyance while winding the film on a large number of rollers.

(Stretching Process)

The film in which a residual solvent had become about 20% by mass by the drying, was subjected to cross-direction stretching by using a tenter under conditions of stretching temperature of 140° C. and a stretching ratio of 9%, and after that, clips were unfastened and the film was dried under a circumstance of atmospheric temperature of 130° C. for 20 minutes. By these operations, a film containing a residual solvent of less than 1% by mass was obtained, and after that, the film was further subjected to cross-direction stretching by using a tenter under conditions of stretching temperature of 184° C. and a stretching ratio of 18%, with the result that a film subjected to stretching process was produced.

(Moisture-Heat Treatment)

Respective films having been subjected to the stretching process were sequentially subjected to a dew condensation prevention treatment, a moisture-heat treatment (water vapor contact treatment) and a heat treatment.

In the dew condensation prevention treatment, dry air was blown against respective films subjected to the stretching process and film temperature Tf0 was adjusted to 120° C.

Subsequently, in the moisture-heat treatment (water vapor contact treatment), respective films were conveyed in a wet gas contact room while maintaining a state where temperature (moisture-heat treatment temperature) of respective films subjected to the dew condensation prevention treatment became 100° C. for a treatment time (60 seconds). At this time, conditions were adjusted so that the absolute humidity (moisture-heat treatment absolute humidity) of wet gas in the wet gas contact room became 250 g/m$^3$, and the dew point of the wet gas became a temperature that was higher than the temperature Tf0 of respective films by being equal to or higher than 10° C.

Furthermore, in the heat treatment, the absolute humidity (heat treatment absolute humidity) of gas in a heat treatment room was set to be 0 g/m$^3$, and the temperature of respective films subjected to the moisture-heat treatment (heat treatment temperature) was set to be the same temperature as the moisture-heat treatment temperature, which was maintained for treatment time (two minutes).

The temperature of the film is surface temperature of the film. The surface temperature of the film was obtained by sticking a tape-type thermocouple surface temperature sensor (ST series, manufactured by ANRITSU-METER, Co., Ltd.) to the film in three points and by averaging obtained values, respectively.

(Winding)

After that, films obtained through the above-described operations were cooled to room temperature and then, each of the films was wound.

Cellulose acylate films were produced as reference samples for respective Examples and Comparative examples in evaluating surface hardness to be described later, in the same way as that in respective Examples and Comparative examples, except for not adding the compound described in Table 4.

4-1-3. Production of Polymer Film

[Example 137]

A cellulose acylate film in Example 137 was obtained in the same procedure as that in the above-described 4-1-2. Production of polymer film, except for changing the composition of (3) cellulose acylate dope for a skin layer to a composition below.

Composition of Cellulose Acylate Dope for Skin Layer

| | |
|---|---|
| cellulose acetate (acetyl substitution degree: 2.81) synthesized in above-described 4-1-2. (1) | 100.0 parts by mass |
| barbituric acid compound A-3 | 20.0 parts by mass |
| methylene chloride | 388.0 parts by mass |
| methanol | 58.0 parts by mass |

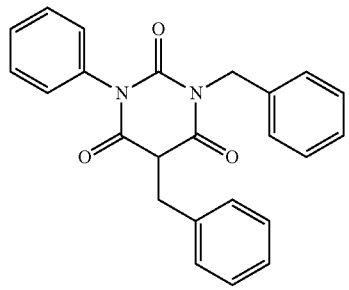

A-3

A cellulose acylate film was produced as a reference sample for Example 137 in evaluating surface hardness to be described later, in the same way as that in Example 137, except for not adding the compound described in Table 4.

4-2. Evaluation of Polymer Film (1) Surface Hardness

For cellulose acylate films in Examples and Comparative examples and the reference samples, using a Fischer scope model H100Vp hardness meter manufactured by Fischer Instruments, a surface of a sample fixed to a glass substrate was measured under conditions of loading time of 10 sec, creep time of 5 sec, unloading time of 10 sec, maximum load of 50 mN with a Knoop indenter that was disposed so that the direction of the short axis of the indenter was parallel to the conveying direction (longitudinal direction) of a cellulose acylate film in manufacture. Hardness was calculated from the relationship between the contact area of the indenter and a sample obtained from indentation depth and the maximum load for five points, and an average value thereof was obtained. These operations were performed for ten polymer films, respectively, produced in the same way, and the value of the arithmetic average was defined as Knoop hardness.

The value of Knoop hardness of respective cellulose acylate films was compared with the value of Knoop hardness of the reference sample, and calculated Improvement rate of Knoop hardness=(Knoop hardness of respective cellulose acylate films)/(Knoop hardness of reference sample), and the surface hardness was evaluated on the basis of the standard below. When the evaluation result is A or B, it is possible to say that the addition of the compound can have improved the surface hardness (Knoop hardness) to such a level that shows sufficient scratch resistance in practice.

A: Improvement rate of Knoop hardness is equal to or higher than 1.25 times

B: Improvement rate of Knoop hardness is equal to or higher than 1.20 times and less than 1.25 times C: Improvement rate of Knoop hardness is equal to or higher than 1.15 times and less than 1.20 times D: Improvement rate of Knoop hardness is equal to or higher than 1.10 times and less than 1.15 times E: Improvement rate of Knoop hardness is equal to or higher than 1.00 time and less than 1.10 times F: Improvement rate of Knoop hardness is less than 1.00 time (2) Evaluation of Transparency (Haze)

Haze of cellulose acylate films in Examples and Comparative examples was measured and evaluated along the standard below. It is possible to say that haze of less than 0.7 gives sufficient transparency in practice.

The haze was measured using a polymer film of 40 mm×80 mm under a circumstance of 25° C. and relative humidity of 60% with a haze meter (HGM-2DP, manufactured by Suga Test Instruments Co., Ltd.), according to JIS K-7136 (2000).

Evaluation Standard

OK: haze is less than 0.7%

NG: haze is equal to or higher than 0.7%

Results described above are shown in Table 4 below.

TABLE 4

| | | Plasticizer | | Compound added to the polymer film | | | | | | |
|---|---|---|---|---|---|---|---|---|---|---|
| | Film thickness [μm] | Type | Content [parts by mass] | Compound No. | Molecular weight | δh | δx | Content [Parts by mass] | Surface hardness | Transparency (Haze) |
| Ex. 101 | 60 | — | — | 101-1 | 450 | 12.8 | 0.25 | 10.0 | B | OK |
| Ex. 102 | 60 | — | — | 101-2 | 607 | 12.0 | 0.81 | 10.0 | B | OK |
| Ex. 103 | 60 | — | — | 101-3 | 430 | 12.3 | 0.16 | 10.0 | B | OK |
| Ex. 104 | 25 | — | — | 101-3 | 430 | 12.3 | 0.16 | 10.0 | A | OK |
| Ex. 105 | 15 | — | — | 101-3 | 430 | 12.3 | 0.16 | 10.0 | B | OK |
| Ex. 106 | 15 | — | — | 101-9 | 517 | 12.7 | 0.79 | 10.0 | A | OK |
| Ex. 107 | 15 | — | — | 101-10 | 529 | 11.3 | 0.89 | 10.0 | B | OK |
| Ex. 108 | 60 | — | — | 101-9 | 517 | 12.7 | 0.79 | 20.0 | A | OK |
| Ex. 109 | 60 | — | — | 101-6 | 579 | 12.5 | 0.74 | 10.0 | A | OK |
| Ex. 110 | 60 | — | — | 101-4 | 410 | 11.4 | 0.53 | 10.0 | B | OK |

TABLE 4-continued

|  | Film thickness [μm] | Plasticizer Type | Content [parts by mass] | Compound No. | Molecular weight | δh | δx | Content [Parts by mass] | Surface hardness | Transparency (Haze) |
|---|---|---|---|---|---|---|---|---|---|---|
| Ex. 111 | 60 | — | — | 101-8 | 499 | 11.0 | 0.10 | 10.0 | B | OK |
| Ex. 112 | 60 | — | — | 101-5 | 641 | 11.8 | 0.99 | 10.0 | B | OK |
| Ex. 113 | 25 | S1 | 4.0 | 101-6 | 579 | 12.5 | 0.74 | 10.0 | A | OK |
| Ex. 114 | 25 | S1 | 10.0 | 101-6 | 579 | 12.5 | 0.74 | 4.0 | B | OK |
| Ex. 115 | 25 | S1 | 10.0 | 101-6 | 579 | 12.5 | 0.74 | 10.0 | A | OK |
| Ex. 116 | 60 | S2 | 10.0 | 101-6 | 579 | 12.5 | 0.74 | 5.0 | B | OK |
| Ex. 117 | 60 | — | — | 101-7 | 400 | 11.3 | 1.39 | 10.0 | A | OK |
| Ex. 118 | 60 | — | — | 101-9 | 517 | 12.7 | 0.79 | 10.0 | A | OK |
| Ex. 119 | 60 | — | — | 101-11 | 415 | 14.1 | 0.72 | 10.0 | B | OK |
| Ex. 120 | 40 | — | — | 101-9 | 517 | 12.7 | 0.79 | 10.0 | A | OK |
| Ex. 121 | 40 | — | — | 101-9 | 517 | 12.7 | 0.79 | 12.0 | B | OK |
| Ex. 122 | 40 |  |  | 101-1 | 450 | 12.8 | 0.25 | 6.0 | B | OK |
|  |  |  |  | 101-13 | 492 | 12.5 | 0.22 | 6.0 |  |  |
| Ex. 123 | 40 |  |  | 101-3 | 430 | 12.3 | 0.16 | 6.0 | A | OK |
|  |  |  |  | 101-13 | 492 | 12.5 | 0.22 | 6.0 |  |  |
| Ex. 124 | 25 |  |  | 101-9 | 517 | 12.7 | 0.79 | 6.0 | A | OK |
|  |  |  |  | 101-13 | 492 | 12.5 | 0.22 | 6.0 |  |  |
| Ex. 125 | 40 |  |  | 101-9 | 517 | 12.7 | 0.79 | 6.0 | A | OK |
|  |  |  |  | 101-12 | 478 | 12.8 | 0.21 | 6.0 |  |  |
| Ex. 126 | 40 | — | — | 101-12 | 478 | 12.8 | 0.21 | 12.0 | B | OK |
| Ex. 127 | 40 | — | — | 101-13 | 492 | 12.5 | 0.22 | 12.0 | B | OK |
| Ex. 128 | 40 | — | — | 101-12 | 478 | 12.8 | 0.21 | 10.0 | B | OK |
| Ex. 129 | 40 | — | — | 101-13 | 492 | 12.5 | 0.22 | 10.0 | B | OK |
| Ex. 130 | 41 | — | — | 101-1 | 450 | 12.8 | 0.25 | 8.0 | B | OK |
| Ex. 131 | 41 | — | — | 101-9 | 517 | 12.7 | 0.79 | 8.0 | A | OK |
| Ex. 132 | 41 | — | — | 101-12 | 478 | 12.8 | 0.21 | 8.0 | B | OK |
| Ex. 133 | 41 | — | — | 101-13 | 492 | 12.5 | 0.22 | 8.0 | B | OK |
| Ex. 134 | 41 | — | — | 101-1 | 450 | 12.8 | 0.25 | 10.0 | B | OK |
| Ex. 135 | 41 | — | — | 101-12 | 478 | 12.8 | 0.21 | 10.0 | B | OK |
| Ex. 136 | 41 | — | — | 101-13 | 492 | 12.5 | 0.22 | 10.0 | B | OK |
| Ex. 137 | 41 | — | — | 101-13 | 492 | 12.5 | 0.22 | 10.0 | B | OK |
| Comp. Ex. 201 | 60 | — | — | 102-4 | 587 | 10.7 | 3.63 | 10.0 | C | OK |
| Comp. Ex. 202 | 60 | — | — | 102-4 | 587 | 10.7 | 3.63 | 30.0 | — | NG |
| Comp. Ex. 203 | 60 | — | — | 102-6 | 314 | 12.2 | 1.73 | 10.0 | C | OK |
| Comp. Ex. 204 | 60 | — | — | 102-5 | 252 | 12.2 | 2.27 | 10.0 | E | OK |
| Comp. Ex. 205 | 60 | — | — | 102-3 | 454 | 9.1 | 3.55 | 10.0 | F | OK |
| Comp. Ex. 206 | 25 | S1 | 10.0 | 102-6 | 314 | 12.2 | 1.73 | 4.0 | C | OK |
| Comp. Ex. 207 | 60 | — | — | 102-6 | 314 | 12.2 | 1.73 | 25.0 | — | NG |
| Comp. Ex. 208 | 60 | — | — | 102-7 | 3100 (weight-average molecular weigt) | 11.2 | 4.82 | 10.0 | — | NG |
| Comp. Ex. 209 | 60 | — | — | 102-2 | 466 | 10.5 | 0.06 | 10.0 | D | OK |
| Comp. Ex. 210 | 60 | — | — | 102-1 | 490 | 8.2 | 0.20 | 10.0 | D | OK |
| Comp. Ex. 211 | 60 | — | — | 102-8 | 430 | 9.9 | 0.76 | 10.0 | C | OK |
| Comp. Ex. 212 | 60 | — | — | 102-9 | 490 | 8.4 | 2.85 | 10 | C | OK |
| Comp. Ex. 213 | 41 | — | — | 102-4 | 587 | 10.7 | 3.63 | 10.0 | C | OK |

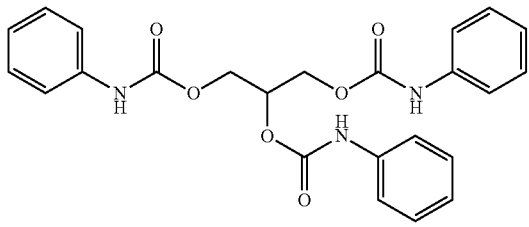

101-1

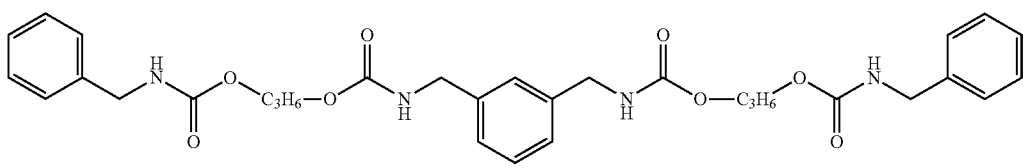

101-2

-continued
101-3
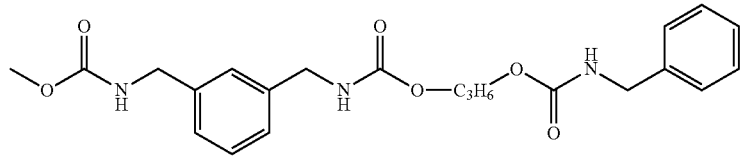
101-4
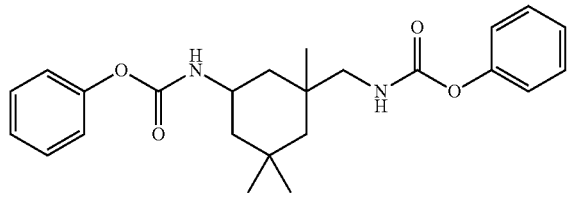
101-5
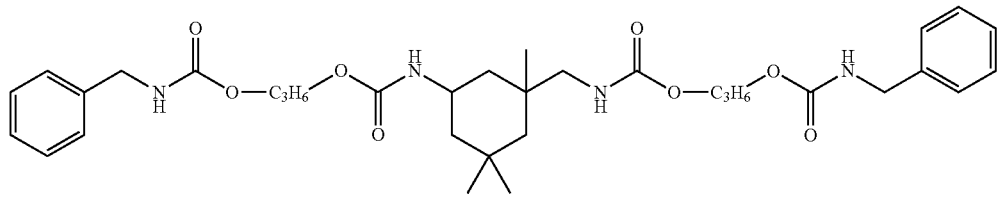
101-6
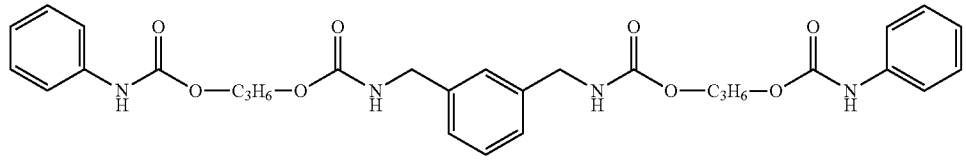
101-7
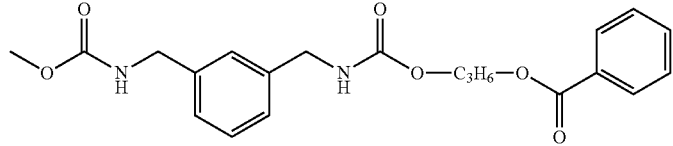
101-8
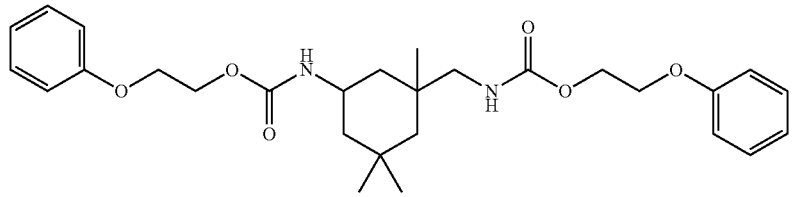
101-9
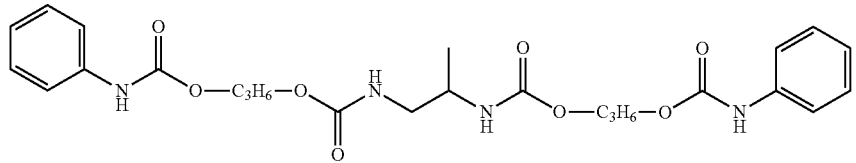
101-10
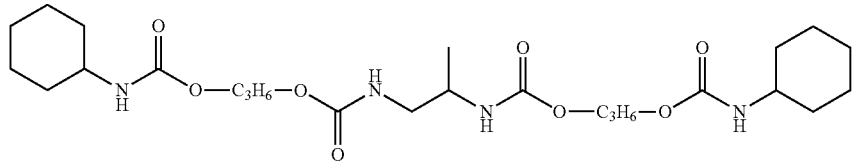

-continued
101-11
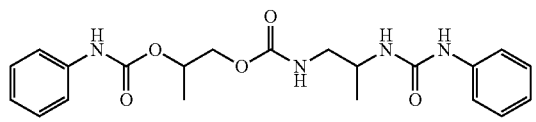
101-12
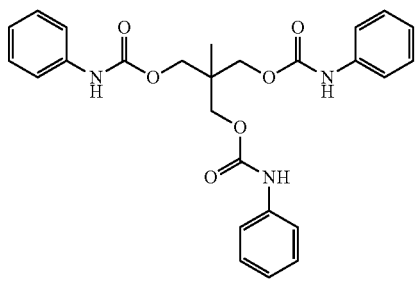
101-13
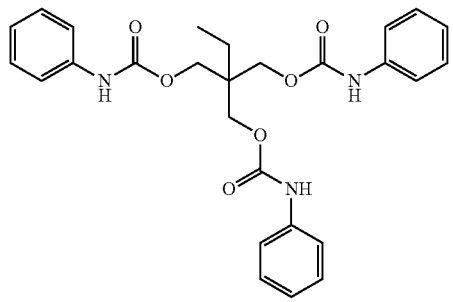
102-1
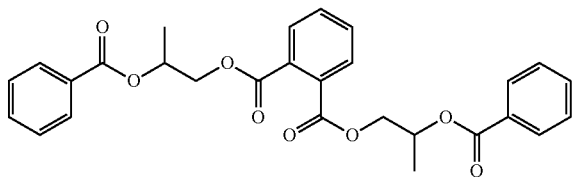
102-2
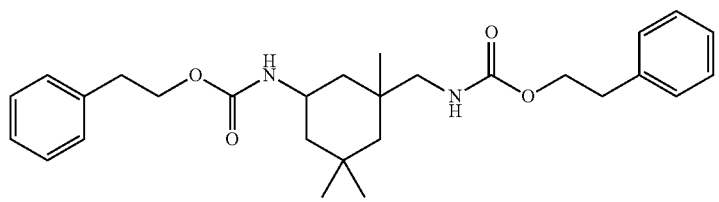
102-3
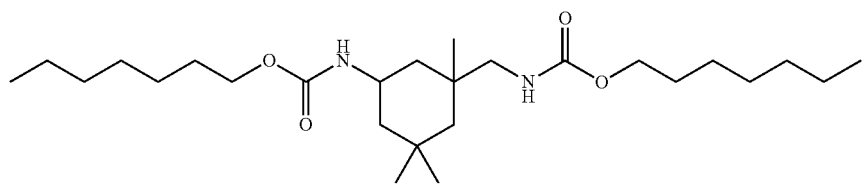
102-4
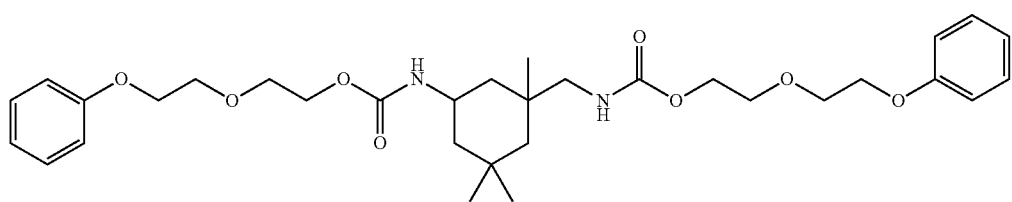
102-5
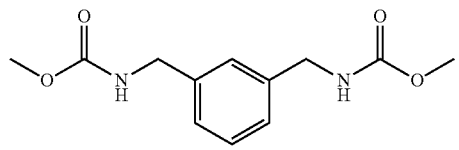
102-6
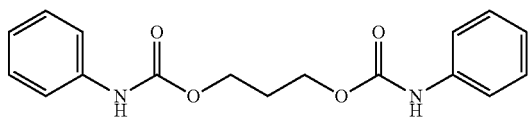
102-7
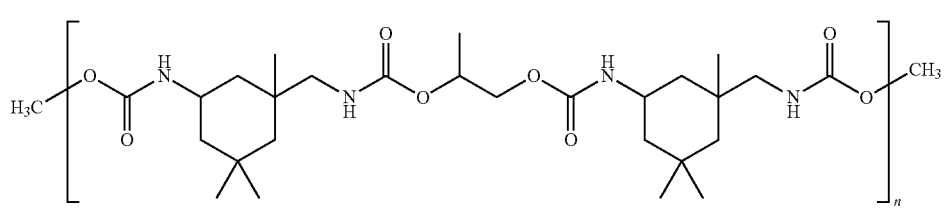

-continued 102-8

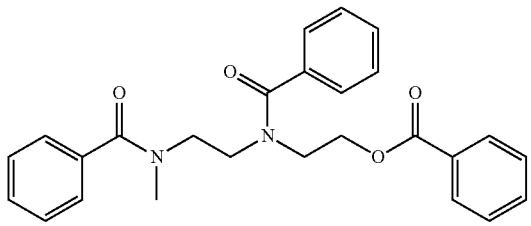

102-9

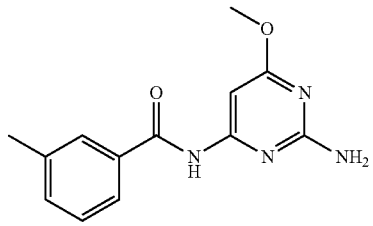

A compound 102-7 is a mixture of compounds having a repeating unit number n near 4.

5-1. Production of Polymer Film

[Examples 301 to 314, Comparative Examples 401 to 406]

-Film Formation of Cellulose Acylate Film- (Preparation of Cellulose Acylate Solution)

A composition below was fed into a mixing tank, which was stirred and the resultant respective components were dissolved, and was further heated at 90° C. for about 10 minutes. Then, the liquid was filtrated with filter paper having an average pore diameter of 34 μm and a sintered metal filter having an average pore diameter of 10 μm, with the result that a cellulose acylate solution I was prepared.

Composition of Cellulose Acylate Solution I

| | |
|---|---|
| cellulose acylate (substitution degree: 2.88, number-average molecular weight: 163000) | 100.0 parts by mass |
| compound described in Table 5 | described in Table 5 |
| polycondensation ester plasticizer S3 | refer to Table 5 |
| methylene chloride | 451.0 parts by mass |
| methanol | 39.0 parts by mass | polycondensation ester plasticizer S3:
adipic acid:ethanediol=100:100 (molar ratio) polycondensation ester compound (no
terminal blocking, hydroxyl value: 112 mgKOH/g, number-average molecular weight: 1000)

(Preparation of Matting Agent Dispersion Liquid)

Next, a composition below containing the cellulose acylate solution produced by the above-described method was fed into a disperser, and a matting agent dispersion liquid was prepared.

Composition of Matting Agent Dispersion Liquid

| | |
|---|---|
| matting agent (Aerosil (registered trademark) R972, manufactured by NIPPON AEROSIL CO., LTD.) | 0.2 parts by mass |
| methylene chloride | 72.4 parts by mass |
| methanol | 10.8 parts by mass |
| cellulose acylate solution I | 10.3 parts by mass |

(Preparation of Dope for Film Formation)

A dope for film formation was prepared by mixing 100 parts by mass of the cellulose acylate solution I and the matting agent dispersion liquid in an amount that gave 0.20 parts by mass of matting agent fine particles relative to the cellulose acylate resin.

(Casting)

The dope for film formation was cast using a band casting machine. The band was made of stainless steel (SUS: Steel Special Use Stainless).

(Drying)

A web (film) obtained by casting was peeled off from a band, and after that, the web was dried in a tenter apparatus (temperature in the apparatus: 100° C.) for 20 minutes by using the tenter apparatus conveying the web by griping both ends thereof with clips.

After that, the web was dried by further conveying the web in a drying zone at drying temperature of 120° C.

In this way, cellulose acylate films having thicknesses shown in Table 5 were obtained.

5-2. Evaluation of Polymer Film (1) Rth/d

Rth, the thickness direction retardation obtained by the above-described method was divided by thickness d to thereby give Rth/d.

(2) Evaluation of Transparency (Haze)

The evaluation was performed according to the method and standard described in the above-described 4-2. Evaluation of polymer film, item (2).

(3) Evaluation of Surface Hardness Based on Pencil Hardness Test

A polarizing plate having a polymer film in Example or Comparative example as one polarizing plate protective film and having a film with a hard coat layer to be described later as another polarizing plate protective film was produced. The production method of the polarizing plate will be described later.

Pencil hardness was evaluated by a following method in accordance with JIS K 5400 by using the produced polarizing plate. The surface of the hard coat layer of the film with a hard coat layer of the produced polarizing plate was stuck onto a glass plate via a pressures-sensitive adhesive. After conditioning humidity at temperature of 25° C., relative humidity of 60% for 24 hours, while using an H or 2H test pencil prescribed in JIS S 6006, 20 tests were performed, respectively, with a load of 500 g, and surface hardness was evaluated on the basis of an evaluation standard and determination standard below. The direction of pencil test (scratching direction) was set to be parallel to the absorption axis direction of the polarizer.

Evaluation Standard

OK: after 20 tests, the number of scratches visually observed is equal to or lower than 8

NG: after 20 tests, the number of scratches visually observed is equal to or higher than 9

Determination Standard

A: evaluation results are OK in both of the evaluation using an H test pencil and the evaluation using a 2H test pencil B: evaluation result is OK in the evaluation using an H test pencil, and evaluation result is NG in the evaluation using a 2H test pencil C: evaluation results are NG in both evaluations (4) Implementation Evaluation for Liquid Crystal Display Device From a commercially available liquid crystal television set (a slim 42 type liquid crystal television, having an IPS (In Plane Switching) mode liquid crystal cell, Δnd=320 nm (Δn: birefringence of the liquid crystal cell, d: thickness of the liquid crystal cell)), a polarizing plate disposed on the viewer-side of the liquid crystal cell was peeled off, and a polarizing plate provided with a cellulose acylate film produced in Examples 301 to 314 or Comparative example 401 by a method to be described later was stuck to the liquid crystal cell via a pressures-sensitive adhesive so that the cellulose acylate film in Examples or Comparative example was disposed on the liquid crystal cell side (inner side).

Regarding polarizing plates provided with a cellulose acylate film in other Comparative examples, since the evaluation result was NG in the above-described evaluation of surface hardness, implementation evaluation for a liquid crystal display device was not performed.

Furthermore, after holding the liquid crystal display device in a circumstance of 50° C. and a relative humidity of 90% for 72 hours, the device was moved to a circumstance of 25° C. and relative humidity of 60%, lighting was continued in a black display state, and, after 24 hours, the absence or presence of a light leak when being observed from the front side of the device was observed with eyes.

Regarding liquid crystal display devices in which polarizing plates in Examples 301 to 314 were mounted, respectively, a light leak was not confirmed. This is considered to be attributed to the provision of the cellulose acylate film excellent in optical isotropies in polarizing plates in Examples 301 to 314 as the inner-side polarizing plate protective film.

On the other hand, in the liquid crystal display device in which the polarizing plate provided with the cellulose acylate film in Comparative example 401 was mounted, a light leak was observed. This is considered to be attributed to the cellulose acylate film in Comparative example 401 that has high Rth/d and has optical anisotropy.

Polarizing plates used in the evaluation were produced according to a method below.

[Preparation of Application Liquid (HC-1) for Hard Coat Layer]

An application liquid (HC-1) for hard coat layer was prepared by mixing respective components shown below in amounts show below and then filtrating the resultant mixed substance with a filter made of polypropylene having a pore diameter of 30 μm.

Composition of Application Liquid (HC-1) for Hard Coat Layer

| | |
|---|---|
| DPHA (binder) | 22.9 parts by mass |
| PET-30 (binder) | 2.9 parts by mass |
| Irgacure (registered trademark) 184 (polymerization initiator) | 1.5 parts by mass |
| toluene (solvent) | 5.2 parts by mass |

Compound used are shown below.

DPHA: mixture of dipentaerythritol hexaacrylate and dipentaerythritol pentaacylate [manufactured by Nippon Kayaku Co., Ltd.];

PET-30: mixture of pentaerythritol triacrylate and pentaerythritol tetraacrylate [manufactured by Nippon Kayaku Co., Ltd.];

Irgacure 184: polymerization initiator [manufactured by BASF Japan];

[Production of Film with Hard Coat Layer]

An application liquid (HC-1) for a hard coat layer was applied onto a film (FUJITAC (registered trademark) TD60UL, manufactured by FUJIFILM Corporation), with a die coating method so as to give a coating thickness of 5 μm, with the result that a coating layer was formed. After drying the layer at room temperature for 120 seconds and additionally at 60° C. for 150 seconds, while conducting nitrogen purge (oxygen concentration: equal to or lower than 0.5%), an air-cooled metal halide lamp of 160 W/cm (manufactured by EYE GRAPHICS CO., LTD.) was used to irradiate the coating layer with ultraviolet rays at a lighting intensity of 400 mW/cm$^2$ and an irradiation amount of 150 mJ/cm$^2$ to thereby cure the layer and form a hard coat layer, with the result that a film with the hard coat layer was produced. The thickness of the hard coat layer was 5 μm.

[Production of Polarizing Plate]

(Saponification of Film)

Each of surfaces of respective cellulose acylate films produced in Examples and Comparative examples and the surface of the film provided with the hard coat layer (the surface not provided with the hard coat layer) were immersed for 1 minute in a 4.5 mol/L aqueous sodium hydroxide solution (saponification liquid) temperature-controlled at 37° C., and, after that, the resultant film was washed with water. Subsequently, the surfaces were immersed in a 0.05 mol/L aqueous sulfuric acid solution for 30 seconds, and then, were further passed through a water bath. In addition, draining with an air knife was repeated three times, and after removing water, the film was made stay in a drying zone 70° C. for 15 seconds to thereby be dried, with the result that a film subjected to a saponification treatment was produced.

(Production of Polarizer)

A polyvinyl alcohol long sheet film having a thickness of 75 μm (9X75RS, manufactured by Kuraray Co., Ltd.) was continuously conveyed with guide rolls, which was immersed in a water bath at 30° C. to thereby be swelled to 1.5 times and was subjected to stretching process to give a stretching ratio of 2. After that, the resultant film was immersed in a dyeing bath obtained by blending iodine with potassium iodide (30° C.) to thereby perform a dyeing treatment, and also perform stretching process to give a stretching ratio of 3, then the resultant film obtained was subjected to a crosslinking treatment in an acidic bath to which boric acid and potassium iodide were added (60° C.), and was subjected to stretching process to thereby give a stretching ratio of 6.5, which was dried at 50° C. for 5 minutes, with the result that a polarizer having a thickness of 20 μm was obtained.

(Production of Polarizing Plate)

After the above-described polarizer is sandwiched with the saponification-treated surface of each of cellulose acylate films in Examples and Comparative examples and the saponification-treated surface of the film provided with the hard coat layer, the polarizer and the saponification-treated surfaces are stuck each other by using a 3% by mass aqueous solution of polyvinyl alcohol (PVA) (PVA-117H, manufactured by Kuraray Co., Ltd.) as an adhesive so that the absorption axis and the longitudinal direction of each film are orthogonal to each other, with the result that a polarizing plate was produced.

Results are shown in Table 5. Evaluation was not conducted for Comparative Example 402 because the film became white in color.

TABLE 5

| | Plasticizer | | Compound added to the polymer film | | | | | Film | | Evaluation of surface hardness | | | Optical characteristics | |
|---|---|---|---|---|---|---|---|---|---|---|---|---|---|---|
| | | Content [parts by mass] | Type | Molecular weight | δh | δx | Content [parts by mass] | thickness [μm] | Transparency Haze | H | 2 H | Determination | Rth [nm] | Rth/d |
| | Type | | | | | | | | | | | | | |
| Ex. 301 | — | — | 104-1 | 488 | 12.7 | 0.71 | 10 | 40 | OK | OK | OK | A | −3.2 | −0.08 |
| Ex. 302 | — | — | 104-8 | 488 | 12.7 | 0.75 | 10 | 40 | OK | OK | OK | A | −5.9 | −0.15 |
| Ex. 303 | — | — | 104-3 | 364 | 12.1 | 0.96 | 10 | 40 | OK | OK | OK | A | −1.2 | −0.03 |
| Ex. 304 | — | — | 104-3 | 364 | 12.1 | 0.96 | 10 | 25 | OK | OK | OK | A | −0.5 | −0.02 |
| Ex. 305 | — | — | 104-1 | 488 | 12.7 | 0.71 | 15 | 40 | OK | OK | OK | A | −7.7 | −0.19 |
| Ex. 306 | — | — | 104-1 | 488 | 12.7 | 0.71 | 15 | 25 | OK | OK | OK | A | −3.2 | −0.13 |
| Ex. 307 | — | — | 101-10 | 529 | 11.3 | 0.89 | 10 | 25 | OK | OK | OK | A | 1.1 | 0.04 |
| Ex. 308 | — | — | 101-10 | 529 | 11.3 | 0.89 | 10 | 15 | OK | OK | OK | A | 0.4 | 0.03 |
| Ex. 309 | — | — | 104-4 | 464 | 11.8 | 1.08 | 10 | 40 | OK | OK | OK | A | 1.0 | 0.02 |
| Ex. 310 | — | — | 104-4 | 464 | 11.8 | 1.08 | 25 | 40 | OK | OK | OK | A | −5.0 | −0.13 |
| Ex. 311 | S3 | 10.0 | 104-1 | 488 | 12.7 | 0.71 | 5 | 40 | OK | OK | NG | B | 2.1 | 0.05 |
| Ex. 312 | — | — | 104-5 | 600 | 12.1 | 1.44 | 10 | 40 | OK | OK | OK | A | 1.2 | 0.03 |
| Ex. 313 | — | — | 104-6 | 286 | 12.2 | 1.41 | 10 | 40 | OK | OK | OK | A | −3.2 | −0.08 |
| Ex. 314 | — | — | 104-7 | 419 | 12.7 | 1.39 | 10 | 40 | OK | OK | OK | A | −0.5 | −0.01 |
| Comp. Ex. 401 | — | — | 103-1 | 548 | 10.5 | 1.24 | 10 | 40 | OK | OK | NG | B | 26 | 0.65 |
| Comp. Ex. 402 | — | — | 103-1 | 548 | 10.5 | 1.24 | 25 | 40 | NG | No evaluation was conducted because the film became white in color. | | | | |
| Comp. Ex. 403 | S3 | 10.0 | None | — | — | — | 0 | 40 | OK | NG | NG | C | 19 | 0.48 |
| Comp. Ex. 404 | — | — | 103-3 | 679 | 9.8 | 1.76 | 10 | 40 | OK | NG | NG | C | 8 | 0.20 |
| Comp. Ex. 405 | — | — | 103-2 | 490 | 8.6 | 0.2 | 10 | 40 | OK | NG | NG | C | 19 | 0.48 |
| Comp. Ex. 406 | — | — | 103-4 | 294 | 8.4 | 5.88 | 10 | 40 | OK | NG | NG | C | 9 | 0.23 |

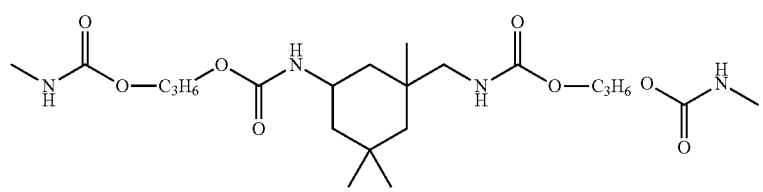

104-1

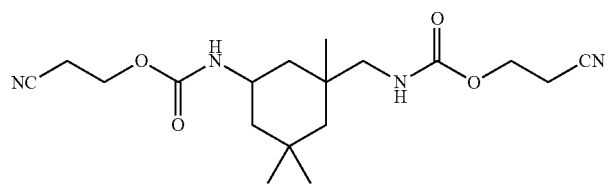

104-3

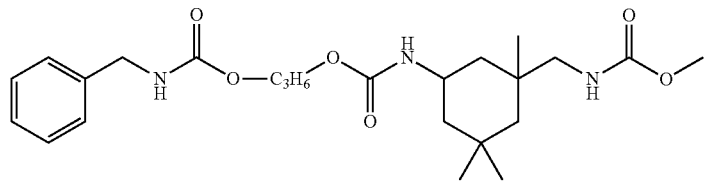

104-4

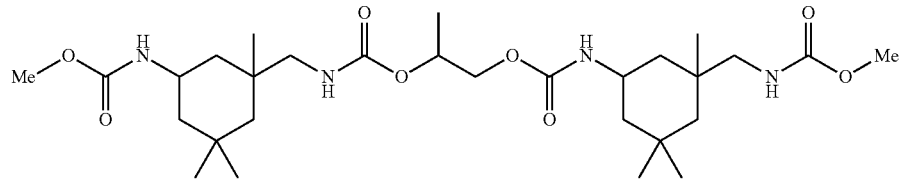

104-5

-continued
104-6
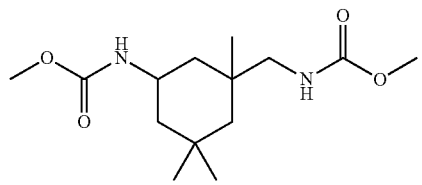
104-7
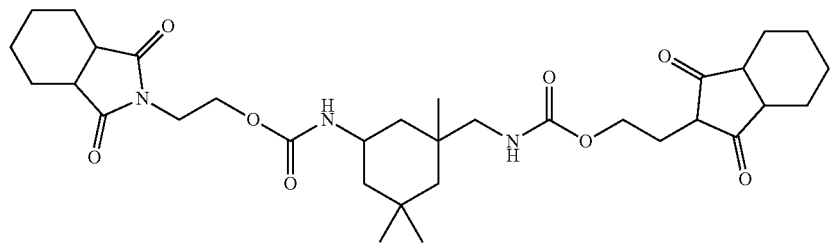
104-8
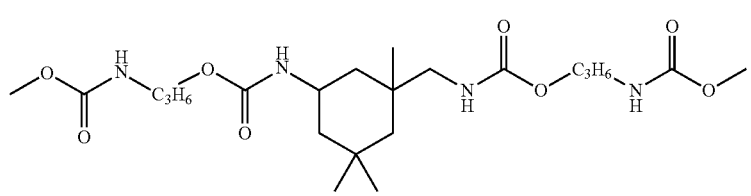
101-10
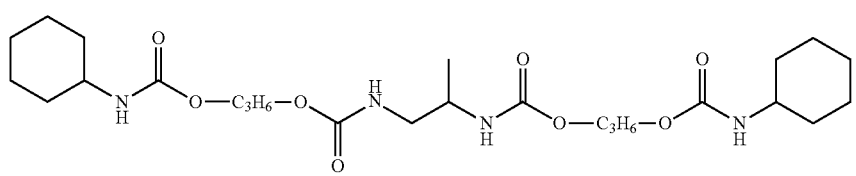
103-1
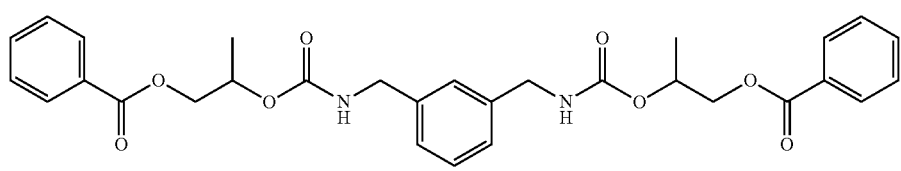
103-2
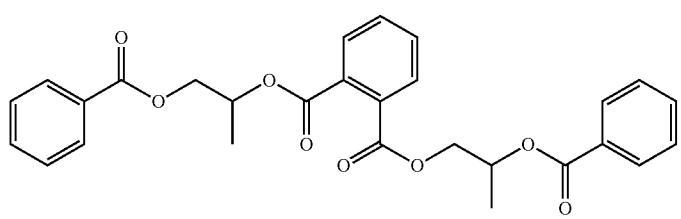
103-3
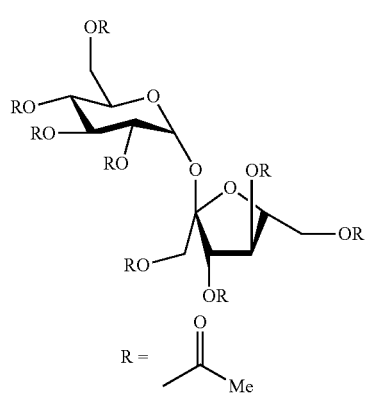
103-4
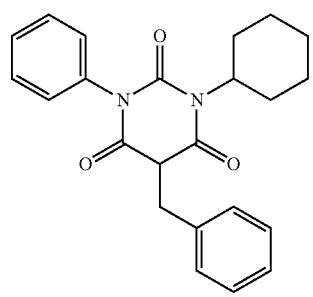

6-1. Production of Polymer Film
[Examples 601 and 602, Comparative Examples 501 and 502]
(Production of Acrylic Polymer Pellet)

In a reaction pot provided with a stirrer, a temperature sensor, a cooling tube and a nitrogen-introducing tube, 7000 g of methyl methacrylate (MMA), 1000 g of 2-[2'-hydroxy-5'-(methacryloyloxyethyl)phenyl]benzotriazole, 2000 g of 2-(hydroxymethyl)methyl acrylate (MHMA) and 10000 g of toluene were charged, and the temperature was raised to 105° C. while feeding nitrogen, and when the resultant substance was refluxed, 10.0 g of tertiary-amyl peroxy-isononanoate (trade name: Lupasol 570, manufactured by ARKEMA Yoshitomi, Ltd.) was added as an initiator and while dropping 20.0 g of a solution consisting of an initiator and 100 g of toluene for 4 hours, solution polymerization was performed under reflux (about 105 to 110° C.), which was matured for additional 4 hours.

10 g of a mixture of stearyl phosphate/distearyl phosphate (trade name; Phoslex A-18, manufactured by Sakai Chemical Industry Co., Ltd.) was added to the obtained polymer solution, and, under reflux (about 90 to 110° C.), a cyclization condensation reaction was performed for 5 hours. Next, a polymer solution thus obtained by the cyclization condensation reaction was introduced into a vent-type twin screw extruder (screw (diameter)=29.75 mm, L (length)/D (width) =30) of barrel temperature of 260° C., a rotation number of 100 rpm, a decompression degree of 13.3 to 400 hPa (10 to 300 mmHg), a rear vent number of 1 and a fore vent number of 4 at a treatment rate of 2.0 kg/h in terms of resin, which was subjected to a cyclization condensation reaction and devolatilization and was excluded to thereby give a lactone ring-containing acrylic resin pellet A (weight-average molecular weight Mw=200,000). A lactone ring formation ratio of the lactone ring-containing acrylic polymer pellet A was 97.0%.

A compound shown in Table 6 relative to 100 parts by mass of the acrylic polymer pellet A was mixed in an amount shown in Table 6, with a biaxial kneader at 230° C., to thereby produce a resin pellet.

(Production of Polymer Film)

The obtained acrylic polymer pellet was dried at 800 Pa (6 Torr), 100° C. for 12 hours, which was extruded from a T die at a die temperature of 290° C. with a mono screw extruder, with the result that a polymer film having a thickness of 40 μm was produced.

6-2. Evaluation of Polymer Film
(1) Surface Hardness

According to the method described in the above 4-2. Evaluation of polymer film, item (1), Knoop hardness was obtained as an average value of five points.

Values of Knoop hardness of acrylic polymer films in Examples 601, 602 and Comparative example 502 was compared with the value of Knoop hardness of the acrylic polymer film in Comparative example 501 (compound was not added), with the result that Knoop hardness improvement rate=(Knoop hardness of each of acrylic polymer films)/(Knoop hardness of acrylic polymer film in Comparative example 501) was calculated and surface hardness was evaluated on the basis of the evaluation standard shown in above 4-2. Evaluation of polymer film, item (1). When the evaluation result is A or B, it can be said that the addition of the compound has made it possible to improve the surface hardness (Knoop hardness) to the extent of exhibiting sufficient scratch resistance in practice.

(2) Evaluation of Transparency (Haze)

The evaluation was performed according to the method and standard described in above-described 4-2. Evaluation of polymer film, item (2).

Results are shown in Table 6.

TABLE 6

| | Compound added to the polymer film | | | | Surface hardness | | | Transparency | |
| | | | | | Knoop | | | | |
| | Type | Molecular weight | δh | δx | Content [parts by mass] | Knoop hardness (N/mm²) | hardness improvement rate | Determination | Haze | Determination |
| --- | --- | --- | --- | --- | --- | --- | --- | --- | --- | --- |
| Comp. Ex. 501 | None | — | — | — | 0 | 167 | 1.00 | — | 0.17 | OK |
| Ex. 601 | 101-2 | 607 | 12.0 | 0.81 | 10.0 | 213 | 1.27 | A | 0.16 | OK |
| Ex. 602 | 101-1 | 450 | 12.8 | 0.25 | 10.0 | 208 | 1.25 | A | 0.19 | OK |
| Comp. Ex. 502 | Triphenyl phosphate | 262 | 6.5 | 0.89 | 10.0 | 169 | 1.01 | E | 0.21 | OK |

101-1

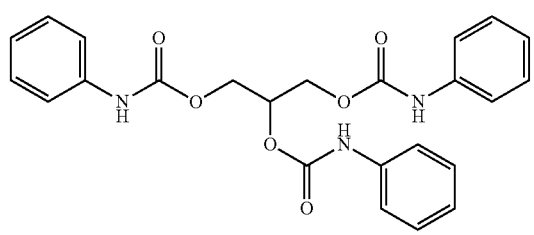

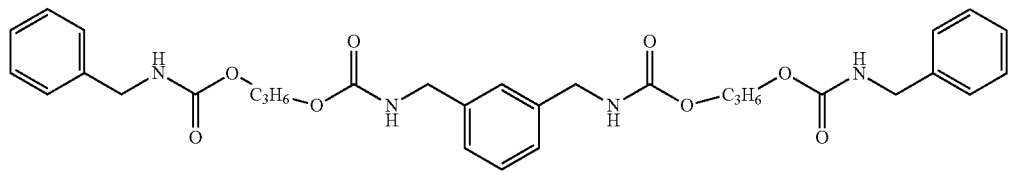

101-2

7-1. Production of Polymer Film
(Synthesis of Cycloolefin Polymer P)

50 g of 8-methyl-8-methoxycarbonyltetracyclo[4.4.0.1$^{2,5}$, 1$^{7,10}$]-3-dodecene (monomer), 3.6 g of 1-hexene (molecular weight adjusting agent) and 100 g of toluene were charged in a nitrogen-substituted reaction vessel, and the solution was heated to 80° C. Next, 0.09 ml of a toluene solution of triethylaluminum (0.6 mol/l) and 0.29 ml of toluene solution of methanol-modified tungsten hexachloride (concentration of 0.025 mol/l) were added to the solution in the reaction vessel, as polymerization catalysts, and a ring-cleavage polymerization reaction was performed by heating and stirring the system at 80° C. for 3 hours, with the result was a ring-cleavage polymerized body solution was obtained.

Subsequently, RuHCl(CO)[P(C$_6$H$_5$)$_3$]$_3$ was added as a hydrogenation catalyst in an amount of 500 ppm relative to the charge amount of the monomer, and a hydrogenation reaction was performed under conditions of a hydrogen gas pressure of 9.0 relative to 10.0 MPa, a temperature of 160 to 165° C. for 3 hours. After the completion of the reaction, the resultant solution was added to an isopropyl alcohol solution to thereby be precipitated, and the coagulum was separated and collected, which was dried, with the result that a hydrogenated norbornene-based ring-cleavage polymerized body was obtained. Hereinafter, this will be referred to as a cycloolefin polymer P.

(Production of Polymer Film)

A composition below using the cycloolefin-based polymer P was fed into a mixing tank, which was stirred to thereby dissolve respective components, and a cycloolefin-based polymer solution was prepared.

Composition of Cycloolefin-Based Polymer Solution

| | |
|---|---|
| cycloolefin polymer P | 100.0 parts by mass |
| ultraviolet absorber (C) shown above | 2.4 parts by mass |
| compound shown in Table 7 | see Table 7 |
| methylene chloride (solvent) | 325.0 parts by mass |

By using a band casting machine, the prepared cycloolefin polymer solution (dope) was cast onto a casting support (support temperature: 22° C.) made of stainless steel. It was peeled off in a film state where a residual solvent amount in the dope was about 20% by mass. Both ends of the film in the width direction were gripped with a tenter crip, and, in a state where a residual solvent amount was 5 to 10% by mass, under temperature of 100° C., the film was subjected to stretching of 1.05 times (5%) in the width direction and dried. After that, by conveying the film between rolls of a heat treatment apparatus, it was furthermore dried to thereby give a polymer film of thickness of 60 μm.

7-2. Evaluation of Polymer Film (4)
(1) Surface Hardness

Knoop hardness was obtained as an average value of five points by the method described in the above 4-2. Evaluation of polymer film, item (1).

Values of Knoop hardness of each of cycloolefin polymer films in Example 801 and Comparative example 702 were compared with the value of Knoop hardness of a cycloolefin polymer film in Comparative example 701 (no addition of a compound), with the result that Knoop hardness improvement rate=(Knoop hardness of each of cycloolefin polymer films)/(Knoop hardness of a cycloolefin polymer film in Comparative example 701) was calculated and surface hardness was evaluated on the basis of the evaluation standard shown in the above 4-2. Evaluation of polymer film, item (1). When the evaluation result is A or B, it can be said that the addition of the compound has made it possible to improve the surface hardness (Knoop hardness) to the extent of exhibiting sufficient scratch resistance in practice.

(2) Evaluation of Transparency (Haze)

The evaluation was performed according to the method and standard described in the above 4-2. Evaluation of polymer film, item (2).

Results are shown in Table 7.

TABLE 7

| | Compound added to the polymer film | | | | | | | |
|---|---|---|---|---|---|---|---|---|
| | Type | Molecular weight | δh | δx | Content [parts by mass] | Surface hardness Determination | Transparency Haze | Determination |
| Comp. Ex. 701 | — | — | — | — | 0 | — | 0.24 | OK |
| Ex. 801 | 101-2 | 607 | 12.0 | 0.81 | 10.0 | A | 0.24 | OK |
| Comp. Ex. 702 | Triphenyl phosphate | 262 | 6.5 | 0.89 | 10.0 | F | 0.31 | OK |

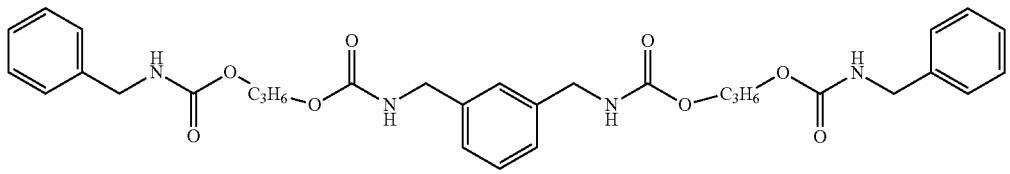

101-2

From the above-described results, it can be confirmed that polymer films in Examples are excellent in scratch resistance (surface hardness) and transparency.

In the accompanying figures, each of numerals represents as follows:
70 Casting film
85 Casting band
89 Casting die
120 Dope for core layer
121 Dope for first skin layer
122 Dope for second skin layer
120a Core layer
121a First skin layer
122a Second skin layer
150 Die for second skin layer (support layer)
151 Die for core layer (base layer)
152 Die for first skin layer (air surface layer)

The present disclosure relates to the subject matter contained in Japanese Patent Application No. 2014-179685 filed on Sep. 3, 2014, Japanese Patent Application No. 2015-028019 filed on Feb. 16, 2015, and Japanese Patent Application No. 2015-121383 filed on Jun. 16, 2015, which are expressly incorporated herein by reference in their entirety. All the publications referred to in the present specification are also expressly incorporated herein by reference in their entirety.

The foregoing description of preferred embodiments of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined claims set forth below.

What is claimed is:
1. A polymer film, which comprises:
a carbonyl bond-containing polymer; and
a compound having δh of equal to or higher than 11.0 and δχ of equal to or lower than 1.50, wherein the δh is a value of hydrogen-bonding capacity calculated by Hoy method and the δχ is a value calculated by equation 1:

$$\delta\chi = |x - 13.3|$$  Equation 1 wherein, in equation 1, χ represents an interatomic distance in the polymer film between atoms most distant from each other among molecules in the compound, excluding a hydrogen atom, calculated by molecular dynamics calculation,
wherein said compound is represented by a compound selected from the group:
i) formula (I-1):

$$(Q^3\text{-}(L^{32}\text{-}L^{31})_{n3}\text{-}A\text{-}(L^{41}\text{-}L^{42})_{n4})_m\text{-}Z^1$$

wherein each of $L^{31}$ and $L^{41}$ independently represents an alkylene group, and the alkylene group may be substituented, each of $L^{32}$ and $L^{42}$ independently represents a single bond, or any one of or any combination of —O—, —$NR^1$—, —S— and —C(=O)—, $R^1$ represents a hydrogen atom or a substituent, each of n3 and n4 independently represents an integer of 0 to 20, either n3 or n4 is an integer equal to or higher than 1, and when $L^{31}$, $L^{32}$, $L^{41}$ and $L^{42}$ exist in plural number, they may be the same as or different from each other, $Q^3$ represents a substituent, $Z^1$ represents an m-valent linking group, and A represents *—O—C(=O)—NH— or *—NH—C(=O)—O—, where * represents a bonding position with $L^{41}$, m represents an integer of 2 to 6, and $Q^3$ and A existing in plural number may be the same as or different from each other, respectively, and at least one of $Q^3$ and $Z^1$ contains a ring structure, wherein $Z^1$ is

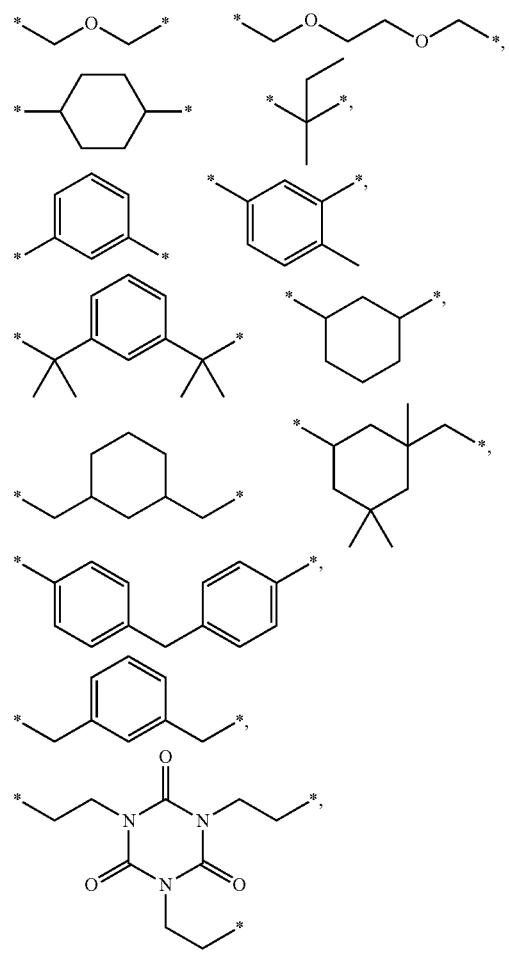

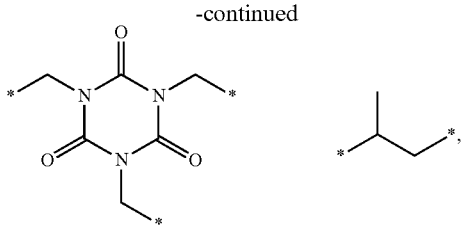

*—CH2-CH(-*)—CH2-* is formula

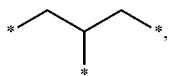

*—CH2-C(CH3)(CH2-*)—CH2-* is formula

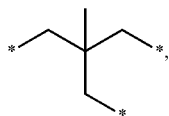

or

*—CH2-CH(C2H5)(CH2-*)—CH2-* is formula

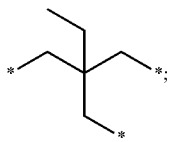

ii) formula (I-3):

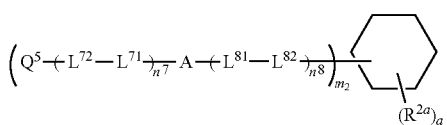

wherein each of $L^{71}$ and $L^{81}$ independently represents an alkylene group, and the alkylene group may be substituented, each of $L^{72}$ and $L^{82}$ independently represents a single bond or any one of or any combination of —O—, —NR$^1$—, —S— and —C(=O), R$^1$ represents a hydrogen atom or a substituent, each of n7 and n8 independently represents an integer of 0 to 12, either n7 or n8 is an integer equal to or higher than 1, and when $L^{71}$, $L^{72}$, $L^{81}$ and $L^{82}$ exist in plural number, they may be the same as or different from each other, $Q^5$ represent a substituted or an unsubstituted phenyl group, a substituted or unsubstituted cyclohexyl group, a methyl group, an ethyl group, a propyl group, an isopropyl group or a t-butyl group, A represents *—O—C(=O)—NH— or *—NH—C(=O)—O—, where * represents a bonding position with $L^{81}$, and $R^{2a}$ represents an alkyl group having 1 to 3 carbon atoms, m2 represents an integer of 2 or 3, and $Q^5$ and A existing in plural number may be the same as or different from each other, respectively, a represents an integer of 0 to 10, and, when a is an integer equal to or higher than 1, $R^{2a}$ existing in plural number may be the same as or different from each other;

iii) formula (I-5):

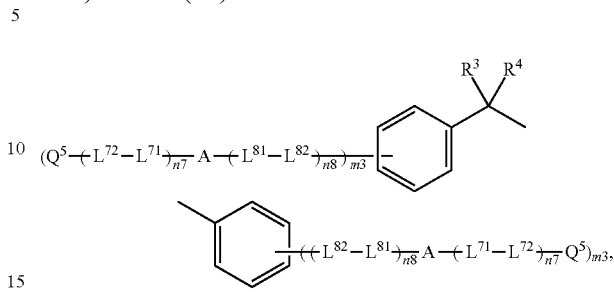

wherein each of $L^{71}$ and $L^{81}$ independently represents an alkylene group, and the alkylene group may be substituented, each of $L^{72}$ and $L^{82}$ independently represents a single bond or any one of or any combination of —O—, —NR$^1$—, —S— and —C(=O), each of n7 and n8 independently represents an integer of 0 to 12, either n7 or n8 is an integer equal to or higher than 1, and when $L^{71}$, $L^{72}$, $L^{81}$ and $L^{82}$ exist in plural number, they may be the same as or different from each other, $Q^5$ represent a substituted or an unsubstituted phenyl group, a substituted or unsubstituted cyclohexyl group, a methyl group, an ethyl group, a propyl group, an isopropyl group or a t-butyl group, A represents *—O—C(=O)—NH— or *—NH—C(=O)—O—, where * represents a bonding position with $L^{81}$, $Q^5$ and A existing in plural number may be the same as or different from each other, respectively, m3 represents 1 or 2, and each of R$^3$ and R$^4$ independently represents a hydrogen atom or a methyl group;

iv) formula (II):

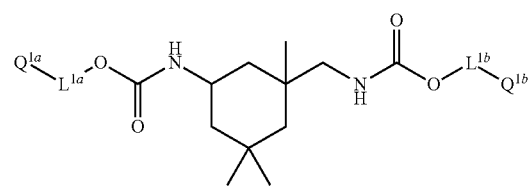

wherein in formula (II) each of $L^{1a}$ and $L^{1b}$ independently represents a single bond, an alkylene group, or a group represented by any of the above-described formulas (2A) to (2E), or a group consisting of a combination of a group represented by any of formulas (2A) to (2E) and two or three alkylene groups, and each of $Q^{1a}$ and $Q^{1b}$ independently represents a substituent, at least one of $Q^{1a}$ and $Q^{1b}$ represents a phenyl group which may have been substituted by an alkyl group having 1 to 3 carbon atoms or an alkoxy group having 1 to 3 carbon atoms;

v) formula (III):

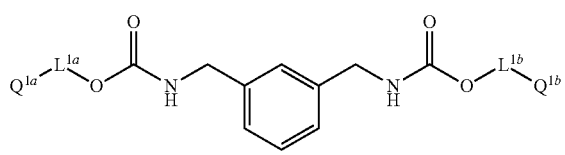

wherein in formula (III) each of $L^{1a}$ and $L^{1b}$ independently represents a single bond, an alkylene group, or a group represented by any of the above-described formulas (2A) to (2E), or a group consisting of a combination of a group represented by any of formulas (2A) to (2E) and two or three alkylene groups, and each of $Q^{1a}$ and $Q^{1b}$ independently represents a substituent, at least one of $Q^{1a}$ and $Q^{1b}$ represents a phenyl group which may have been substituted by an alkyl group having 1 to 3 carbon atoms or an alkoxy group having 1 to 3 carbon atoms;

vi) formula (A):

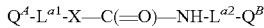

$Q^A$-$L^{a1}$-X—C(=O)—NH-$L^{a2}$-$Q^B$ wherein X represents —NR—, and R represents a hydrogen atom or a substituent, each of $L^{a1}$ and $L^{a2}$ independently represents a single bond, or any one of or any combination of an alkylene group, an arylene group, —O—, —$NR^1$—, —S— and —C(=O)—, $R^1$ represents a hydrogen atom or a substituent, each of $Q^A$ and $Q^B$ independently represents a substituent, and at least one of $Q^A$ and $Q^B$ represents a polar group being a residue of a compound having a C log P value equal to or lower than 0.85, or a terminal group contained in the substituent.

2. The polymer film according to claim 1, wherein the compound comprises at least one group selected from the group consisting of —$X^2$—(C=$X^4$)—$X^3$—, —$NR^5$—($SO_2$)—, —CO—$NR^6$—CO, O, S, COOH, —CN, —$NR^7R^8$, —OH and —SH per molecule, wherein each of $X^2$, $X^3$ independently represents a single bond, —$NR^9$—, —O— or —($CR^{10}R^{11}$)$_m$, $X^4$ represents an oxygen atom or a sulfur atom, each of $R^5$, $R^6$, $R^7$, $R^8$, $R^9$, $R^{10}$, and $R^{11}$ independently represents a hydrogen atom or an alkyl group which may be substituted, and m represents an integer equal to or higher than 1.

3. The polymer film according to claim 2, wherein the compound comprises at least one —O—C(=O)—NH— per molecule.

4. The polymer film according to claim 1, wherein the carbonyl bond-containing polymer is cellulose ester.

5. The polymer film according to claim 2, wherein the carbonyl bond-containing polymer is cellulose ester.

6. The polymer film according to claim 3, wherein the carbonyl bond-containing polymer is cellulose ester.

7. The polymer film according to claim 1, wherein the carbonyl bond-containing polymer is a polymer selected from the group consisting of acrylic polymers and methacrylic polymers.

8. The polymer film according to claim 2, wherein the carbonyl bond-containing polymer is a polymer selected from the group consisting of acrylic polymers and methacrylic polymers.

9. The polymer film according to claim 3, wherein the carbonyl bond-containing polymer is a polymer selected from the group consisting of acrylic polymers and methacrylic polymers.

10. The polymer film according to claim 1, wherein the carbonyl bond-containing polymer is a cycloolefin polymer.

11. The polymer film according to claim 2, wherein the carbonyl bond-containing polymer is a cycloolefin polymer.

12. The polymer film according to claim 3, wherein the carbonyl bond-containing polymer is a cycloolefin polymer.

13. The polymer film according to claim 1, wherein the compound has an absorption property in which absorbance of a solution containing the compound in a wavelength range of equal to or longer than 280 nm and equal to or shorter than 800 nm is equal to or higher than 0 abs and less than 1.0 abs.

14. The polymer film according to claim 1, wherein a value of Rth/d calculated as follows is equal to or more than −0.35 and equal to or less than 0.35;

wherein Rth/d is calculated as dividing a value of Rth which represents thickness direction retardation of the polymer film measured at a wavelength of 590 nm by d which represents a thickness of the polymer film; each unit of Rth and d is μm.

15. A polarizing plate,
which comprises a polymer film and a polarizer,
wherein the polymer film is a polymer film, comprising:
a carbonyl bond-containing polymer; and
a compound having δh of equal to or higher than 11.0 and δχ of equal to or lower than 1.50, wherein the δh is a value of hydrogen-bonding capacity calculated by Hoy method and the δχ is a value calculated by equation 1:

$$\delta_\chi = |x - 13.3| \qquad \text{Equation 1}$$

wherein, in equation 1, χ represents an interatomic distance in the polymer film between atoms most distant from each other among molecules in the compound, excluding a hydrogen atom, calculated by molecular dynamics calculation,
wherein said compound is represented by a compound selected from the group:

i) formula (I-1):

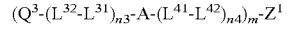

$(Q^3\text{-}(L^{32}\text{-}L^{31})_{n3}\text{-}A\text{-}(L^{41}\text{-}L^{42})_{n4})_m\text{-}Z^1$ wherein each of $L^{31}$ and $L^{41}$ independently represents an alkylene group, and the alkylene group may be substituented, each of $L^{32}$ and $L^{42}$ independently represents a single bond, or any one of or any combination of —O—, —$NR^1$—, —S— and —C(=O)—, $R^1$ represents a hydrogen atom or a substituent, each of n3 and n4 independently represents an integer of 0 to 20, either n3 or n4 is an integer equal to or higher than 1, and when $L^{31}$, $L^{32}$, $L^{41}$ and $L^{42}$ exist in plural number, they may be the same as or different from each other, $Q^3$ represents a substituent, $Z^1$ represents an m-valent linking group, and A represents *—O—C(=O)—NH— or *—NH—C(=O)—O—, where * represents a bonding position with $L^{41}$, m represents an integer of 2 to 6, and $Q^3$ and A existing in plural number may be the same as or different from each other, respectively, and at least one of $Q^3$ and $Z^1$ contains a ring structure, wherein Z1 is

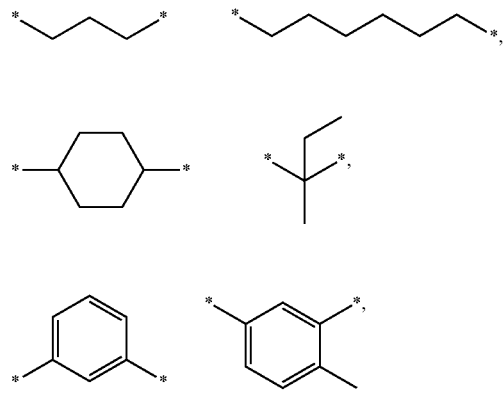

-continued

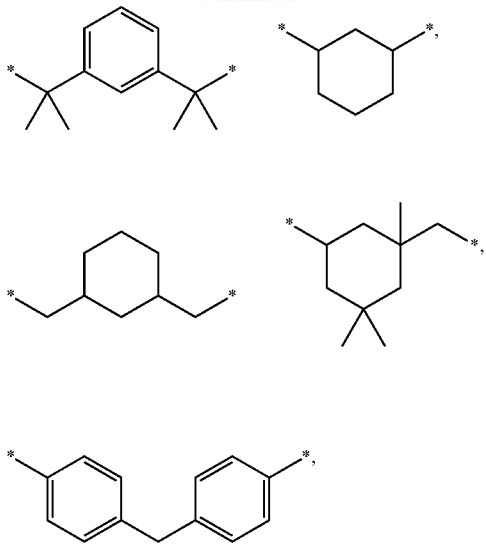

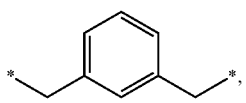

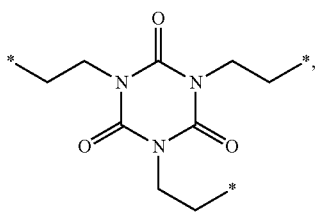

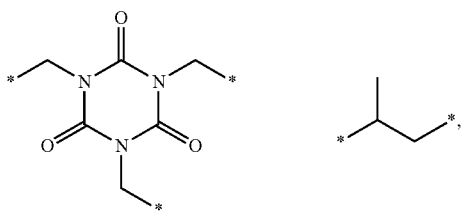

*—CH2-CH(-*)—CH2-* is formula

*—CH2-CH(CH3)(CH2-*)—CH2-* is formula

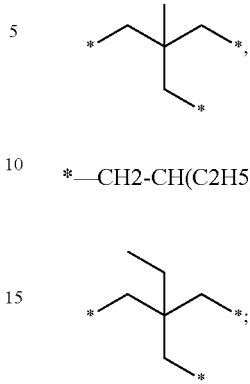

*—CH2-CH(C2H5)(CH2-*)—CH2-* is formula ii) formula (I-3):

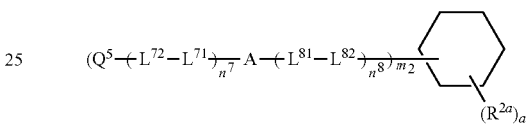

wherein each of $L^{71}$ and $L^{81}$ independently represents an alkylene group, and the alkylene group may be substituented, each of $L^{72}$ and $L^{82}$ independently represents a single bond or any one of or any combination of —O—, —NR$^1$—, —S— and —C(=O), R$^1$ represents a hydrogen atom or a substituent, each of n7 and n8 independently represents an integer of 0 to 12, either n7 or n8 is an integer equal to or higher than 1, and when $L^{71}$, $L^{72}$, $L^{81}$ and $L^{82}$ exist in plural number, they may be the same as or different from each other, Q$^5$ represent a substituted or an unsubstituted phenyl group, a substituted or unsubstituted cyclohexyl group, a methyl group, an ethyl group, a propyl group, an isopropyl group or a t-butyl group, A represents *—O—C(=O)—NH— or *—NH—C(=O)—O—, where * represents a bonding position with $L^{81}$, and R$^{2a}$ represents an alkyl group having 1 to 3 carbon atoms, m2 represents an integer of 2 or 3, and Q$^5$ and A existing in plural number may be the same as or different from each other, respectively, a represents an integer of 0 to 10, and, when a is an integer equal to or higher than 1, R$^{2a}$ existing in plural number may be the same as or different from each other;

iii) formula (I-5):

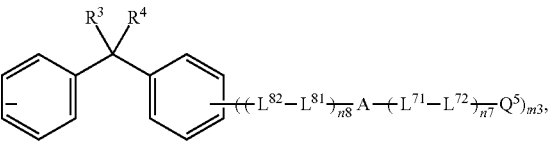
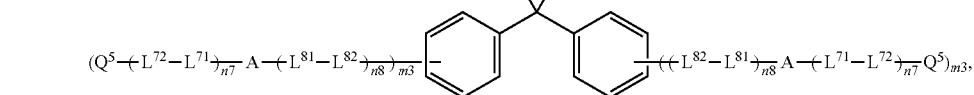

wherein each of $L^{71}$ and $L^{81}$ independently represents an alkylene group, and the alkylene group may be substituented, each of $L^{72}$ and $L^{82}$ independently represents a single bond or any one of or any combination of —O—, —NR$^1$—, —S— and —C(=O)—, each of n7 and n8 independently represents an integer of 0 to 12, either n7 or n8 is an integer equal to or higher than 1, and when $L^{71}$, $L^{72}$, $L^{81}$ and $L^{82}$ exist in plural number, they may be the same as or different from each other, $Q^5$ represent a substituted or an unsubstituted phenyl group, a substituted or unsubstituted cyclohexyl group, a methyl group, an ethyl group, a propyl group, an isopropyl group or a t-butyl group, A represents *—O—C(=O)—NH— or *—NH—C(=O)—O—, where * represents a bonding position with $L^{81}$, $Q^5$ and A existing in plural number may be the same as or different from each other, respectively, m3 represents 1 or 2, and each of $R^3$ and $R^4$ independently represents a hydrogen atom or a methyl group;

iv) formula (II):

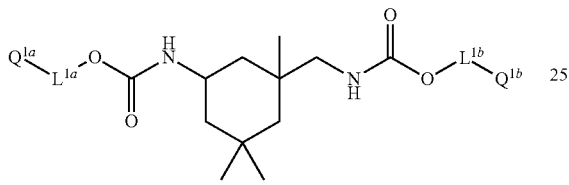

wherein in formula (II) each of $L^{1a}$ and $L^{1b}$ independently represents a single bond, an alkylene group, or a group represented by any of the above-described formulas (2A) to (2E), or a group consisting of a combination of a group represented by any of formulas (2A) to (2E) and two or three alkylene groups, and each of $Q^{1a}$ and $Q^{1b}$ independently represents a substituent, at least one of $Q^{1a}$ and $Q^{1b}$ represents a phenyl group which may have been substituted by an alkyl group having 1 to 3 carbon atoms or an alkoxy group having 1 to 3 carbon atoms;

v) formula (III):

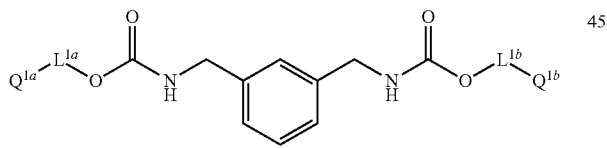

wherein in formula (III) each of $L^{1a}$ and $L^{1b}$ independently represents a single bond, an alkylene group, or a group represented by any of the above-described formulas (2A) to (2E), or a group consisting of a combination of a group represented by any of formulas (2A) to (2E) and two or three alkylene groups, and each of $Q^{1a}$ and $Q^{1b}$ independently represents a substituent, at least one of $Q^{1a}$ and $Q^{1b}$ represents a phenyl group which may have been substituted by an alkyl group having 1 to 3 carbon atoms or an alkoxy group having 1 to 3 carbon atoms;

vi) formula (A):

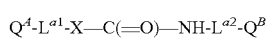

wherein X represents —NR—, and R represents a hydrogen atom or a substituent, each of $L^{a1}$ and $L^{a2}$ independently represents a single bond, or any one of or any combination of an alkylene group, an arylene group, —O—, —NR$^1$—, —S— and —C(=O)—, $R^1$ represents a hydrogen atom or a substituent, each of $Q^A$ and $Q^B$ independently represents a substituent, and at least one of $Q^A$ and $Q^B$ represents a polar group being a residue of a compound having a C log P value equal to or lower than 0.85, or a terminal group contained in the substituent.

16. A liquid crystal display device,
which comprises at least one polarizing plate and a liquid crystal cell,
wherein at least one polarizing plate comprises a polymer film and a polarizer, and
the polymer film is a polymer film, comprising:
a carbonyl bond-containing polymer; and
a compound having δh of equal to or higher than 11.0 and δχ of equal to or lower than 1.50, wherein the δh is a value of hydrogen-bonding capacity calculated by Hoy method and the δχ is a value calculated by equation 1:

$$\delta\chi = |x - 13.3| \qquad \text{Equation 1}$$

wherein, in equation 1, χ represents an interatomic distance in the polymer film between atoms most distant from each other among molecules in the compound, excluding a hydrogen atom, calculated by molecular dynamics calculation,
wherein said compound is represented by a compound selected from the group:

i) formula (I-1):

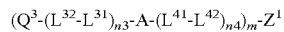

wherein each of $L^{31}$ and $L^{41}$ independently represents an alkylene group, and the alkylene group may be substituented, each of $L^{32}$ and $L^{42}$ independently represents a single bond, or any one of or any combination of —O—, —NR$^1$—, —S— and —C(=O)—, $R^1$ represents a hydrogen atom or a substituent, each of n3 and n4 independently represents an integer of 0 to 20, either n3 or n4 is an integer equal to or higher than 1, and when $L^{31}$, $L^{32}$, $L^{41}$ and $L^{42}$ exist in plural number, they may be the same as or different from each other, $Q^3$ represents a substituent, $Z^1$ represents an co-valent linking group, and A represents *—O—C(=O)—NH— or *—NH—C(=O)—O—, where * represents a bonding position with $L^{41}$, m represents an integer of 2 to 6, and $Q^3$ and A existing in plural number may be the same as or different from each other, respectively, and at least one of $Q^3$ and $Z^1$ contains a ring structure,
wherein Z1 is

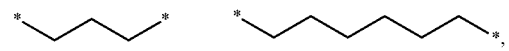

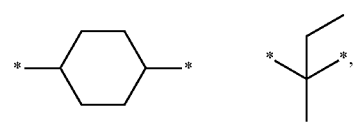

-continued

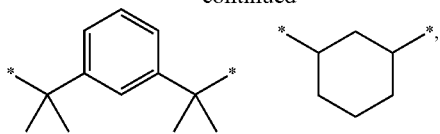

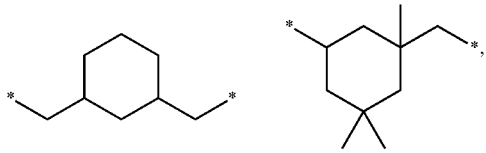

*—CH2-CH(-*)—CH2-* is formula

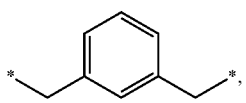

*—CH2-CH(CH3)(CH2-*)—CH2-* is formula

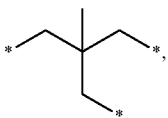

*—CH2-CH(C2H5)(CH2-*)—CH2-* is formula

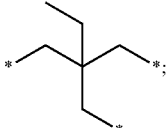

ii) formula (I-3):

$$(Q^5\!-\!(L^{72}\!-\!L^{71})_{n7}\!-\!A\!-\!(L^{81}\!-\!L^{82})_{n8})_{m2}$$ (with cyclohexyl bearing $(R^{2a})_a$)

wherein each of $L^{71}$ and $L^{81}$ independently represents an alkylene group, and the alkylene group may be substituented, each of $L^{72}$ and $L^{82}$ independently represents a single bond or any one of or any combination of —O—, —NR$^1$—, —S— and —C(=O), R$^1$ represents a hydrogen atom or a substituent, each of n7 and n8 independently represents an integer of 0 to 12, either n7 or n8 is an integer equal to or higher than 1, and when $L^{71}$, $L^{72}$, $L^{81}$ and $L^{82}$ exist in plural number, they may be the same as or different from each other, $Q^5$ represent a substituted or an unsubstituted phenyl group, a substituted or unsubstituted cyclohexyl group, a methyl group, an ethyl group, a propyl group, an isopropyl group or a t-butyl group, A represents *—O—C(=O)—NH— or *—NH—C(=O)—O—, where * represents a bonding position with $L^{81}$, and $R^{2a}$ represents an alkyl group having 1 to 3 carbon atoms, m2 represents an integer of 2 or 3, and $Q^5$ and A existing in plural number may be the same as or different from each other, respectively, a represents an integer of 0 to 10, and, when a is an integer equal to or higher than 1, $R^{2a}$ existing in plural number may be the same as or different from each other;

iii) formula (I-5):

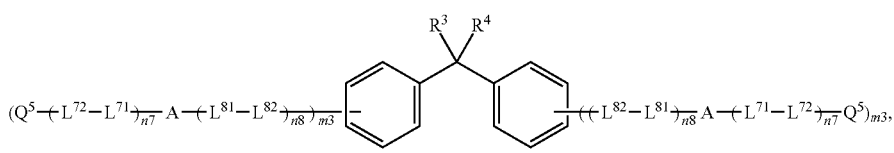

wherein each of $L^{71}$ and $L^{81}$ independently represents an alkylene group, and the alkylene group may be substituented, each of $L^{72}$ and $L^{82}$ independently represents a single bond or any one of or any combination of —O—, —NR$^1$—, —S— and —C(=O), each of n7 and n8 independently represents an integer of 0 to 12, either n7 or n8 is an integer equal to or higher than 1, and when $L^{71}$, $L^{72}$, $L^{81}$ and $L^{82}$ exist in plural number, they may be the same as or different from each other, $Q^5$ represent a substituted or an unsubstituted phenyl group, a substituted or unsubstituted cyclohexyl group, a methyl group, an ethyl group, a propyl group, an isopropyl group or a t-butyl group, A represents *—O—C(=O)—NH— or *—NH—C(=O)—O—, where * represents a bonding position with $L^{81}$, $Q^5$ and A existing in plural number may be the same as or different from each other, respectively, m3 represents 1 or 2, and each of $R^3$ and $R^4$ independently represents a hydrogen atom or a methyl group;

iv) formula (II):

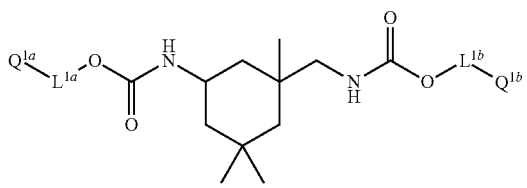

wherein in formula (II) each of $L^{1a}$ and $L^{1b}$ independently represents a single bond, an alkylene group, or a group represented by any of the above-described formulas (2A) to (2E), or a group consisting of a combination of a group represented by any of formulas (2A) to (2E) and two or three alkylene groups, and each of $Q^{1a}$ and $Q^{1b}$ independently represents a substituent, at least one of $Q^{1a}$ and $Q^{1b}$ represents a phenyl group which may have been substituted by an alkyl group having 1 to 3 carbon atoms or an alkoxy group having 1 to 3 carbon atoms;

v) formula (III):

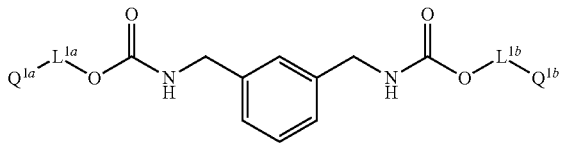

wherein in formula (III) each of $L^{1a}$ and $L^{1b}$ independently represents a single bond, an alkylene group, or a group represented by any of the above-described formulas (2A) to (2E), or a group consisting of a combination of a group represented by any of formulas (2A) to (2E) and two or three alkylene groups, and each of $Q^{1a}$ and $Q^{1b}$ independently represents a substituent, at least one of $Q^{1a}$ and $Q^{1b}$ represents a phenyl group which may have been substituted by an alkyl group having 1 to 3 carbon atoms or an alkoxy group having 1 to 3 carbon atoms;

vi) formula (A):

$Q^A$-$L^{a1}$-X—C(=O)—NH-$L^{a2}$-$Q^B$ wherein X represents —NR—, and R represents a hydrogen atom or a substituent, each of $L^{a1}$ and $L^{a2}$ independently represents a single bond, or any one of or any combination of an alkylene group, an arylene group, —O—, —NR$^1$—, —S— and —C(=O)—, R$^1$ represents a hydrogen atom or a substituent, each of $Q^A$ and $Q^B$ independently represents a substituent, and at least one of $Q^A$ and $Q^B$ represents a polar group being a residue of a compound having a C log P value equal to or lower than 0.85, or a terminal group contained in the substituent.

17. The liquid crystal display device according to claim 16, which comprises the polymer film on a surface of the polarizer opposite to a surface facing the liquid crystal cell.

18. The liquid crystal display device according to claim 16, which comprises the polymer film between the polarizer and the liquid crystal cell.

* * * * *